(12) United States Patent
Edge et al.

(10) Patent No.: US 11,696,095 B2
(45) Date of Patent: *Jul. 4, 2023

(54) SYSTEMS AND METHODS FOR 5G LOCATION SUPPORT USING SERVICE BASED INTERFACES

(71) Applicant: QUALCOMM Incorporated, San Diego, CA (US)

(72) Inventors: Stephen William Edge, Escondido, CA (US); Hong Cheng, Basking Ridge, NJ (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,545

(22) Filed: Sep. 17, 2021

(65) Prior Publication Data
US 2022/0007150 A1  Jan. 6, 2022

Related U.S. Application Data

(63) Continuation of application No. 16/102,623, filed on Aug. 13, 2018, now Pat. No. 11,128,985.
(Continued)

(30) Foreign Application Priority Data

Aug. 1, 2018  (GR) ............................. 20180100361

(51) Int. Cl.
*H04W 4/029*  (2018.01)
*H04W 64/00*  (2009.01)
(Continued)

(52) U.S. Cl.
CPC .......... *H04W 4/029* (2018.02); *H04W 64/00* (2013.01); *H04W 36/0022* (2013.01); *H04W 84/12* (2013.01)

(58) Field of Classification Search
CPC .......... H04W 4/025; H04W 4/22; G01C 5/06
See application file for complete search history.

(56) References Cited

U.S. PATENT DOCUMENTS 10,887,806 B2 * 1/2021 Patil ...................... H04W 92/02
11,128,985 B2   9/2021 Edge et al.
(Continued)

FOREIGN PATENT DOCUMENTS

CN  101198178 A  6/2008
TW  201225712 A  6/2012

OTHER PUBLICATIONS

Taiwan Search Report—TW107128294—TIPO—dated Sep. 6, 2021.
(Continued)

*Primary Examiner* — Joshua L Schwartz
(74) *Attorney, Agent, or Firm* — Qualcomm Incorporated

(57) ABSTRACT

Methods and techniques are described for supporting location services for a user equipment (UE) using a location server and service based interfaces (SBIs) and SBI service operations in a Fifth Generation wireless network. The location server may be, e.g., a Location Management Function (LMF). The LMF may be in either a serving Public Land Mobile Network (PLMN) for a UE or in a Home PLMN for a roaming UE. The LMF may receive a location service request for the UE using an SBI and may communicate with another entity in the network, through a second entity and using an SBI, to obtain location information for
(Continued)

the UE measured by the other entity. The LMF may determine a location for the UE based on the location information.

20 Claims, 23 Drawing Sheets

Related U.S. Application Data

(60) Provisional application No. 62/689,751, filed on Jun. 25, 2018, provisional application No. 62/632,402, filed on Feb. 19, 2018, provisional application No. 62/571,780, filed on Oct. 12, 2017, provisional application No. 62/570,082, filed on Oct. 9, 2017, provisional application No. 62/545,474, filed on Aug. 14, 2017.

(51) Int. Cl.
*H04W 36/00* (2009.01)
*H04W 84/12* (2009.01)

(56) References Cited

U.S. PATENT DOCUMENTS

| | | | | |
|---|---|---|---|---|
| 11,431,746 B1* | 8/2022 | Shaw | .................... | H04L 63/20 |
| 2006/0293066 A1* | 12/2006 | Edge | .................... | H04W 64/00 |
| | | | | 455/456.3 |
| 2016/0234645 A1* | 8/2016 | Belghoul | ................. | G01C 5/06 |
| 2017/0311304 A1* | 10/2017 | Lu | ........................ | H04W 4/70 |

OTHER PUBLICATIONS

Wilke J (Ericsson)., "5G Network Architecture and FMC", Jul. 2017, pp. 1-15, https://www.reprintsdesk.com/userv3/fulltextreader.aspx.

"3GPP Technical Specification Group Services and System Aspects; Telecommunication Management; Charging Management; Location Services (LCS) Charging (Release 13)," 3GPP TS 32.271 V13.0.0, pp. 14-22, 2016, 31 pages.

ETSI TS 132 271., "Digital Cellular Telecommunications System (Phase 2+) (GSM); Universal Mobile Telecommunications System (UMTS); LTE; Telecommunication management; Charging management; Location Services (LCS) charging," 3GPP TS 32.271, Version 14.0.0, Release 14, Apr. 2017 (2017-04-12), pp. 1-33, XP014292130, Retrieved from the Internet: URL: http://www.etsi.org/deliver/etsi_ts/132200_132299/132271/14.00.00_60/ts_132271v140000p.pdf [retrieved on Apr. 12, 2017].

Huawei Technologies: "Service-Based Architecture What does it mean for NextGen ?," 3GPP Draft, S2-166050, 3GPP SA WG2 #117, Kaohsiung, Taiwan, Oct. 17-21, 2016, pp. 1-14, XP051170015, Retrieved from the Internet: URL: http://www.3gpp.org/ftp/tsg_sa/WG2_Arch/TSGS2_117Kaohsiung_City/Docs/ [retrieved on Oct. 24, 2016].

International Preliminary Reporton Patentability—PCT/US2018/046623, The International Bureau of WIPO—Geneva, Switzerland, Feb. 27, 2020.

International Search Report and Written Opinion—PCT/US2018/046623—ISA/EPO—Dec. 13, 2018.

Taiwan Search Report—111115149—TIPO—dated Sep. 29, 2022.

* cited by examiner

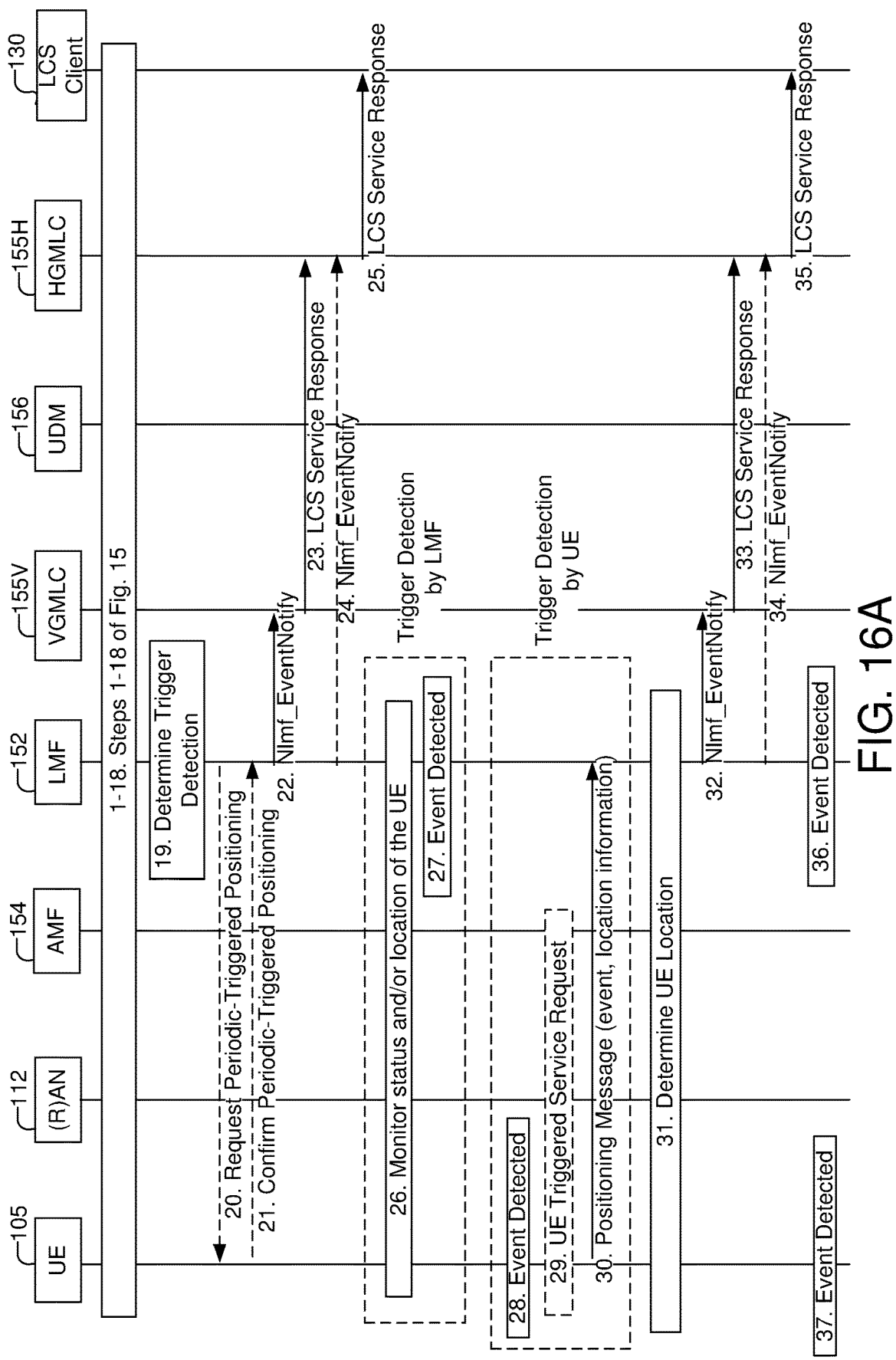

SYSTEMS AND METHODS FOR 5G LOCATION SUPPORT USING SERVICE BASED INTERFACES

CLAIM OF PRIORITY

This application is a continuation of U.S. application Ser. No. 16/102,623, filed Aug. 13, 2018, and entitled "SYSTEMS AND METHODS FOR 5G LOCATION SUPPORT USING SERVICE BASED INTERFACES," which claims under 35 USC § 119 the benefit of and priority to U.S. Provisional Application No. 62/545,474, filed Aug. 14, 2017, and entitled "5G Location Support Using Service Based Interfaces," U.S. Provisional Application No. 62/570,082, filed Oct. 9, 2017, and entitled "5G Location Support Using Service Based Interfaces," U.S. Provisional Application No. 62/571,780, filed Oct. 12, 2017, and entitled "5G Location Support Using Service Based Interfaces," U.S. Provisional No. 62/632,402, filed Feb. 19, 2018, and entitled "5G Location Support Using Service Based Interfaces," and U.S. Provisional No. 62/689,751, filed Jun. 25, 2018, and entitled "5G Location Support Using Service Based Interfaces," and claims priority to Greek Application No. 20180100361, filed Aug. 1, 2018, and entitled "Systems And Methods For 5G Location Support Using Service Based Interfaces," all of which are assigned to the assignee hereof and are incorporated herein by reference in their entireties.

BACKGROUND

Background Field

The present disclosure relates generally to communication, and more specifically to techniques for supporting location services for user equipments (UEs).

Relevant Background

The existing control plane (CP) location solution, referred to here as the traditional CP location solution, for Fourth Generation (4G) Long Term Evolution (LTE) access and EPC (Enhanced Packet Core) that is defined in 3GPP Technical Specification (TS) 23.271 has a number of limitations including high impact to a Mobility Management Entity (MME), difficulty in supporting location if there is an inter-MME handover, difficulty supporting location by a Home Public Land Mobile Network (HPLMN) for a roaming User Equipment (UE), and difficulty in scaling up location support for millions or possibly billions of UEs (e.g. UEs for IoT). If a corresponding solution is used for a Fifth Generation (5G) wireless access, corresponding limitations are likely to remain. Accordingly, a different control plane location solution is desired that may overcome some or all limitations of the traditional solution.

SUMMARY

Methods and techniques are described for supporting location services for a user equipment (UE) using a location server and service based interfaces (SBIs) and SBI service operations in a Fifth Generation wireless network. The location server may be, e.g., a Location Management Function (LMF). The LMF may be in either a serving Public Land Mobile Network (PLMN) for a UE or in a Home PLMN for a roaming UE. The LMF may receive a location service request for the UE using an SBI and may communicate with another entity in the network, through a second entity, to obtain location information for the UE measured by the other entity. The LMF may determine a location for the UE based on the location information.

In one implementation, a method for supporting location services for a user equipment (UE) using service based interfaces includes receiving by a first location server a location service request for the UE, wherein the location service request comprises a message for one of a Mobile Terminated Location Request (MT-LR), a Mobile Originated Location Request (MO-LR), a Network Induced Location Request (NI-LR), or a periodic and triggered MT-LR; communicating between the first location server and at least one other first entity to obtain location information for the UE measured by the at least one other first entity, wherein the communication between the first location server and the at least one other first entity is transferred via a second entity; and determining a location for the UE based on the location information; wherein the first location server uses service based interfaces (SBIs) and service operations to receive the location service request and to communicate with the at least one other first entity via the second entity.

In one implementation, a first location server for supporting location services for a user equipment (UE) includes an external interface for receiving and sending messages to entities in a network; and at least one processor coupled to the external interface, the at least one processor configured to receive a location service request for the UE, wherein the location service request comprises a message for one of a Mobile Terminated Location Request (MT-LR), a Mobile Originated Location Request (MO-LR), a Network Induced Location Request (NI-LR), or a periodic and triggered MT-LR, communicate with at least one other first entity to obtain location information for the UE measured by the at least one other first entity, wherein the communication between the first location server and the at least one other first entity is transferred via a second entity; and determine a location for the UE based on the location information; wherein the first location server uses service based interfaces (SBIs) and service operations to receive the location service request and to communicate with the at least one other first entity via the second entity.

In one implementation, a first location server for supporting location services for a user equipment (UE) includes means for receiving by a first location server a location service request for the UE, wherein the location service request comprises a message for one of a Mobile Terminated Location Request (MT-LR), a Mobile Originated Location Request (MO-LR), a Network Induced Location Request (NI-LR), or a periodic and triggered MT-LR; means for communicating between the first location server and at least one other first entity to obtain location information for the UE measured by the at least one other first entity, wherein the communication between the first location server and the at least one other first entity is transferred via a second entity; and means for determining a location for the UE based on the location information; wherein the first location server uses service based interfaces (SBIs) and service operations to receive the location service request and to communicate with the at least one other first entity via the second entity.

In one implementation, a non-transitory computer readable medium comprising instructions, which when executed by a processor of a first location server for supporting location services for a user equipment (UE) cause the processor to receive a location service request for the UE, wherein the location service request comprises a message for one of a Mobile Terminated Location Request (MT-LR), a Mobile Originated Location Request (MO-LR), a Network Induced Location Request (NI-LR), or a periodic and triggered MT-LR; communicate with at least one other first entity to obtain location information for the UE measured by the at least one other first entity, wherein the communication between the first location server and the at least one other first entity is transferred via a second entity; and determine a location for the UE based on the location information; wherein the first location server uses service based interfaces (SBIs) and service operations to receive the location service request and to communicate with the at least one other first entity via the second entity.

BRIEF DESCRIPTION OF THE DRAWINGS

An understanding of the nature and advantages of various embodiments may be realized by reference to the following figures.

FIG. 16A shows an optimized MT-LR procedure for a roaming UE to support periodic and triggered location.

Figure 1:
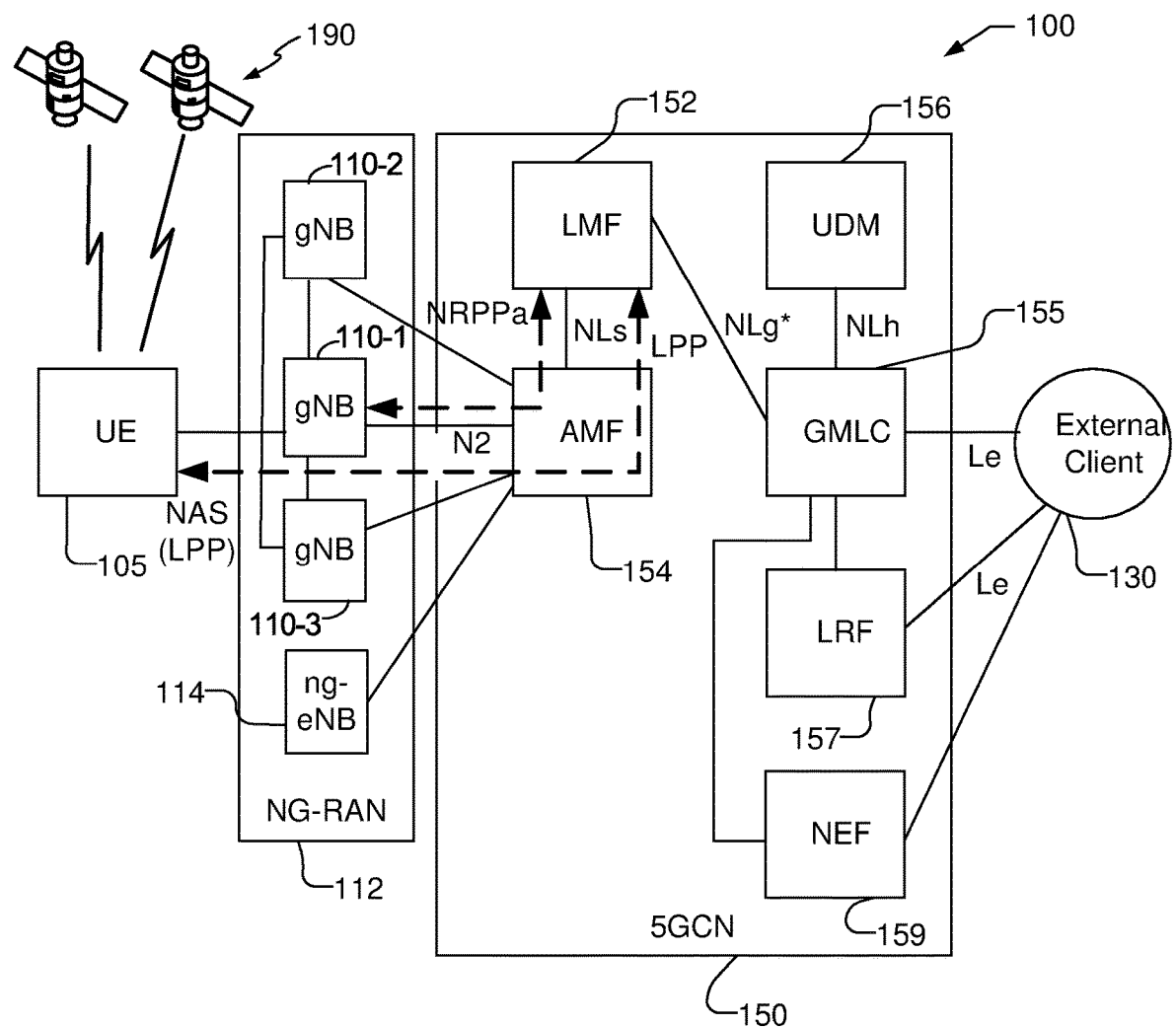
FIG. 1 is a block diagram illustrating a non-roaming reference architecture for a Location Management Function (LMF) based control plane (CP) location solution in a wireless network.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. Similarly, multiple instances of an element 152 may be indicated as 152V, 152H, 152S and 152T. When referring to such an element using only the first number, any instance of the element is to be understood (e.g. elements 110 in the previous example would refer to elements 110-1, 110-2 and 110-3, and element 152 in the previous example would refer to elements 152V, 152H, 152S and 152T).

DETAILED DESCRIPTION

In a control plane (CP) location solution, such as the CP location solution for the Third Generation Partnership Project (3GPP) defined in 3GPP Technical Specification (TS) 23.271 and 3GPP TS 36.305, signaling (e.g. including positioning related messages) to support location of mobile devices may be transferred between participating entities (e.g. the GMLC 155, gNB 110 and UE 105 described later for FIG. 1) using existing signaling interfaces and protocols for normal 3GPP network operation. In contrast, in a user plane (UP) location solution such as the Secure User Plane Location (SUPL) solution defined by the Open Mobile Alliance (OMA), signaling (e.g. such as SUPL messages carrying embedded positioning protocol messages) to support location of a mobile device may be transferred between participating entities (e.g., the mobile device and a SUPL Location Platform (SLP)), using data bearers (e.g. using the Internet Protocol (IP)).

In a traditional type of CP location solution, as defined for example for wireless access using Second Generation (2G) Global System for Mobile Communications (GSM), Third Generation (3G) Universal Mobile Telecommunications System (UMTS) or Fourth Generation (4G) Long Term Evolution (LTE), location support and location procedures may be provided using a core network access node as the main anchor point for location services. The core network access node may be a Mobile Switching Center (MSC) or Serving General Packet Radio Service Support Node (SGSN) for GSM or UMTS access, or may be a Mobility Management Entity (MME) for LTE access. In a Fifth Generation (5G) core network (5GCN), the core network access node used to support a CP location solution may be an Access and Mobility Management Function (AMF). However, this may lead to several undesirable consequences, as may also occur for CP location support in 2G, 3G and 4G networks. These consequences may include a significant implementation impact for an AMF, additional AMF processing due to a need to maintain state information for location sessions, a need to abort location sessions following an inter-AMF cell change or handover, and high network resource usage for periodic or triggered location sessions or to support location of a large number (e.g. millions) of mobile devices in the same timeframe.

To mitigate or avoid undesirable consequences associated with a traditional CP location solution (e.g. as used for 2G, 3G and 4G wireless access), a Location Management Function (LMF) based location solution may be used, as described herein, for CP location support for a 5G wireless network. The LMF based solution is also referred to herein as an "LMF solution", an "LMF based location solution", a "5G Core Network (5GCN) control plane (CP) location solution" or as a "5GCN location solution." In order to remain compatible with service based interfaces used in a 5GCN for other aspects of network operation, it may be beneficial to include service based interfaces as part of an LMF based solution. Unless specified otherwise herein, all procedures, methods, characteristics and interactions described below are to be assumed as applying to the LMF based solution.

FIG. 1 is a simplified block diagram illustrating a communication system 100 for non-roaming support of UE location using the 5GCN CP location solution. The non-roaming communication system 100 comprises a UE 105 and components of a Fifth Generation (5G) network comprising a Next Generation Radio Access Network (NG-RAN) 112, which includes base stations (BSs) sometimes referred to as New Radio (NR) NodeBs or gNBs 110-1, 110-2 and 110-3 (collectively and generically referred to herein as gNBs 110), and a 5G Core Network (5GCN) 150 that is in communication with an external client 130. A 5G network may also be referred to as a New Radio (NR) network; NG-RAN 112 may be referred to as an NR RAN or a 5G RAN; and 5GCN 150 may be referred to as an Next Generation (NG) Core network (NGC). Standardization of an NG-RAN and 5GCN is ongoing in the Third Generation Partnership Project (3GPP). Accordingly, NG-RAN 112 and 5GCN 150 may conform to current or future standards for 5G support from 3GPP. The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an AN or as a RAN, denoted by the term "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GCN 150 not shown in FIG. 1, or possibly via a Gateway Mobile Location Center (GMLC) 155, and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 105.

A location server, such as the LMF 152, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, OTDOA and ECID. The facilitation may include improving signal acquisition and measurement accuracy by UE 105 and, in some cases, enabling UE 105 to compute its estimated location based on the location measurements. For example, a location server (e.g. LMF 152) may comprise an almanac which indicates locations and identities of cellular transceivers and/or local transceivers in a particular region or regions such as a particular venue, and may provide information descriptive of signals transmitted by a cellular base station or AP (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), or a round trip signal propagation time (RTT) between UE 105 and a cellular transceiver (e.g. a gNB 110) or a local transceiver (e.g. a WiFi access point (AP)). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS Ephemeris information) received from a location server (e.g. LMF 152) or broadcast by a base station (e.g. a gNB 110) in NG-RAN 112 to determine a location for UE 105.

In the case of OTDOA, UE 105 may measure a Reference Signal Time Difference (RSTD) between signals such as a position reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to a location server (e.g. LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS or GNSS receiver at each transceiver to accurately obtain the common universal time.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110. Access to the 5G network is provided to UE 105 via wireless communication between the UE 105 and one or more of the gNBs 110, which may provide wireless communication access to the 5GCN 150 on behalf of the UE 105 using 5G (e.g. NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GCN 150. Thus, the NG-RAN 112 may include any combination of gNBs, eNBs, or other types of base stations or access points. As an example, NG-RAN 112 may include one or more next generation eNBs (ng-eNBs) 114 which provide LTE wireless access to UE 105 and may connect to entities in 5GCN 150 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), WLAN positioning, and/or other position methods. The LMF 152 may also process location service requests for the UE 105, e.g., received from the GMLC 155. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105). The LMF 152 may be referred to by other names such as a Location Manager (LM), Location Function (LF), commercial LMF (CLMF) or value added LMF (VLMF).

The GMLC 155 may support a location request for the UE 105 received from an external client 130 and may forward such a location request to the LMF 152. A location response from the LMF 152 (e.g. containing a location estimate for the UE 105) may be similarly returned to the GMLC 155 and the GMLC 155 may then return the location response (e.g., containing the location estimate) to the external client 130. GMLC 155 may contain subscription information for an external client 130 and may authenticate and authorize a location request for UE 105 from external client 130. GMLC 155 may further initiate a location session for UE 105 by sending a location request for UE 105 to LMF 152 and may include in the location request an identity for UE 105 and the type of location being requested (e.g. such as a current location or a sequence of periodic or triggered locations). In contrast to a traditional CP location solution where a GMLC 155 may send a location request for UE 105 to a serving AMF for UE 105 (e.g. AMF 154), GMLC 155 may only send a location request for UE 105 to an LMF such as LMF 152. This may reduce impacts to AMFs (e.g. AMF 154) and may enable more efficient location of UE 105 as described further down herein.

As further illustrated in FIG. 1, the LMF 152 and the gNBs 110 may communicate using a New Radio Position Protocol A (which may be referred to as NPPa or NRPPa). NRPPa may be defined in 3GPP TS 38.455 and may be the same as, similar to, or an extension of the LTE Positioning Protocol A (LPPa) defined in 3GPP Technical Specification (TS) 36.455, with NRPPa messages being transferred between the gNBs 110 and the LMF 152 via the AMF 154. As further illustrated in FIG. 1, LMF 152 and UE 105 may communicate using the LTE Positioning Protocol (LPP) defined in 3GPP TS 36.355, where LPP messages are transferred inside NAS transport messages between the UE 105 and the LMF 152 via the AMF 154 and a serving gNB 110-1 for UE 105. For example, LPP messages may be transferred between the LMF 152 and the AMF 154 using a transport protocol (e.g. IP based) or a service based operation (e.g. using the Hypertext Transfer Protocol (HTTP)), and may be transferred between the AMF 154 and the UE 105 using a 5G Non-Access Stratum (NAS) protocol. The LPP protocol may be used to support positioning of UE 105 using UE assisted and/or UE based position methods such as A-GNSS, RTK, WLAN, OTDOA and/or ECID. The NRPPa protocol may be used to support positioning of UE 105 using network based position methods such as ECID (when used with measurements obtained by a gNB 110 or received from a gNB 110 from UE 105) and/or may be used by LMF 152 to obtain location related information from gNBs 110 such as parameters defining positioning reference signal (PRS) transmission from gNBs 110 for support of OTDOA.

With a UE assisted position method, UE 105 may obtain location measurements (e.g. measurements of RSSI, RTT, RSTD, RSRP and/or RSRQ for gNBs 110, ng-eNB 114 or WLAN APs, or measurements of GNSS pseudorange, code phase and/or carrier phase for SVs 190) and send the measurements to a location server (e.g. LMF 152) for computation of a location estimate for UE 105. With a UE based position method, UE 105 may obtain location measurements (e.g. which may be the same as or similar to location measurements for a UE assisted position method) and may compute a location of UE 105 (e.g. with the help of assistance data received from a location server such as LMF 152 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ or TOA for signals transmitted by UE 105) and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GCN 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 110 (or supported by one or more ng-eNBs 114 or eNBs). The UE 105 may send the measurements back to the LMF 152 in an LPP message (e.g. inside a 5G NAS message) via the serving gNB 110-1 and the AMF 154.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP and/or NPP messages between UE 105 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management. Additionally, the GMLC 155 is connected to the Location Retrieval Function (LRF) 157, which handles retrieval of location information for the UE 105 and may be used to provide location information for UE 105 to an external client 130 that is a Public Safety Answering Point (PSAP), e.g. following an emergency call from UE 105 to the PSAP.

To support services including location services from external clients 130 for Internet of Things (IoT) UEs, a Network Exposure Function (NEF) 159 may be included in 5GCN 150. An NEF may also be referred to as a Service Capability Exposure Function (SCEF), e.g. for a UE 105 with LTE access to an EPC rather than 5G NR radio access to 5GCN 150. The NEF 159 may support secure exposure of capabilities and events concerning 5GCN 150 and UE 105 to an external client 130 and may enable secure provision of information from external client 130 to 5GCN 150. In the context of location services, NEF 159 may function to obtain a current or last known location for a UE 105, may obtain an indication of a change in location for a UE 105, or an indication of when a UE 105 becomes available (or reachable). An external client 130 may access NEF 159 directly or may access a Services Capability Server (SCS, not shown in FIG. 1), which may access NEF 159 on behalf of external client 130 in order to provide location information to the external client 130 for UE 105 via the SCS. The NEF 159 may be connected to the GMLC 155 to support last known location, current location and/or deferred periodic and triggered location for the UE 105. If desired, the NEF 159 may include, or may be combined with, the GMLC 155 and may then obtain location information for UE 105 directly from LMF 152 (e.g. may be connected to LMF 152). For example, in the procedures described later in association with FIGS. 13-16B, NEF 159 may replace HGMLC 155H or may be combined with HGMLC 155H.

Figure 2:
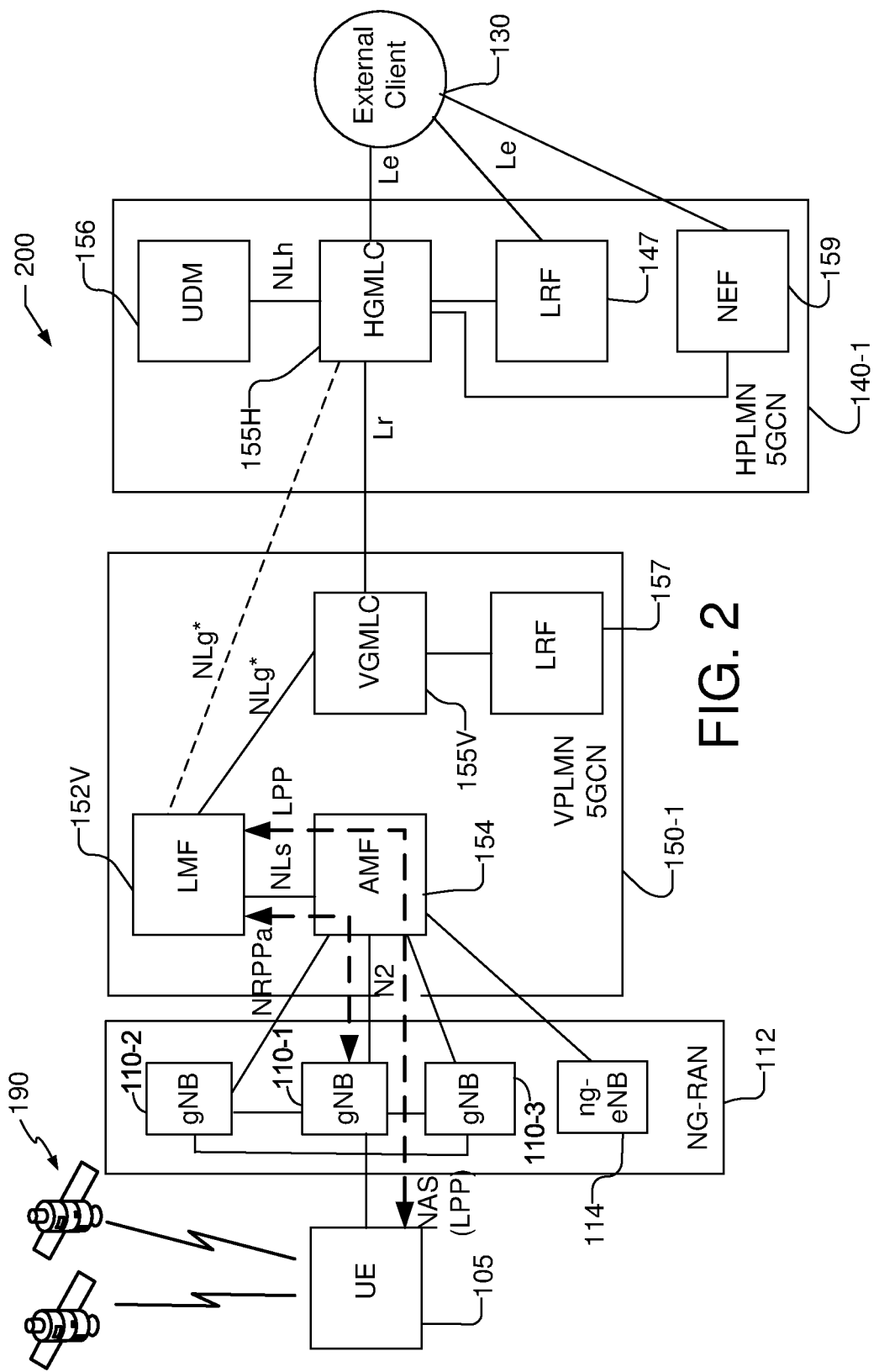
FIG. 2 is a block diagram illustrating a roaming reference architecture for an LMF based CP location solution in a wireless network.

FIG. 2 illustrates a communication system 200 that is similar to the communication system 100 shown in FIG. 1, but supports location for a roaming UE 105. In the communication system 200, the core network 5GCN 150-1 that is in communication with the UE 105 via the NG-RAN 112 is a visited network, i.e., Visited Public Land Mobile Network (VPLMN), which is in communication with a home network 5GCN, i.e., Home Public Land Mobile Network (HPLMN) 140-1. In communication system 200, the VPLMN 5GCN 150-1 includes the Location Management Function (LMF) 152V. Except as discussed below, the LMF 152V performs the same functions and operations as LMF 152 in the non-roaming communication system of FIG. 1, but is designated as LMF 152V to indicate that it is located in a visited network for UE 105. The VPLMN 5GCN 150-1 also includes a Visited Gateway Mobile Location Center (VGMLC) 155V, which is similar to the GMLC 155 in the non-roaming communication system of FIG. 1, and is designated as 155V to indicate that it is located in the visited network for UE 105. As illustrated in FIG. 2, the VGMLC 155V connects to the LMF 152V and to the LRF 157 in the VPLMN 5GCN 150-1.

As illustrated, HPLMN 5GCN 140-1 may include a Home GMLC (HGMLC) 155H that may be connected to the VGMLC 155V (e.g., via the Internet). Optionally (and as shown by the dashed line in FIG. 2), HGMLC 155H may be connected to LMF 152V (e.g. via the Internet) and may in that case not always be connected to VGMLC 155V. The HGMLC 155H may be similar to the GMLC 155 in the non-roaming communication system of FIG. 1, and is designated as 155H to indicate that it located in the home network for UE 105. The VGMLC 155V and HGMLC 155H may be sometimes collectively and generically referred to herein as GMLC 155. The HGMLC 155H is in communication with the external client 130, as well as the UDM 156 and LRF 147 in the HPLMN 140-1. The LRF 147 may also communicate with the external client 130 and may perform similar functions to LRF 157. The HGMLC 155H may provide location access to UE 105 on behalf of external clients such as external client 130. One or more of HGMLC 155H and LRF 147 may be connected to external client 130, e.g., through another network, such as the Internet. In some cases, a Requesting GMLC (RGMLC) located in another PLMN (not shown in FIG. 2) may be connected to HGMLC 155H (e.g., via the Internet) in order to provide location access to UE 105 on behalf of external clients connected to the RGMLC. HPLMN 5GCN 140-1 also includes NEF 159 which may correspond to NEF 159 in communication system 100 and may be connected to HGMLC 155H.

Figure 3:
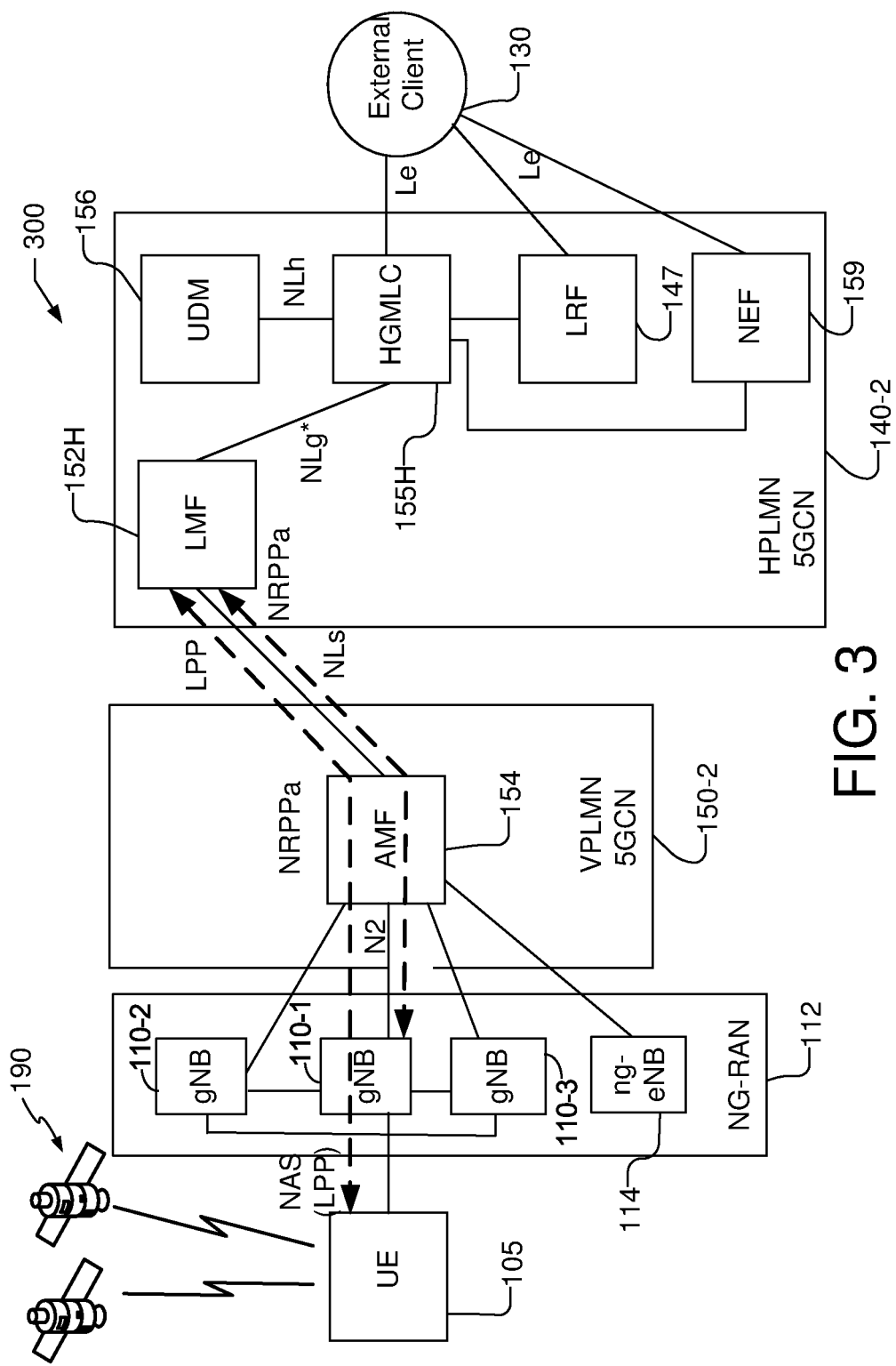
FIG. 3 is a block diagram illustrating another roaming reference architecture for an LMF based control plane (CP) location solution in a wireless network.

FIG. 3 illustrates another communication system 300 that is similar to the communication system 200 shown in FIG. 2 and provides alternative location support for a roaming UE 105. In the communication system 300, however, the LMF 152H is located in the HPLMN 5GCN 140-2 as opposed to the VPLMN 5GCN 150-2. The LMF 152H may perform the same or similar functions and operations as LMF 152 in the non-roaming communication system 100 of FIG. 1 and LMF 152V in the roaming communication system 200, but is designated as LMF 152H to indicate that it is located in the home network for UE 105. The LMF 152, 152V and 152H may be sometimes collectively and generically referred to herein as LMF 152. As illustrated in FIG. 3, the HGMLC 155H connects to LMF 152H. The LMF 152H also connects to the AMF 154 that is in the VPLMN 5GCN 150-2 (e.g. via the Internet). The HGMLC 155H also connects to the UDM 156, the LRF 147 and the NEF 159 in the HPLMN 140-2 and provides access on behalf of the external client 130.

To assist references to different interfaces and show correspondence to the EPC CP location solution defined in 3GPP TS 23.271, some interfaces in FIGS. 1-3 are labelled as NLx corresponding to an interface SLx for EPC (e.g. with NLs corresponding to SLs for EPC). The interfaces labelled as Le, N2, NLg*, NLs, Lr and NLh in FIGS. 1-3 may be interfaces that support control plane signaling and may be associated with control plane protocols that are used over one or more of the interfaces to support the control plane signaling. For example, a control plane protocol similar to or the same as the EPC Location Services (LCS) Protocol (ELP) defined in 3GPP TS 29.172 may be used between an LMF 152 and a GMLC 155 over an NLg* interface; a control plane protocol similar to the NAS Protocol defined in 3GPP TS 24.301 may be used between an AMF 154 and a UE 105 and possibly between an LMF 152 and an AMF 154 over an NLs interface; a CP NG Application Protocol (NGAP) defined 3GPP TS 38.413 may be used between an AMF 154 and a gNB 110 or ng-eNB 114 over an N2 interface; a CP LPP or NPP protocol may be used between a UE 105 and an LMF 152; and a CP supplementary service protocol (SSP, e.g. as defined in 3GPP TS 24.080) may be used between a UE 105 and an LMF 152 (e.g. to support supplementary service signaling as described later for FIGS. 13-16B).

As noted, while the communication systems 100, 200, and 300 are described in relation to 5G technology, the communication systems may be implemented to support other communication technologies, such as GSM, WCDMA, LTE, WiFi IEEE 802.11 etc., that are used for supporting and interacting with mobile devices such as the UE 105 (e.g., to implement voice, data, positioning, and other functionalities). For example, in some embodiments, 5GCN 150, 150-1 and/or 150-2 may be connected to a WLAN using a Non-3GPP InterWorking Function (N3IWF, not shown FIGS. 1-3) in the 5GCN 150. For example, the WLAN may support IEEE 802.11 WiFi access for UE 105. Here, the N3IWF may connect to the WLAN and to other elements in the 5GCN 150 such as AMF 154. The 5GCN CP location solution described herein may then operate the same as or similarly to that described further down with the difference that an LMF 152 may no longer interact with NG-RAN 112 to obtain location related information for UE 105 and may instead interact with UE 105 by sending and receiving LPP and/or NPP messages with UE 105 via the N3IWF and WLAN.

In other embodiments, the 5GCN cores 140-1 and 140-2 (collectively referred to as 5GCN 140) and 150, 150-1, 150-2 (collectively referred to as 5GCN 150) may be configured to control different air interfaces, such as the Evolved Universal Terrestrial Radio Access Network (E-UTRAN) comprising one or more evolved NodeBs (eNBs) in place of the gNBs 110. In some other embodiments, both the NG-RAN 112 and the 5GCN 140, 150 may be replaced by other RANs and other core networks. For example, in an Evolved Packet System (EPS) defined by 3GPP to support LTE access: the UE 105 may access the EPS rather than the NG-RAN 112 and 5GCN 140/150; the NG-RAN 112 may be replaced by an E-UTRAN containing eNBs in place of the gNBs 110; and the 5GCN 140/150 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar or identical to the VGMLC 155. In such an EPS, the E-SMLC may use LPPa in place of NRPPa to send and receive location information to and from the eNBs in the E-UTRAN and may use LPP to support positioning of UE 105. In addition, in some implementations, base stations (e.g. similar to or based on a gNB 110 or ng-eNB 114) may function as positioning only beacons and transmit signals (e.g. PRS) to assist positioning of a UE 105 but not receive signals.

In a traditional type of control plane (CP) location solution for a 5G wireless network, in either a roaming or non-roaming architecture, the AMF 154, as opposed to the LMF 152, may be connected to the GMLC 155. Similarly, the LMF 152 may be connected to the AMF 154 but not to the GMLC 155. Since the AMF 154 may be connected to both the LMF 152 and GMLC 155, the AMF 154 may serve as the main anchor point for location of the UE 105 as observed previously. Accordingly, a traditional CP location solution for a 5G network may be referred to as an AMF solution, an AMF based solution, a traditional AMF solution, or as an AMF-LMF solution. An AMF based solution has been defined by 3GPP in Release 15 (Rel-15) to support location of a UE in association with an emergency call from the UE to a PSAP.

With the 5GCN CP location solution exemplified in FIGS. 1-3, the AMF 154 may only be connected to the LMF 152 but not to the GMLC 155. However, the LMF 152 is connected to both the AMF 154 and the GMLC 155. Therefore, the LMF 152 may serve as the main anchor point for location of the UE 105 and the 5GCN CP location solution may be referred to as an LMF based solution as observed previously. Although the LMF based solution differs architecturally from the traditional AMF (or AMF-LMF) solution and from the traditional CP solution for LTE access defined in 3GPP TS 23.271, some of the same protocols may be used. For example, in the case of the NLg* interface (between a GMLC 155 and an LMF 152) for the LMF based solution, a protocol the same as or very similar to the EPC Location Protocol (ELP) defined in 3GPP TS 29.172 could be used to reduce impacts to a GMLC 155 in the case that the GMLC 155 is implemented based on a GMLC implementation for the traditional CP solution for LTE access. Similarly, the protocol used for the NLg* interface for the LMF based solution could be very similar or the same as a protocol used between the GMLC 155 and the AMF 154 for the traditional AMF solution for a 5G network, were both the LMF based solution and the traditional AMF solution to be defined by 3GPP for a 5G network. In addition, use and support of LPP/NPP and NRPPa positioning protocols for the LMF based solution could be the same as or similar to use and support of LPP/NPP and NRPPa positioning protocols for the traditional AMF solution, were both solutions to be defined by 3GPP.

The use of the AMF solution, however, may suffer from several undesirable restrictions and limitations. For example, one limitation may be that the AMF 154 is used as an anchor point for location support and is required to maintain state information for location sessions. Consequently, a location session for a UE 105 may need to be aborted following any inter-AMF handover or inter-AMF cell change for the UE 105. Moreover, using the AMF 154 as an anchor point for location support and requiring that it maintain state information may present a significant impact to the AMF 154 in terms of resource usage (e.g. processing and signaling) and/or implementation. Another limitation may be that some of the CP interfaces used by the AMF based solution may not be capable of being removed by combining entities that perform similar functions (e.g. such as combining the LMF 152 and a GMLC 155 in the same 5GCN). Combining entities could reduce complexity, but may not be possible with traditional CP location solutions. Additionally, in a traditional CP location solution for a 5G network, location access from the HPLMN (e.g. HPLMN 5GCN 140) may require inclusion of an LMF (e.g. LMF 152V) in a VPLMN (e.g. VPLMN EPC 150) and not allow inclusion of an LMF (e.g. LMF 152H) in the HPLMN which may add to impacts for the VPLMN. Consequently, customized HPLMN support for location (e.g. based on special requirements for a UE 105 or external client 130) may be limited, since the LMF 152V that is used to locate a UE 105 is in the VPLMN and not under the control of the HPLMN. Further, support of periodic or triggered location of a UE 105 may require the UE 105 and an AMF 154 to support supplementary services signaling and procedures (e.g. to enable a Mobile Originated Location Request (MO-LR) to be used by a UE 105 to report periodic or triggered locations as defined for LTE access in 3GPP TS 23.271), which may add additional complexity to the UE 105 and AMF 154.

As illustrated in FIG. 1 for non-roaming scenarios and in FIGS. 2 and 3 for roaming scenarios, the 5GCN CP location architectures differ from the traditional CP location solution in that the LMF 152 serves as the main anchor point for location rather than the AMF 154. One advantage of this is that a location session for a UE 105 may not need to be aborted following an inter-AMF handover or inter-AMF cell change for the UE 105 because the same LMF 152 may be used for location of the UE 105 both before and after the handover or cell change and may thus continue to support the location session. In addition, since the AMF 154 is no longer an anchor point for location support, state information in the AMF 154 may not be needed and resource usage (e.g. processing and signaling) and/or implementation impacts may be reduced. As another advantage, an LMF 152 may be combined with a GMLC 155 in the same 5GCN to reduce complexity—e.g. by avoiding a need to support an NLg* interface. Additionally, the LMF 152H can be in the HPLMN 5GCN 140 in the case of a roaming UE 105, as illustrated in FIG. 3, if an external client 130 accesses the HPLMN 5GCN 140 rather than the VPLMN 5GCN 150. This may have several advantages including allowing location support in the HPLMN 5GCN 140 more customized to a UE 105 and/or external client 130 subscription requirements and avoiding the need to support the Lr interface between HGMLC 155H and VGMLC 155V. However, when an external client 130 accesses the VPLMN 5GCN 150 (e.g. for location of an emergency call), the LMF 152V in the VPLMN 5GCN 150 can be used, as illustrated in FIG. 2. Further, support of periodic or triggered location of a UE 105 may not require the UE 105 and an AMF 154 to support supplementary services signaling and procedures (e.g. an MO-LR), which may reduce complexity for the UE 105 and AMF 154. These various advantages of the 5GCN CP location solution are illustrated in exemplary message flows for the 5GCN CP location solution described below with reference to FIGS. 6-16B. Unless stated otherwise below, the exemplary procedures and techniques below may be assumed to apply to the 5GCN (LMF based) location solution in one or more of the communication systems 100, 200 and 300.

Figure 4A:
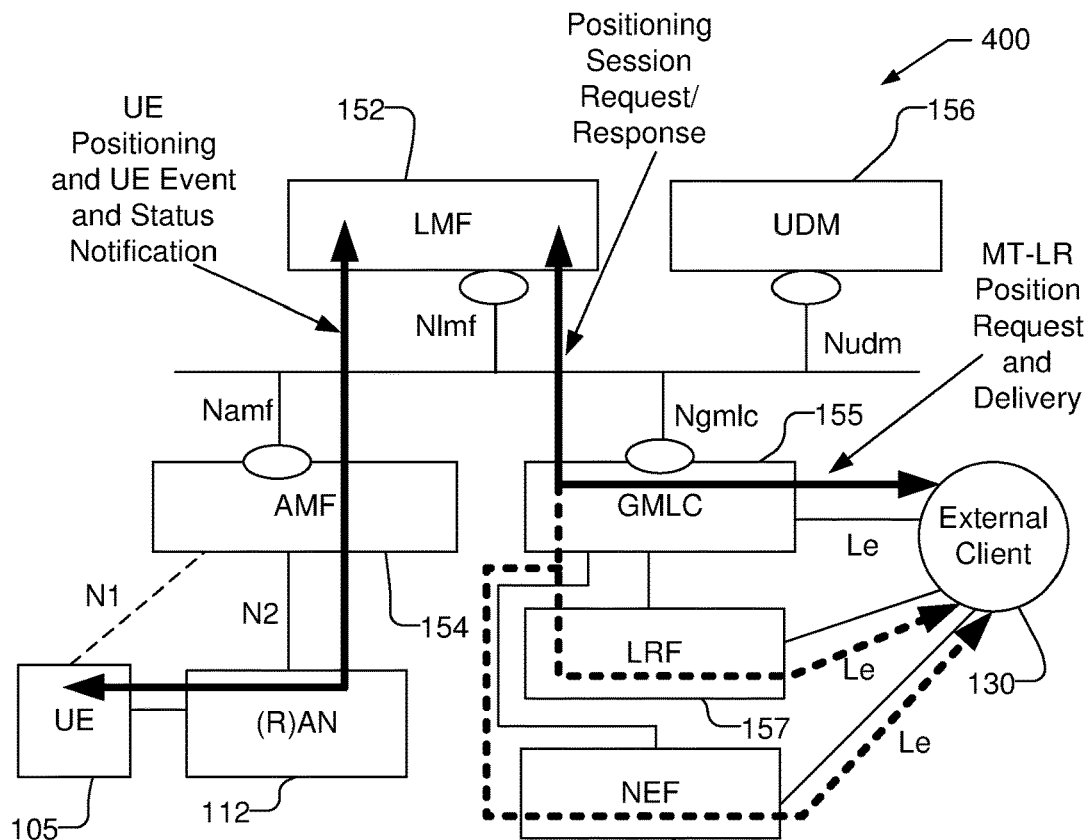
FIGS. 4A and 4B are block diagrams illustrating non-roaming and roaming reference architectures for an LMF based control plane (CP) location solution using service based interfaces.
Figure 4B:
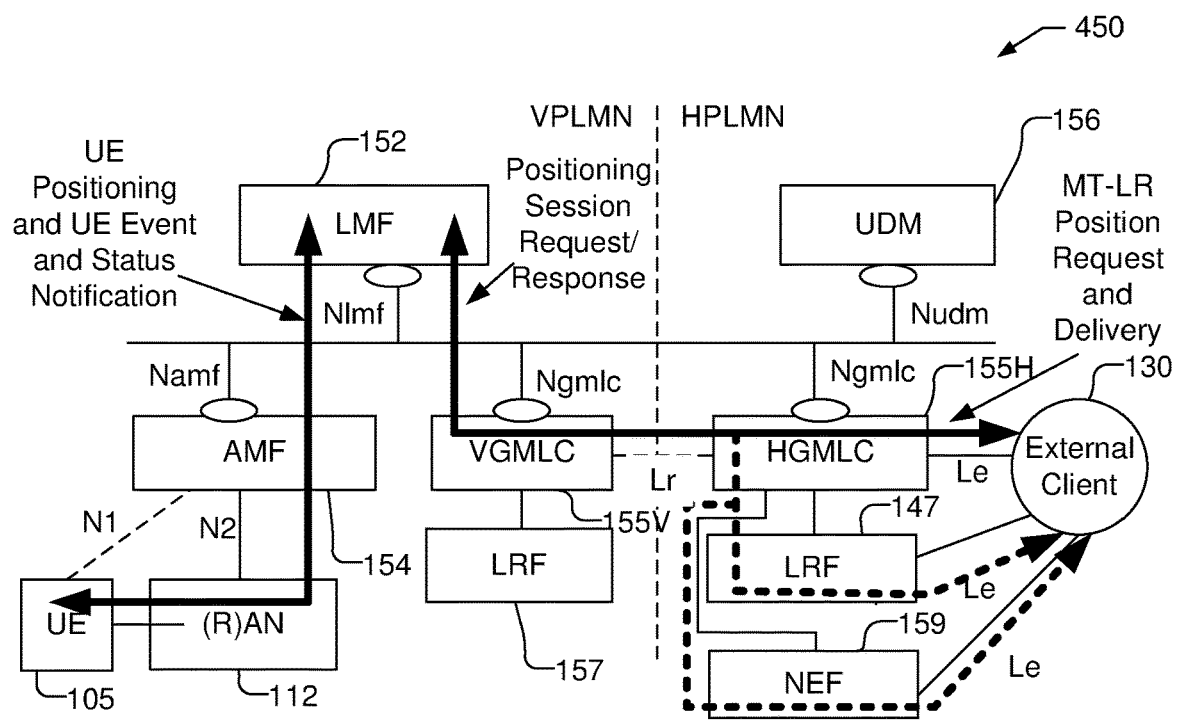

The use of a service based interface (SBI) architecture for 5GCN may be desirable. FIGS. 4A and 4B respectively illustrate a non-roaming SBI based architecture 400 and a roaming SBI based architecture 450 for an LMF based solution. The non-roaming and roaming SBI based architectures 400 and 450 also correspond to the non-roaming reference architecture 100 (shown in FIG. 1) and the roaming reference architecture 200 shown in FIG. 2, respectively, with like designated elements being the same. FIGS. 4A and 4B provide a high level indication of how the LMF 152 becomes the central point for location service. As illustrated in FIGS. 4A and 4B, service-based interfaces for location services are identified as Ngmlc for the service-based interface exhibited by a GMLC (e.g. GMLC 155, VGMLC 155V, and HGMLC 155H), Nlmf for the service-based interface exhibited by an LMF (e.g. LMF 152), Nudm for the service-based interface exhibited by a UDM (e.g. UDM 156), and Namf for the service-based interface exhibited by an AMF (e.g. AMF 154).

For the LMF based solution, reference points shown in FIGS. 1-4B that are not realized by service based interfaces include, e.g., N1 (reference point between UE 105 and AMF 154 via NAS); N2 (reference point between NG-RAN 112 and AMF 154); Le (reference point between a GMLC 155 and a LCS Client 130 (e.g. based on the Open Mobile Alliance (OMA) Mobile Location Protocol (MLP))); and Lr (reference point between a VGMLC 155V and HGMLC 155H (as based on use of the OMA Roaming Location Protocol (RLP)). Reference points that are realized by service based interfaces include NLg* (reference point between a GMLC 155 and an LMF 152); NLs (reference point between an AMF 154 and LMF 152); and NLh (reference point between a GMLC 155 and UDM 156). Service Based Interfaces shown in FIGS. 4A and 4B that are used by the LMF based solution include: Nlmf (service-based interface exhibited by LMF); Namf (service-based interface exhibited by AMF); and Nudm (service-based interface exhibited by UDM).

The LMF based solution may use certain existing service operations defined in 3GPP TS 23.502 for the Namf and Nudm service based interfaces. For the Nlmf service based interface (i.e. LMF SBI), two new service operations may be added as shown in Table 1.

TABLE 1

| | Nlmf Service Operations | | | |
|---|---|---|---|---|
| Service Name | Service Operations | Operation Semantics | Example Consumer | Corresponding Service Operations in 3GPP TS 23.502 |
| Nlmf_ProvideLocation | Obtain UE Location | Request/Response | GMLC | Namf_Location_ProvideLocation |
| Nlmf_EventNotify | Report a UE location related event | Notify | GMLC | Namf_Location_EventNotify |

The corresponding service operations from 3GPP TS 23.502 which are shown in the rightmost column of Table 1 may provide a very similar service except that they are provided by an AMF (e.g. AMF 154) instead of an LMF (e.g. LMF 152) and may be restricted to regulatory rather than commercial location. This may allow the protocol(s) developed at a stage 3 level for the Namf service operations in 3GPP TS 23.502 to be extended for use with the new LMF service operations. For example, HTTP based protocols being defined by 3GPP in 3GPP TS 29.518 to support AMF service operations for the traditional AMF based location solution, and comprising an Namf_Location Service ProvideLocation and EventNotify, may be extended and used to support LMF service operations as summarized in Table 1. In addition, the Nlmf_Location DetermineLocation service operation being defined by 3GPP in 3GPP TS 29.572 for the traditional AMF based location solution may not be needed for the LMF based solution.

Detailed procedures for the LMF based solution in support of emergency calls are provided in FIGS. 6-12 and are described later below. Detailed procedures for the LMF based solution in support of commercial location services (e.g. in a later 3GPP release) are provided in FIGS. 13-16B and are described later below.

Race Condition for Emergency Calls

Figure 5:
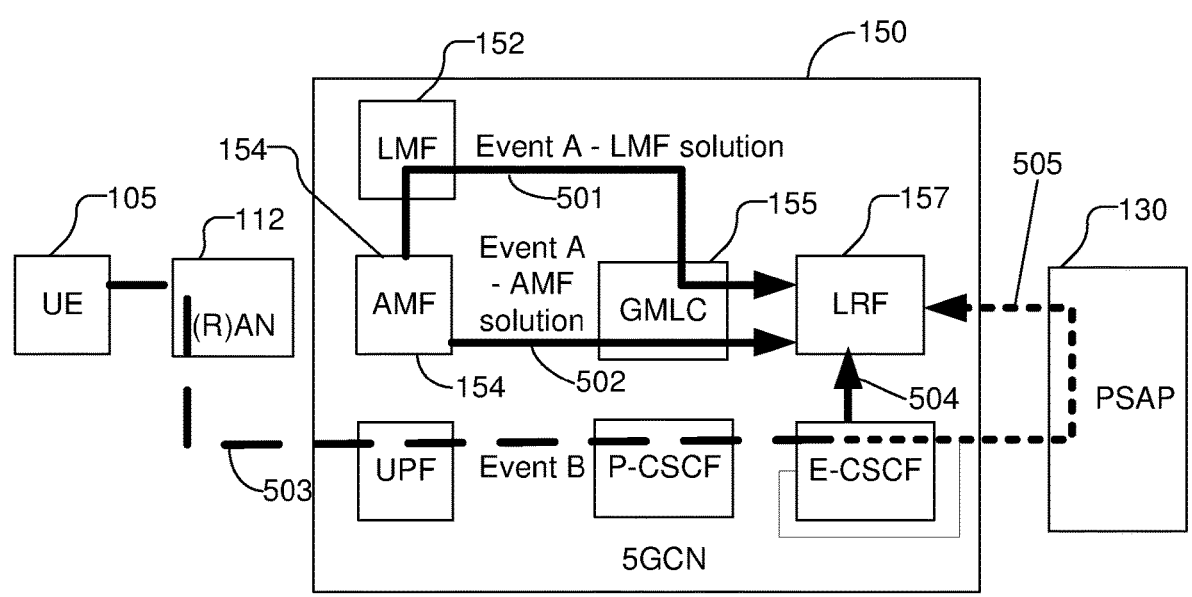
FIG. 5 is a block diagram illustrating a race condition for location of an emergency call.

A race condition for location of an emergency call can occur due to two different events arriving at an LRF following initiation of the emergency call over an IP Multimedia Subsystem (IMS). FIG. 5, by way of example, illustrates a race condition for the communication system 100 in FIG. 1. One event, referred to as event A, occurs when a GMLC 155 and then the LRF 157 are notified either (i) by the AMF 154 of the serving AMF 154 for an emergency call for the AMF based solution (502), or (ii) by the LMF 152 of the selected LMF 152 for the LMF based solution (501). This notification may be needed to allow the LRF 157 and a GMLC 155 to know which AMF 154 to query later for a UE 105 location with the AMF based solution or which LMF 152 to query later for a UE 105 location with the LMF based solution. The second event, referred to as event B, occurs after the UE 105 requests establishment of the emergency call (503) (e.g. in a SIP INVITE, e.g. which may be sent by UE 105 via a User Plane Function (UPF) to a Proxy Call Session Control Function (P-CSCF)) and the LRF 157 is requested either by an Emergency Call Session Control Function (E-CSCF) (504) or by a PSAP 130 (505) for location information (e.g. a location estimate) for the UE 105. Ideally, event A should occur before event B so that the LRF 157 is able to immediately instigate an MT-LR location request via a GMLC 155 towards the serving AMF 154 with the AMF based solution or towards the selected LMF 152 with the LMF based solution. However, it is possible (e.g. due to delay in an intermediate entity such as a GMLC 155) that event B occurs before event A. In that case the LRF 157 would have to wait for event A to occur before being able to send the MT-LR location request towards the serving AMF 154 or selected LMF 152. While such a race condition does not appear to prevent location determination, it may be seen as undesirable for implementation.

With the AMF based solution, the race condition may not be solvable, except via an implementation that prioritizes the transfer of event A. With the LMF based solution, there may be a solution to solve or mitigate the race condition. With this solution, each UE 105 can be assigned an LMF 152 that can be determined in advance by any entity including the LRF 157, a GMLC 155 and the serving AMF 154. The solution can use information present in a UE permanent identity (e.g. Subscription Permanent Identifier (SUPI), international mobile subscriber identity (IMSI), and/or International Mobile Equipment Identity (IMEI)) to select a particular LMF 152. For example, a hash function may be used to pseudo-randomly map certain or all digits from the SUPI, IMSI, or IMEI into a value range such as 0-9, 0-99, 0-999 etc. The resulting mapped value can then be used to select a particular LMF 152. For example, if the mapped value range is 0-999 and an operator has 4 LMFs, values 0-249 could be used to select the first LMF, values 250-499 to select the second LMF, values 600-749 to select the third LMF and values 750-999 to select the fourth LMF. The assignment can also take into account differing LMF capacities (e.g. by mapping more values to an LMF with higher capacity) and different preferences for UEs for different home PLMNs (e.g. by using a different value range mapping for certain PLMNs). Since this solution may pre-partition UEs to different LMFs, it may not support dynamic mapping and therefore it may not be possible to steer UEs away from heavily loaded LMFs for example. However, if LMF capacity is engineered to always exceed maximum location demand for emergency calls and assuming emergency call location is given priority in LMFs, this may not be a problem.

With the above solution, the GMLC 155/LRF 157 does not need to receive event A because the LMF 152 can be determined as soon as event B is received (from the UE identity). The LRF 157 will thus be able to send an MT-LR location query towards the determined LMF 152 as soon as event B occurs. Although there may in principle be a race condition at the LMF 152 due to possibly receiving an MT-LR location request for a UE 105 from the LRF 157 and GMLC 155 before the LMF 152 receives an emergency call notification event from the serving AMF 154, in practice, this may be very unlikely, because the emergency call notification to the LMF 152 from the serving AMF 154 only needs to pass directly from one entity to another whereas the MT-LR location request refers to an event that needs to pass through multiple entities before arriving at the LMF 152 (e.g. the P-CSCF, E-CSCF, LRF 157, GMLC 155 and possibly PSAP 130) and is therefore likely to arrive later.

In a variant of the solution just described, an AMF 154 may notify a common fixed LMF 152 whenever an emergency call is instigated at the AMF 154 for a UE 105 served by the AMF 154. The common fixed LMF 152 may then store the notification related information. When event B occurs at the LRF 157, the LRF 157 and GMLC 155 may request location information for the UE 105 from the common fixed LMF 152 which can be known by (e.g. configured in) the LRF 157 or GMLC 155. When the common fixed LMF 152 receives the location request from the GMLC 155, the common fixed LMF 152 may select another LMF to support the location and may transfer to the selected LMF both the information received from the AMF 154 (e.g. the AMF 154 address and UE 105 identity) and the location request received from the GMLC 155. The selected LMF may then obtain location information for the UE 105 (e.g. a location estimate) and may return the location information to the GMLC 155 either directly or via the common fixed LMF 152. The location information returned may also include the identity of the selected LMF which may be stored by the GMLC 155 or LRF 157. For a later location request for the same UE 105, the LRF 157 or GMLC 155 may send a request directly to the selected LMF rather than to the common fixed LMF 152.

UE Privacy Support

For an MT-LR for a single location of a target UE 105 or for periodic or triggered location, privacy requirements of the target UE 105 may need to be supported. For the LMF based solution, the HGMLC 155H can manage privacy either by being configured with UE 105 subscription requirements for privacy or by obtaining the UE 105 privacy subscription requirements from the UDM 156 as part of a UE routing query. The HGMLC 155H may then transfer the privacy requirements to the LMF 152. LMF 152 can then interact with the target UE 105 using existing supplementary service operations in 3GPP TS 24.080 to verify UE privacy requirement. With this approach, the AMF 154 does not need to be aware of or to provide any support for UE privacy.

UE and NG-RAN Positioning and Supplementary Services

For the LMF based solution, the UE 105 and LMF 152 can exchange positioning protocol (e.g. LPP or NPP) messages encapsulated in NAS transport messages via the AMF 154 and (R)AN 112. Similarly, messages for supplementary services (e.g. to support UE privacy or an MO-LR) can be exchanged in the same way between the UE 105 and LMF 152 via the AMF 154. The LMF 152 and (R)AN 112 can also exchange NRPPa (or NPPa) messages via the AMF 154 to support, e.g., AN and NG-RAN positioning procedures. Such interaction could be supported by the AMF 154 using the existing Namf_Communication SBI.

Selection of an LMF

For location of an emergency call or for an MO-LR, AMF 154 could select an LMF 152 for the LMF based solution. LMF 152 selection could be configured in the AMF 154, for example.

For an MT-LR for commercial location with the LMF based solution, a VGMLC 155V would need to select an LMF 152. Typically, the VGMLC 155V would obtain the address of the serving AMF 154 for a target UE 105 from an HGMLC 155H or by querying the UDM 156 but may not receive an LMF address. A number of alternatives, labelled A1-A4, for LMF 152 selection by a VGMLC 155V for an MT-LR procedure for the LMF based solution are as follows.

Alternative A1: if VGMLCs, LMFs and AMFs are fully interconnected (e.g. via an operator IP intranet), a VGMLC 155V may determine an LMF 152 based on any suitable criteria (e.g. location QoS, type of external client, VGMLC ID) independently of the serving AMF 154. As one example, a VGMLC 155V could be configured with all LMFs in the VPLMN 5GCN 150 and could select LMFs on a round robin basis.

Alternative A2: if an AMF 154 is allowed to use some but not all LMFs in the VPLMN 5GCN 150, a VGMLC 155V could be configured with the allowed LMFs for each AMF— and could then select an LMF 152 based on specific criteria as in alternative A1.

Alternative A3: a VGMLC 155V may use a Network Repository Function (NRF) in the VPLMN as defined in 3GPP TS 23.501 to request a set of available LMFs in the VPLMN 5GCN 150 and may then select one LMF 152 as in alternative A1. Use of the NRF service may support network slicing (e.g. similar to Session Management Function (SMF) selection as described in 3GPP TS 23.502) if a VGMLC 155V is provided with Single Network Slice Selection Assistance Information (S-NSSAI) for the target UE 105 by the HGMLC 155H or obtains an S-NSSAI from the UDM 156.

Alternative A4: when a UE 105 registers with the 5GCN 150, the serving AMF 154 could select an LMF 152 (e.g. using the NRF service and an S-NSSAI). The AMF 154 or the LMF 152 can then provide the LMF 152 address (or identity) to the UDM 156 (e.g. along with the AMF 154 address or identity). The UDM 156 can then provide the LMF 152 address to a querying HGMLC 155H (e.g. as at stage 3 in FIG. 13). The HGMLC 155H can the provide the LMF 152 address to the VGMLC 155V (e.g. as stage 4 in FIG. 13). This alternative might be supported only for a UE 105 from certain HPLMNs and/or UEs with a subscription to 5GC-MT-LR usage.

Determination of an AMF

With the LMF based solution, the UDM 156 could provide the current serving AMF 154 address to the HGLMC 155H or VGMLC 155V when queried to support an MT-LR or periodic/triggered MT-LR for a target UE 105. The serving AMF 154 address can then be provided by the VGMLC 155V or HGMLC 155H to the LMF 152 as part of the location request for UE 105. The LMF 152 can then instigate positioning procedures with the NG-RAN 112 and/or target UE 105 using existing Namf service operations to transport the associated positioning protocol messages through the known serving AMF 154.

If the serving AMF 154 becomes unavailable (e.g. goes out of service), the LMF 152 could select another AMF from the same AMF set as the previous serving AMF 154 using the NRF service.

Location Continuity with Inter-AMF Handover

With the LMF based solution, a location session for UE 105 may continue following change of AMF provided the LMF 152 is able to access the new AMF. The LMF may discover the new AMF either by subscribing to event notification from the old AMF 154 for a change of AMF using the Namf Event Exposure service operation or by querying the UDM 156 after an error occurs when attempting to transfer a message (e.g. a positioning protocol message) to the UE 105 or NG-RAN 112 via the old serving AMF 154.

In addition, with the LMF based solution, positioning that is already ongoing in a target UE 105 need not be disrupted by a change of AMF because the UE 105 could still return a response to the LMF 152 via the new AMF when the positioning is complete. This could be enabled if UE 105 includes the LMF 152 address (e.g. as a routing ID parameter) in a NAS transport message carrying a positioning protocol response that is returned to the new AMF by the UE 105. As AMF actions may be stateless with the LMF based solution, the new AMF could return the positioning protocol response to the LMF 152 without being aware that the positioning had been instigated earlier via the old AMF 154.

Scalability

With the LMF based solution, it can be possible (e.g. as shown later in association with FIGS. 15-16) to support periodic or triggered location for a target UE 105 using the same LMF 152 for all periodic or triggered location events. By avoiding both release of the LMF 152 after each periodic or triggered location and assignment of a new LMF (e.g. the same or a different LMF) for the next periodic or triggered location of the target UE 105, it can be possible to significantly reduce resource usage for the assignment and release support. It may also be possible to reuse information (e.g. location measurements, location estimates, serving cell IDs) available to the LMF 152 from previous periodic or triggered location events for UE 105 that may enable faster and/or more accurate location for future periodic or triggered location events for UE 105.

This may contrast with an AMF based solution, because with this solution, an LMF 152 may have to be assigned and then released for each separate periodic or triggered location event for a target UE 105—e.g. as is the case for the periodic and triggered EPC-MT-LR procedure for LTE access described in 3GPP TS 23.271 In addition an AMF based solution may require the initiation and release of a positioning session in the serving AMF 154 for each individual periodic or triggered location of a target UE 105—e.g. as is also the case for the periodic and triggered EPC-MT-LR procedure described in 3GPP TS 23.271.

This contrasting behavior may have significant consequences to scalability and to AMF and LMF resource usage. As one example, a PLMN operator may support ongoing periodic or triggered location for 100 million IoT UEs (e.g. associated with assets, packages in transit, people, vehicles, pets etc.) to enable users to track their locations. Each periodic or triggered location procedure in this example is assumed to last for an average of one week with an average of 10 locations per UE per day. Then with an AMF based location solution. where an AMF and LMF are assigned and released once for each location event, AMF and LMF assignment and release events could occur on average $(100,000,000*10)/(24*3600)=11574$ times per second. With the LMF based location solution, where an LMF is assigned and released once for a week long periodic and triggered location session, LMF assignment and release events could occur on average $100,000,000/(7*24*3600)=165$ times per second (and there could be zero assignment and release of AMFs). There may be other operations that could occur at the higher 11574 per second rate with both solutions (e.g. such as transfer of positioning protocol messages through a serving AMF and NG-RAN) but there may be no significant difference between the two solutions with regard to these (and the message transfer may not be processor intensive). However, the LMF based solution can avoid most of the overhead of assigning and releasing an LMF and may avoid all such overhead for an AMF.

A further advantage of the LMF based solution for periodic or triggered location of a target UE 105 is that it may be unnecessary to support supplementary service interaction between an LMF 152 and UE 105 in order to instigate a periodic or triggered location or to report periodic or triggered location events by a UE 105 to an LMF 152. This is shown by the optimized procedure described later for FIGS. 16A-16B and could enable reduced implementation of periodic and triggered location support in a UE 105 and LMF 152 and reduced processing (and thus better performance). This benefit may not be possible with an AMF based location solution because it could be the AMF 154 which would interact with a target UE 105 to instigate a periodic or triggered location in the UE 105 and receive periodic or triggered location events from a UE 105, which could require the use of supplementary service messages.

Figure 16B:
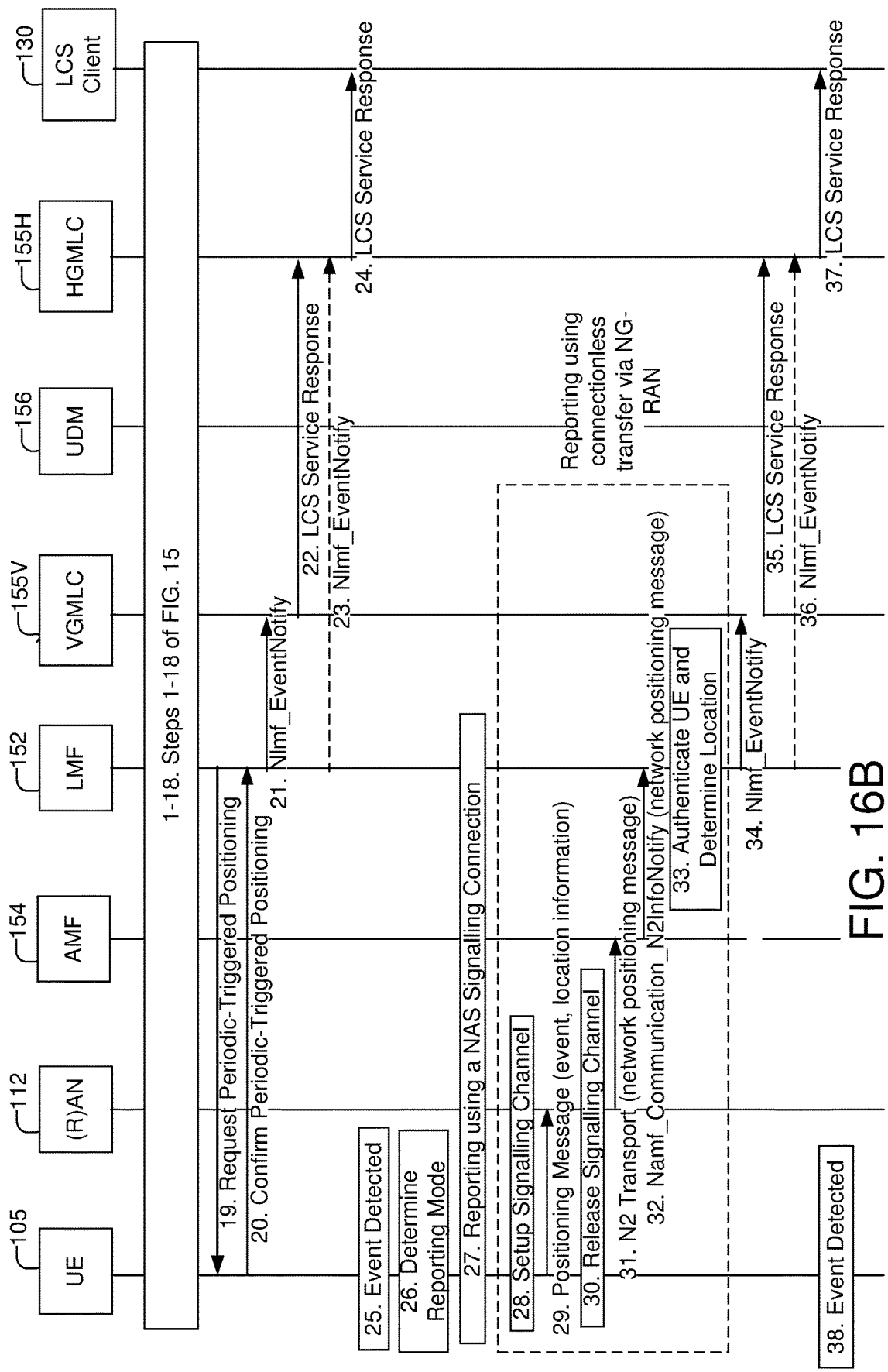
FIG. 16B shows a low power variant of the optimized MT-LR procedure shown in FIG. 16A for a roaming UE to support periodic and triggered location.

Thus, the LMF based solution may be more scalable than an AMF based location solution for support of periodic or triggered MT-LR location of a target UE 105 and may enable reduced implementation in a UE 105 and LMF 152 with the optimized procedure in FIGS. 16A and 16B.

Maintaining Compatibility with E-UTRAN, UTRAN, GERAN

For an MT-LR, a target UE 105 could in principle be served by two or more of a GERAN, UTRAN, E-UTRAN or NG-RAN 112 in some PLMNs. This is resolved in 3GPP TS 23.271 by allowing a GMLC (e.g. HGMLC 155H) to query an HLR/HSS for the address of a serving node (e.g. MSC, SGSN or MME) for a target UE 105 and having the GMLC then initiate the appropriate request (e.g. using the Mobile Application Part (MAP) protocol or ELP) to the serving node. A solution comparable with this may be needed for 5GCN 150 (e.g. for an operator with multiple RATs). For example, if UE 105 subscription and registration data for NG-RAN 112 access is stored in the UDM 156 but not in an HLR/HSS and if UE 105 subscription and registration data for GERAN, UTRAN and E-UTRAN access is stored in the HLR/HSS but not UDM 156, then two alternative solutions may be used, denoted B1 and B2.

Alternative B1: if there is no data sharing between UDM 156 and the HLR/HSS, then a GMLC 155 could query both the UDM 156 and HLR/HSS to obtain serving node information for a UE 105. When more than one serving node is provided, the GMLC 155 can decide (e.g. based on a configured operator preference) which serving node to query.

Alternative B2: if UDM 156 and the HLR/HSS can share data (e.g. by proprietary means), then a GMLC 155 may only query one of these entities to obtain serving node information for a UE 105 for all access types. To avoid impacts to existing protocols and entities, the combined query might be supported only by the UDM 156.

Example Location Procedures for the LMF Based Location Solution Using SBI Operations In FIGS. 6-16B, the communication system 100 and/or 200 and the SBI architecture shown in FIGS. 4A-4B are generally assumed in the description of procedures for locating or helping to locate a target UE 105.

Figure 6:
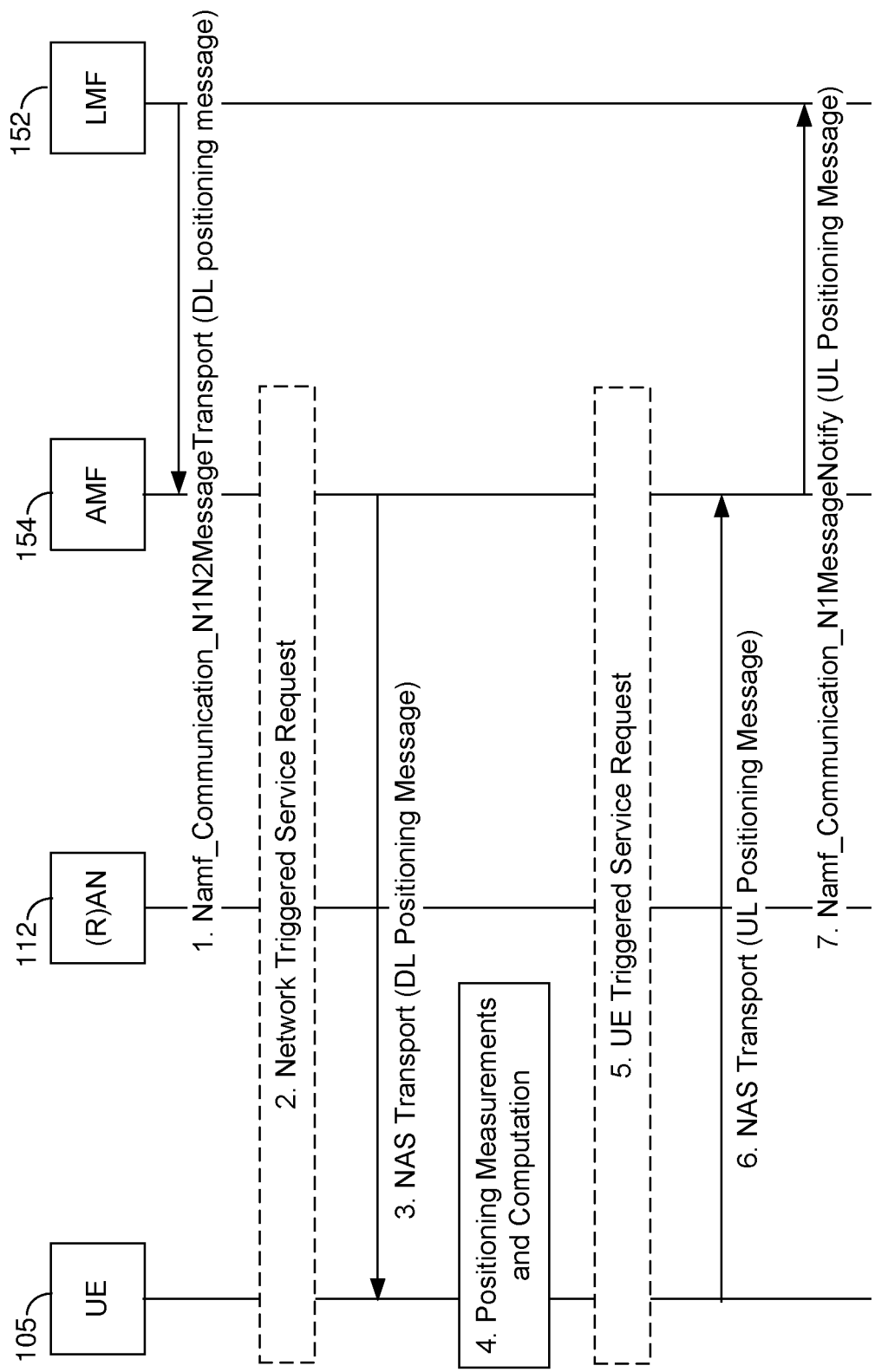
FIG. 6 shows a positioning procedure used by an LMF to support UE based positioning, UE assisted positioning and delivery of assistance data.

FIG. 6 shows a positioning procedure used by an LMF 152 to support UE based positioning, UE assisted positioning and delivery of assistance data. The procedure is based on use of the LPP protocol, defined in 3GPP TS 36.355, "LTE Positioning Protocol (LPP)", between the LMF 152 and UE 105, though could instead be NPP or LPP combined with NPP. A precondition for the procedure can be that a UE 105 identifier and an AMF 154 identity have been passed to the LMF 152 by the serving AMF 154. The UE identifier may be a SUPI or a 5G Temporary Mobile Subscription Identifier (5G-TMSI). The UE identifier and AMF 154 identity may be passed when the AMF 154 informs the LMF 152 of an emergency call as in FIG. 9, below. It is noted that the terms identity, identifier and address can be the same and are used interchangeably herein.

At stage 1 in FIG. 6, the LMF 152 invokes the Namf_Communication_N1N2MessageTransport service operation towards the AMF 154 to request the transfer of a Downlink (DL) Positioning message (e.g. LPP message) to the UE 105. The service operation includes the DL Positioning message and the UE 105 identifier. The Downlink Positioning message may request location information from the UE 105, provide assistance data to the UE 105 or query for the UE 105 capabilities.

At stage 2, if the UE 105 is in a CM IDLE state, the AMF 154 initiates a network triggered Service Request procedure as defined in 3GPP TS 23.502 to establish a signaling connection with the UE 105.

At stage 3, the AMF 154 forwards the Downlink Positioning message to the UE 105 in a NAS Transport message. The AMF 154 includes a Routing identifier, in the NAS transport message, identifying the LMF 152 (e.g. a global address of the LMF 152 such as an IP address).

At stage 4, the UE 105 stores any assistance data provided in the Downlink Positioning message and performs any positioning measurements and location computation requested by the Downlink Positioning message.

At stage 5, if the UE 105 is in CM-IDLE state, the UE 105 instigates the UE triggered Service Request as defined in 3GPP TS 23.502 in order to establish a signaling connection with the AMF 154.

At stage 6, the UE 105 returns any location information obtained in stage 4 or returns any capabilities requested in stage 3 to the AMF 154 in an Uplink Positioning message (e.g. an LPP message) included in a NAS Transport message. The Uplink Positioning message may alternatively carry a request for further assistance data. The UE 105 also includes the Routing identifier in the NAS Transport message received in stage 3.

At stage 7, the AMF 154 invokes the Namf_Communication_N1MessageNotify service operation towards the LMF indicated by the routing identifier received in stage 6 (which in this example is LMF 152). The service operation includes the Uplink Positioning message received in stage 6 and the UE 105 identifier. Stages 6 and 7 may be repeated if the UE 105 needs to send multiple messages to respond to the request received in Stage 3. Stages 1 to 7 may be repeated to send new assistance data, and to request further location information and further UE capabilities.

Figure 7:
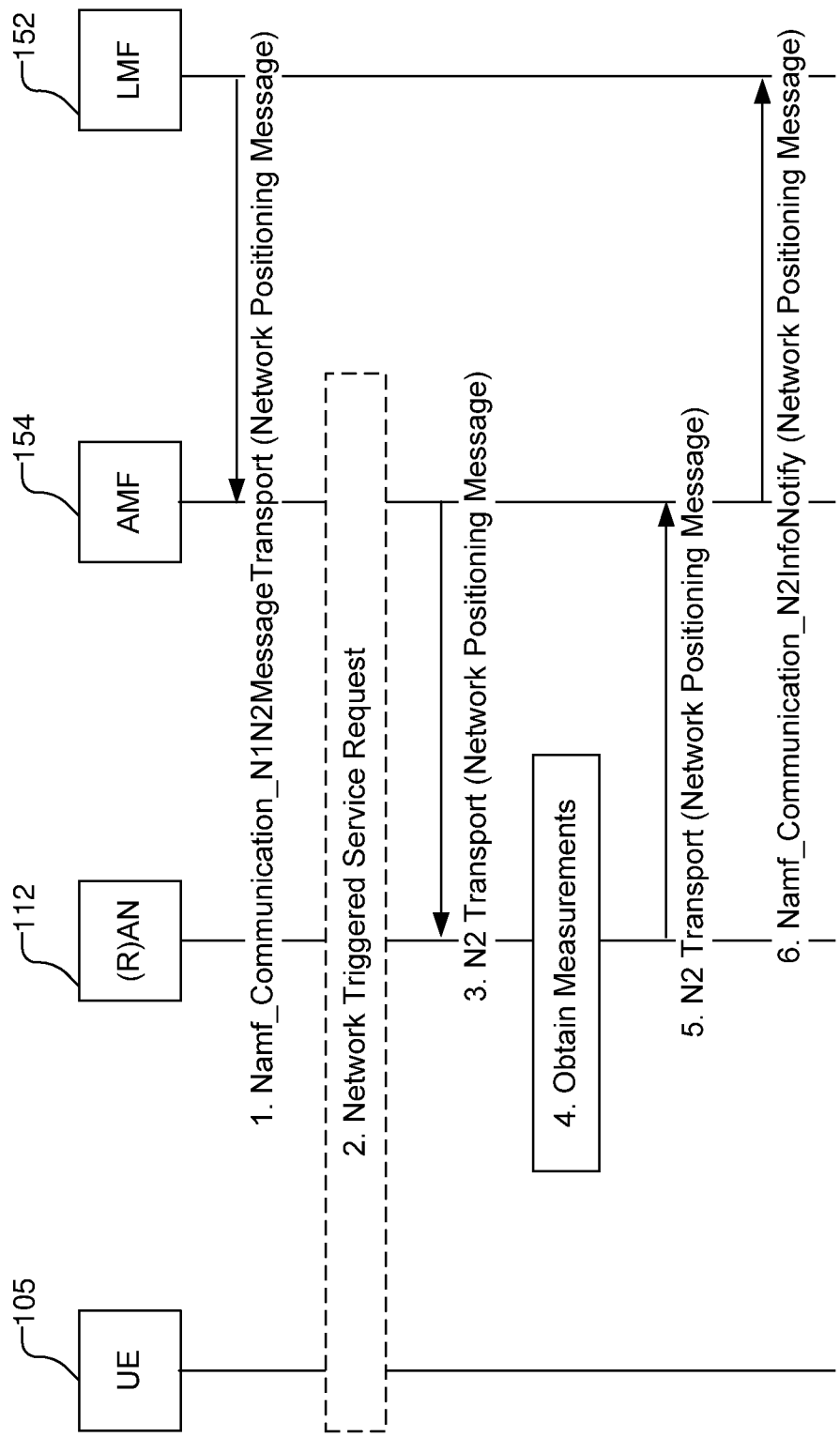
FIG. 7 shows a procedure that may be used by an LMF to support network assisted and network based positioning.

FIG. 7 shows a procedure that may be used by an LMF 152 to support network assisted and network based positioning. The procedure may be based on an NRPPa protocol defined in 3GPP TS 38.455, "NR Positioning Protocol A (NRPPa)" between the LMF 152 and (R)AN 112. A precondition for the procedure can be that a UE 105 identifier and an AMF 154 identity have been passed to the LMF 152 by the serving AMF 154. The UE 105 identifier may be a SUPI or a 5G-TMSI. The UE 105 identifier and AMF 154 identity may be passed when the AMF 154 informs the LMF 152 of an emergency call as in FIG. 9, below.

At stage 1 in FIG. 7, the LMF 152 invokes the Namf_Communication_N1N2MessageTransport service operation towards the AMF 154 to request the transfer of a Network Positioning message (e.g. an NRPPa message) to the serving base station (e.g. gNB 110 or ng-eNB 114) for the UE 105. The service operation includes the Network Positioning message and the UE 105 identifier. The Network Positioning message may request location information for the UE 105 from the (R)AN 112.

At stage 2, if the UE 105 is in CM IDLE state, the AMF 154 initiates a network triggered Service Request procedure as defined in 3GPP TS 23.502, to establish a signaling connection with the UE 105.

At stage 3, the AMF 154 forwards the Network Positioning message to the serving base station in an N2 Transport message. The AMF 154 includes a Routing identifier, in the N2 Transport message, identifying the LMF 152 (e.g. a global address of the LMF 152).

At stage 4, the serving base station obtains any location information for the UE 105 requested in stage 3.

At stage 5, the serving base station returns any location information obtained in stage 4 to the AMF 154 in a Network Positioning message included in an N2 Transport message. The serving base station also includes the Routing identifier in the N2 Transport message received in stage 3.

At stage 6, the AMF 154 invokes the Namf_Communication_N2InfoNotify service operation towards the LMF 152 indicated by the routing identifier received in stage 5. The service operation includes the Network Positioning message received in stage 5 and the UE 105 identifier. Stages 1 to 6 may be repeated to request further location information and further (R)AN capabilities.

Figure 8:
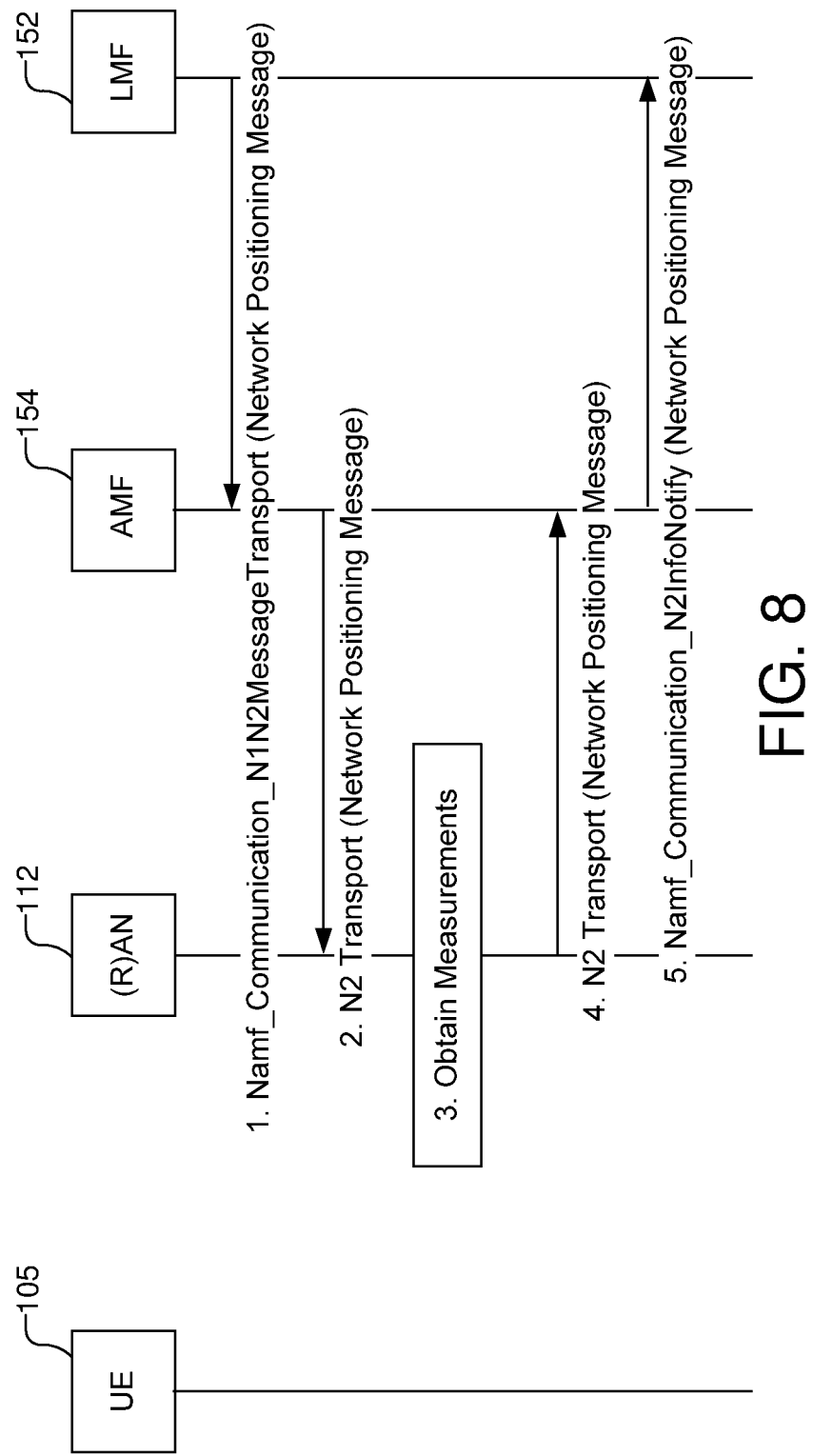
FIG. 8 shows a procedure which may be used by an LMF to obtain location related information from a base station.

FIG. 8 shows a procedure which may be used by an LMF 152 to support positioning of one or more UEs such as UE 105. This procedure may not be associated with a UE 105 location session. It may be used to obtain network assistance data from a base station (e.g. gNB 110 or ng-eNB 114). The procedure may be based on an NRPPa protocol defined in 3GPP TS 38.455, "NR Positioning Protocol A (NRPPa)" between the LMF 152 and (R)AN 112.

At stage 1 in FIG. 8, the LMF 152 invokes the Namf_Communication_N1N2MessageTransport service operation towards the AMF 154 to request the transfer of a Network Positioning message (e.g. an NRPPa message) to a base station (e.g. gNB 110 or ng-eNB 114) in the (R)AN 112. The service operation includes the Network Positioning message and the target base station identity. The Network Positioning message may request position related information from the (R)AN.

At stage 2, the AMF 154 forwards the Network Positioning message to the target base station indicated in stage 1 in an N2 Transport message. The AMF 154 includes a Routing identifier, in the N2 Transport message, identifying the LMF 152 (e.g. a global address of the LMF 152).

At stage 3, the target base station obtains any position related information requested in stage 2.

At stage 4, the target base station returns any position related information obtained in stage 3 to the AMF 154 in a Network Positioning message included in an N2 Transport message. The target base station also includes the Routing identifier in the N2 Transport message received in stage 2.

At stage 5, the AMF 154 invokes the Namf_Communication_N2InfoNotify service operation towards the LMF 152 indicated by the routing identifier received in stage 4. The service operation includes the Network Positioning message received in stage 4 and possibly the target base station identity. Stages 1 to 5 may be repeated to request further position related information from the (R)AN 112.

Figure 9:
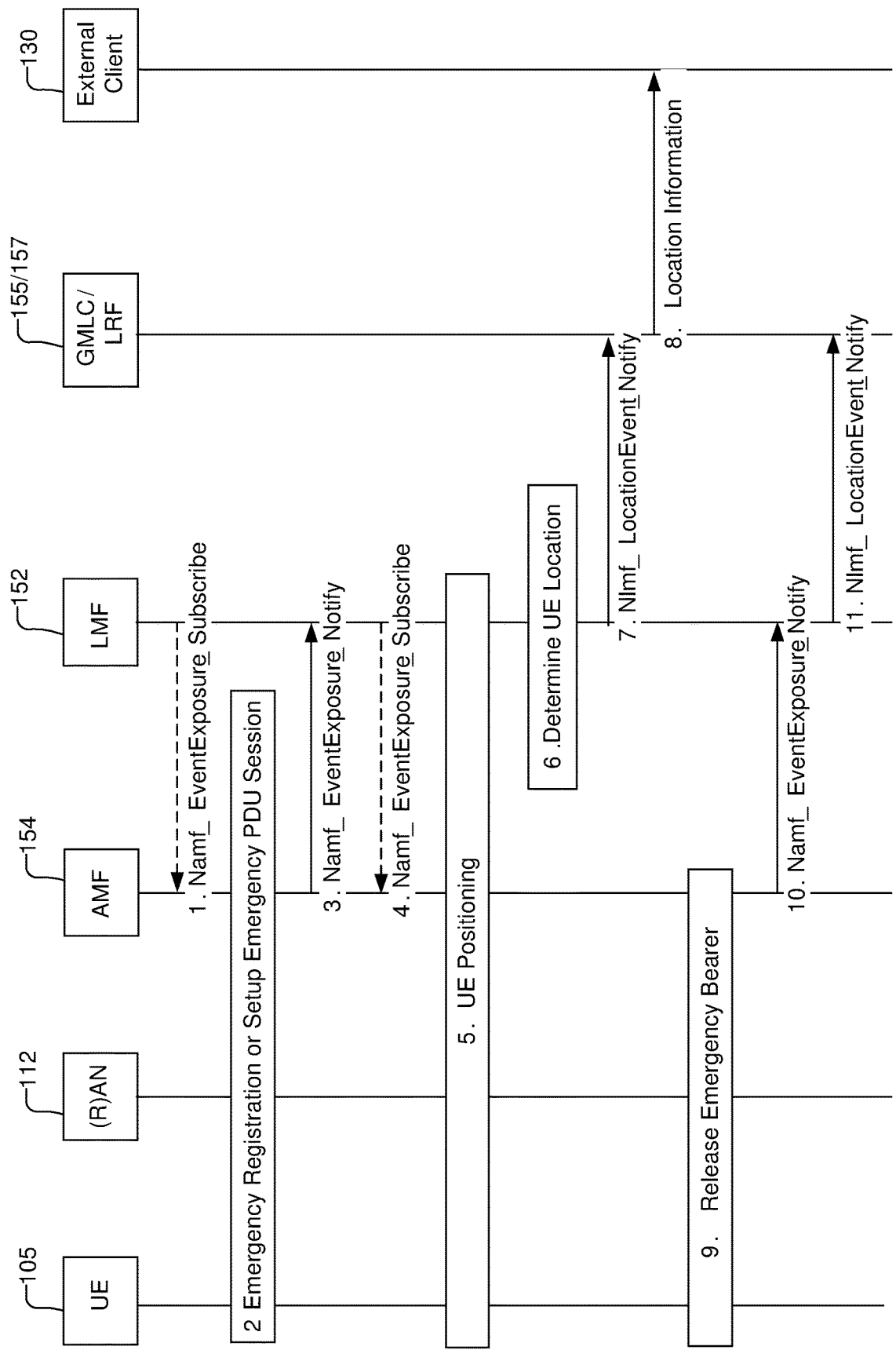
FIG. 9 shows a Network Induced Location Request (NI-LR) procedure for a roaming or non-roaming UE in the case where the UE initiates an emergency call.

FIG. 9 shows a Network Induced Location Request (NI-LR) procedure for a roaming or non-roaming UE 105 in the case where the UE 105 initiates an emergency call using (R)AN 112. The procedure assumes that the serving AMF 154 is aware of the emergency call initiation—e.g. due to supporting an emergency registration procedure or assisting in establishing an emergency PDU Session.

At stage 1 in FIG. 9, an LMF 152 may subscribe with an AMF 154 to receive notification of events related to establishment of an emergency PDU Session for any UE, or the subscription may be implicit and not be required explicitly.

At stage 2, the UE 105 registers with the 5GCN 150 for emergency services or requests the establishment of an emergency PDU Session.

At stage 3, the AMF 154 selects an LMF 152 in the VPLMN 5GCN 150 (e.g. based on LMF 152 support for emergency services, based on a serving cell ID for UE 105 or based on a current serving RAT for UE 105 such as NR or LTE) and invokes the Namf_EventExposure_Notify service operation towards the LMF 152 to notify the LMF 152 of an emergency call initiation by UE 105. The service operation includes the SUPI, the current cell ID and possibly the 5G-TMSI for UE 105. It is noted that the AMF 154 may use an NRF service to find and select an available LMF in the VPLMN 5GCN 150.

At stage 4, the LMF 152 may subscribe to notification by the AMF 154 of additional events for the UE 105 including release of the emergency PDU Session, handover of the emergency PDU Session and change of serving cell for UE 105, or the subscription may be implicit and not be required explicitly. If an immediate location of the UE 105 is not needed, the LMF 152 skips stages 5 and 6 and proceeds to stage 7.

At stage 5, the LMF 152 performs one or more of the positioning procedures described in reference to FIGS. 6-8.

At stage 6, the LMF 152 determines (e.g. calculates) a location estimate for the UE 105 based on information obtained in stages 3 and 5. The LMF 152 may cache the location estimate and/or information obtained for UE 105 in stages 3, 5 and 6 for future location operations for UE 105.

At stage 7, the LMF 152 selects a VGMLC 155 (e.g. using the serving cell identity for UE 105 or the location determined in stage 6 or according to some fixed association with the LMF 152). The LMF 152 invokes an Nlmf_Location-Event_Notify service operation towards the VGMLC 155 to notify the VGMLC 155 of an emergency call initiation for UE 105. The service operation includes the SUPI for UE 105, the identity of the LMF 152, an indication of an emergency call and any location obtained in stage 6. It is noted that the LMF 152 may use the NRF service to find and select an available VGMLC 155. It is further noted that the VGMLC 155 could update an LRF 157 with the identity of the LMF 152 following stage 7 to allow the LRF 157 to request the location of the UE 105 using an MT-LR at a later time as described in reference to FIG. 10. It is noted that if LMF 152 selection is based on a UE 105 identity or UE 105 HPLMN 140 identity such that the VGMLC 155 and/or LRF 157 can determine the LMF 152 without being notified by the LMF 152, as described in association with FIG. 5, then invocation of the Nlmf_LocationEvent_Notify service operation in stage 7 and possibly stage 11 is not needed.

At stage 8, the VGMLC 155 or LRF 157 forwards the location of UE 105 (if received at stage 7) to an external emergency services client 130 or may wait for a request for the location from the external emergency services client 130 (not shown in FIG. 9) before forwarding the location.

At stage 9, the emergency services call and emergency PDU Session for UE 105 are released.

At stage 10, the AMF 154 invokes the Namf_EventExposure_Notify service operation to the LMF 152 to notify the LMF 152 of the emergency call release and includes the SUPI for UE 105. The LMF 152 releases any local resources associated with the emergency call.

At stage 11, the LMF 152 invokes the Nlmf_LocationEvent_Notify service operation towards the VGMLC 155 to notify the VGMLC 155 that the emergency call for UE 105 was released to enable the VGMLC 155 and LRF 157 to release any resources associated with the emergency call.

Figure 10:
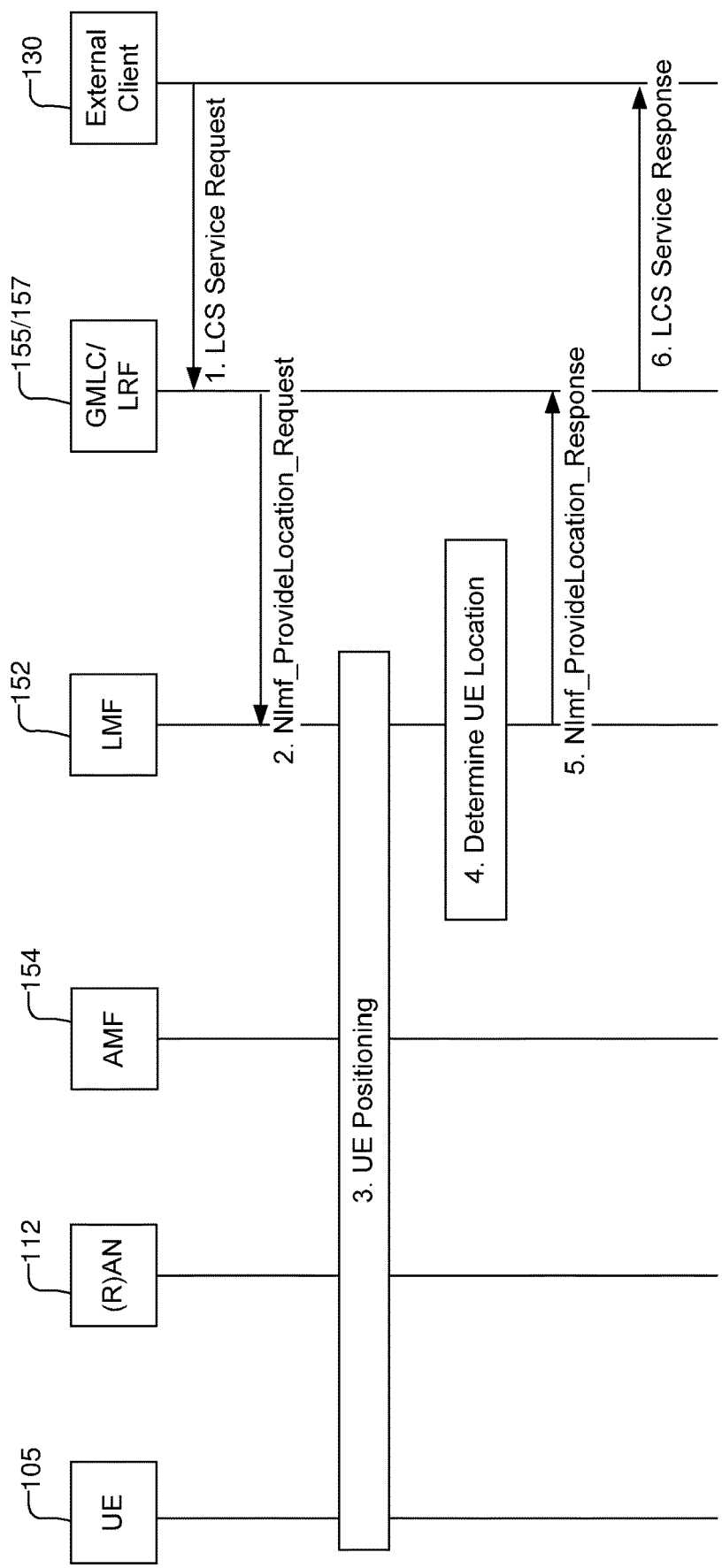
FIG. 10 illustrates a location request for an emergency services call.

FIG. 10 illustrates a location request for an emergency services call for UE 105, where an emergency services client 130 (e.g. a Public Safety Answering Point) identifies the target UE 105 and the serving LRF 157 using correlation information that was previously provided to it by an IMS Core for 5GCN 150 when the emergency call for UE 105 was established. The signaling used to provide the correlation information to the PSAP 130 is defined in 3GPP TS 23.167, "IP Multimedia Subsystem (IMS) emergency sessions". The correlation information may be used by the LRF 157 to retrieve other information previously provided to it by the IMS Core and/or by LMF 152 as described for FIG. 9. This may allow the VGMLC 155 associated with the LRF 157 to request a location from the LMF 152 without needing to select the LMF 152 or query the home UDM 156 of the target UE 105 for the serving AMF 154 address. This scenario may therefore support location of emergency calls for a roaming UE 105, a UE 105 without a Universal Subscriber Identity Module (USIM) or some other non-registered UE 105, and may require that identifying information for the UE 105 and LMF 152 have been provided to the VGMLC 155/LRF 157 as described in reference to FIGS. 9 and 11.

At stage 1 in FIG. 10, the external emergency services client 130 (e.g. a PSAP) sends a request to the LRF 157 for a location for the target UE 105 and includes correlation information identifying the target UE 105. The LRF 157 address and the correlation information may have been previously provided to the external client 130 when the emergency call from the UE 105 was established.

Figure 11:
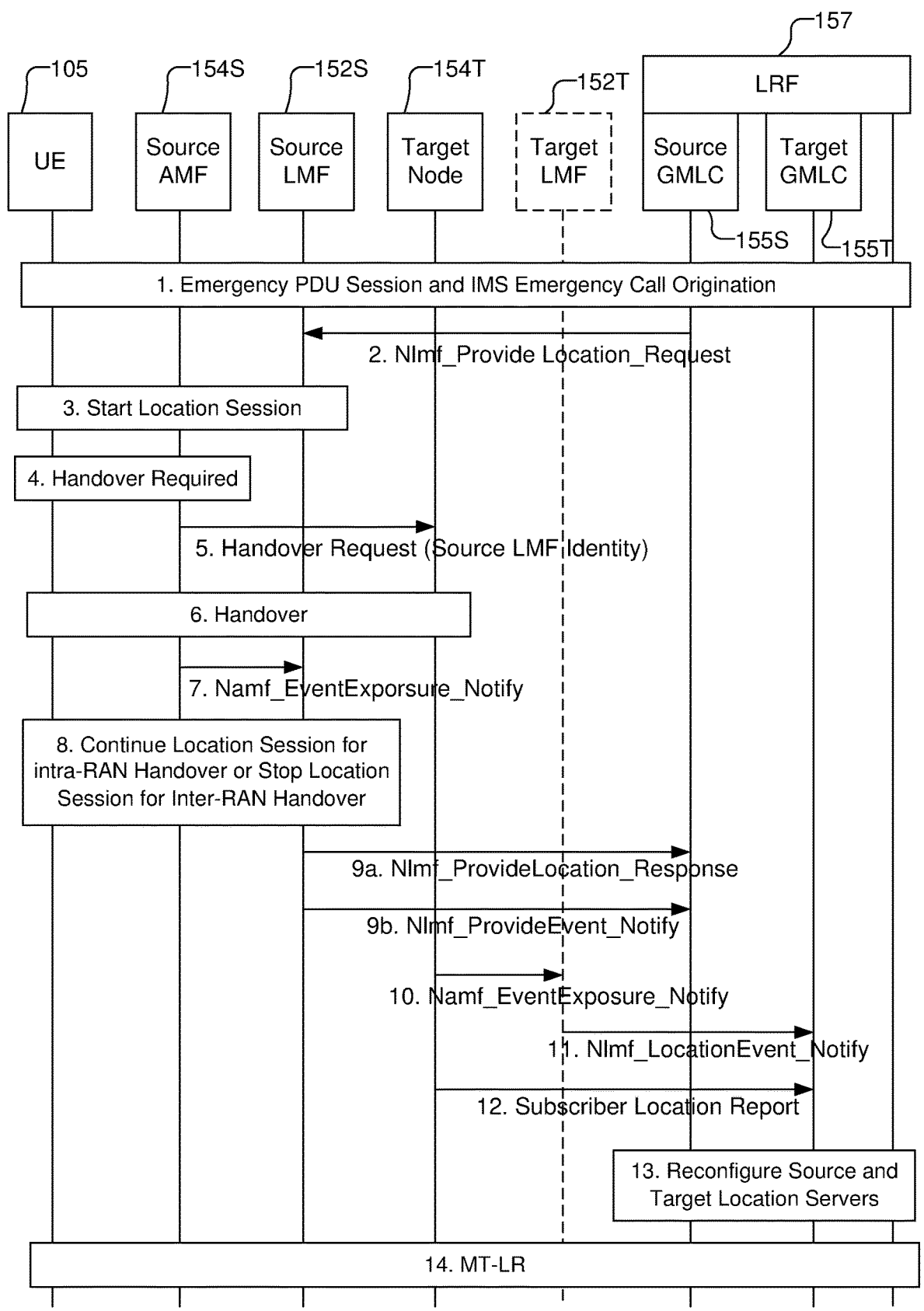
FIG. 11 shows support for location continuity for handover of an IMS emergency call from NG-RAN on a source side.

At stage 2, the LRF 157/VGMLC 155 determines the LMF 152 by associating the correlation information received from the external client 130 with other information received previously from the LMF 152 as described in reference to FIGS. 9 and 11. The VGMLC 155 invokes the Nlmf_ProvideLocation_Request service operation towards the LMF 152 to request the current location of the UE 105. The service operation includes the SUPI for UE 105, the required QoS and an indication of a location request from an emergency services client. The LMF 152 identifies the target UE 105 using the SUPI. In case of an emergency call for a non-registered UE 105 or UE 105 without a USIM, the SUPI could be the IMEI of UE 105. It is noted that if LMF 152 selection is based on a UE 105 identity or UE 105 HPLMN 140 identity, as described for FIG. 5, the VGMLC 155 or LRF 157 may be able to determine the LMF 152 without previously receiving any information from the LMF 152.

At stage 3, the LMF 152 determines the AMF 154 from information previously received from the AMF 154 as described in reference to FIGS. 9 and 11. The LMF 152 performs one or more of the positioning procedures described in reference to FIGS. 6-8.

At stage 4, the LMF 152 determines (e.g. calculates) a location estimate for the UE 105 based on information obtained in stages 2 and 3. The LMF 152 may cache the location estimate and/or information obtained in stages 2 and 3 for future location operations for UE 105.

At stage 5, the LMF 152 invokes the Nlmf_ProvideLocation_Response service operation towards the VGMLC 155/LRF 157 to return the current location of the UE 105. The service operation includes the location estimate, its age and accuracy and may include information about the positioning method.

At stage 6, the LRF 157 sends the location service response to the external emergency services client 130.

FIG. 11 shows support for location continuity for handover of an emergency call for UE 105 from NG-RAN 112 on the source side to either NG-RAN 112 or another 3GPP RAN (e.g. E-UTRAN) on the target side. The procedure applies when control plane location according to FIGS. 9 and 10 is used for location of the UE 105 on the source side. The procedure is based on the procedures for location continuity currently defined in 3GPP TS 23.271, "Functional stage 2 description of Location Services (LCS)," subclause 9.4.5.4. It is noted that if user plane (SUPL) location defined in OMA-TS-ULP-V2_0_3, "UserPlane Location Protocol" is used on the source (NG-RAN 112) side, then the current procedure for location continuity in TS 23.271, "Functional stage 2 description of Location Services (LCS)" may be used.

At stage 1 in FIG. 11, following the request for an emergency call, the UE 105 establishes a PDU Session for emergency services with 5GCN 150 and an IMS emergency call for NG-RAN 112 access, during which an LRF 157 is assigned in the serving network IMS (for 5GCN 150) and a source GMLC 155S may be chosen. The 5GC-NI-LR procedure of FIG. 9 is also performed which assigns a source LMF 152S and provides the source LMF 152S identity to the GMLC 155S and LRF 157 and optionally an initial location for the UE 105. It is noted that if LMF 152S selection is based on a UE 105 identity or UE 105 HPLMN 150 identity, as described for FIG. 5, the GMLC 155S and/or LRF 157 may be able to determine the source LMF 152S without previously receiving any information from the source LMF 152S.

At stage 2, at some later time, the LRF 157 may need the UE 105 location (e.g. an updated or initial location) and requests the source GMLC 155S to invoke the Nlmf_ProvideLocation_Request service operation towards the LMF 152S to request the current location of the UE 105. The service operation includes the SUPI for UE 105, the required QoS and an indication of a location request from an emergency services client.

At stage 3, if stage 2 occurs, the source LMF 152S starts a location session to obtain the location of the UE 105 as described in reference to stages 3 and 4 of FIG. 10.

At stage 4, the source AMF 154S receives a request from NG-RAN 112 to handover the UE 105 to a cell or base station associated with a different target node 154T which may be another AMF for intra-RAN handover or a different type of node (e.g. an MME) for inter-RAN handover (e.g. to E-UTRAN connected to EPC).

At stage 5, the source AMF 154S sends a handover request message to the target node 154T. In the case of handover to another AMF (intra-RAN handover), the source AMF 154S includes the source LMF 152S identity in the handover request if the source LMF 152S will continue to function as the target LMF. This may ensure that in the case of a further handover, the target AMF will be able to update the LMF 152S with a further handover indication as in stage 7. It is noted that a source LMF 152S continuing to function as a target LMF may require that the source LMF 152S is able to access the target AMF and is configured for location support in the geographic service area for the target AMF. The suitability of a source LMF 155S to function as a target LMF for different target AMFs might be configured in the source AMF 154S. Such configuration can be avoided if all LMFs in 5GCN 150 can serve as a target LMF for all AMFs in 5GCN 150 or if the source LMF 152S is always assumed to change to a different target LMF following handover.

At stage 6, the rest of the handover procedure is completed—e.g. as described in 3GPP TS 23.502.

At stage 7, after handover is complete, the source AMF 154S invokes the Namf_EventExposure_Notify service operation towards the source LMF 152S to notify the source LMF 152S of the handover. The service operation includes the SUPI for UE 105, the identity of the target node and whether the source LMF 155S shall continue to function as the target LMF in the case of intra-RAN handover to a target AMF.

At stage 8, any location session started in stage 3 may terminate normally before stage 7. If not, the source LMF 152S may continue the location session if the target node is an AMF (i.e. for intra-RAN handover) and if the source LMF 152S will continue to function as the target LMF. Otherwise, for an inter-RAN handover (e.g. to E-UTRAN connected to EPC) or where the source LMF 152S will not function as the target LMF, the source LMF 152S aborts the location session and may determine a location estimate for the UE 105 based on any information so far obtained from the source AMF 154S, NG-RAN 112 and/or UE 105.

At stage 9a, if stage 3 has occurred, the source LMF 152S invokes the Nlmf_ProvideLocation_Response service operation towards the GMLC 155S to return any location estimate obtained for the UE 105. For inter-RAN handover (e.g. to E-UTRAN connected to EPC), the service operation indicates a handover and includes the target node identity. For intra-RAN handover where the source LMF 152S will continue to function as the target LMF, the source LMF 152S does not indicate a handover because the source GMLC 155S can continue to send location requests for the UE 105 to the source LMF 152S (as in stage 2) and does not need to be aware of the handover.

At stage 9b, if stages 2 and 9a do not occur and if handover is inter-RAN (e.g. to E-UTRAN connected to EPC), the source LMF 152S may invoke the Nlmf_LocationEvent_Notify service operation towards the GMLC 155S to indicate the handover. The service operation includes the SUPI for UE 105, an event type indicating handover and the identity of the target node 154T. Stage 9b is not needed if a handover update on the target side is configured as in stage 10. The source LMF 152S then releases resources for the emergency call in all cases except for intra-RAN handover where the source LMF 152S will continue to function as the target LMF.

At stage 10, for inter-RAN handover (e.g. to E-UTRAN connected to EPC), stages 10 and 11 are skipped. For intra-RAN handover where the source LMF 152S will not continue as the target LMF, the target node 154T (which will be an AMF) selects a target LMF 152T and invokes the Namf_EventExposure_Notify service operation towards the target LMF 152T to notify the target LMF 152T of an emergency call handover. The service operation includes the SUPI and the current serving cell ID for UE 105. The target LMF 152T then stores the SUPI and the target node (AMF) 154T identity. The target node 154T (i.e. AMF) stores the target LMF 152T identity.

At stage 11, the target LMF 152T determines a target side GMLC 155T (e.g. using the serving cell ID for UE 105 or some fixed association with the target LMF 152T) and invokes the Nlmf_LocationEvent_Notify service operation towards the target GMLC 155T. The service operation carries the SUPI for UE 105, an event type indicating handover and the identity of the target LMF 152T. Stage 12 is then skipped.

At stage 12, for inter-RAN handover (e.g. to E-UTRAN connected to EPC) and if control plane location will be used on the target side, the target node (e.g. MME) 154T may send a Subscriber Location Report to a GMLC 155T on the target side after completion of the handover in stage 6. The Subscriber Location Report carries the UE 105 identity (e.g. IMSI, Mobile Station International Subscriber Directory Number (MSISDN) and/or IMEI), an event type indicating handover and the identity of the target node 154T. The target node 154T may determine the target GMLC 155T from configuration information. Stage 12 may be an alternative to stage 9b with only one of these stages needed.

At stage 13, for inter-RAN handover (e.g. where stage 9b or stage 12 occurs) or for intra-RAN handover where a new target LMF 152T is selected by the target AMF 154T, reconfiguration of the LRF 157 and the source and target GMLCs 155S and 155T may occur, e.g. to update stored information for any new serving node (154T) and LMF (152T) and enable use of any new GMLC 155T for future location requests.

At stage 14, if the LRF 157 needs a location estimate for the UE 105 after handover has occurred and if control plane location is used on the target side, the LRF 157 may instigate an MT-LR request via either a new target GMLC 155T (e.g. if handover was inter-RAN) or via the original source GMLC 155S (e.g. if handover was intra-RAN and the source LMF 152S will continue to function as the target LMF). The MT-LR may be supported either according to the new RAN if handover was inter-RAN (e.g. may be supported as an EPC-MT-LR for handover to E-UTRAN connected to EPC) or as described in reference to FIG. 10 if handover was intra-RAN.

Figure 12:
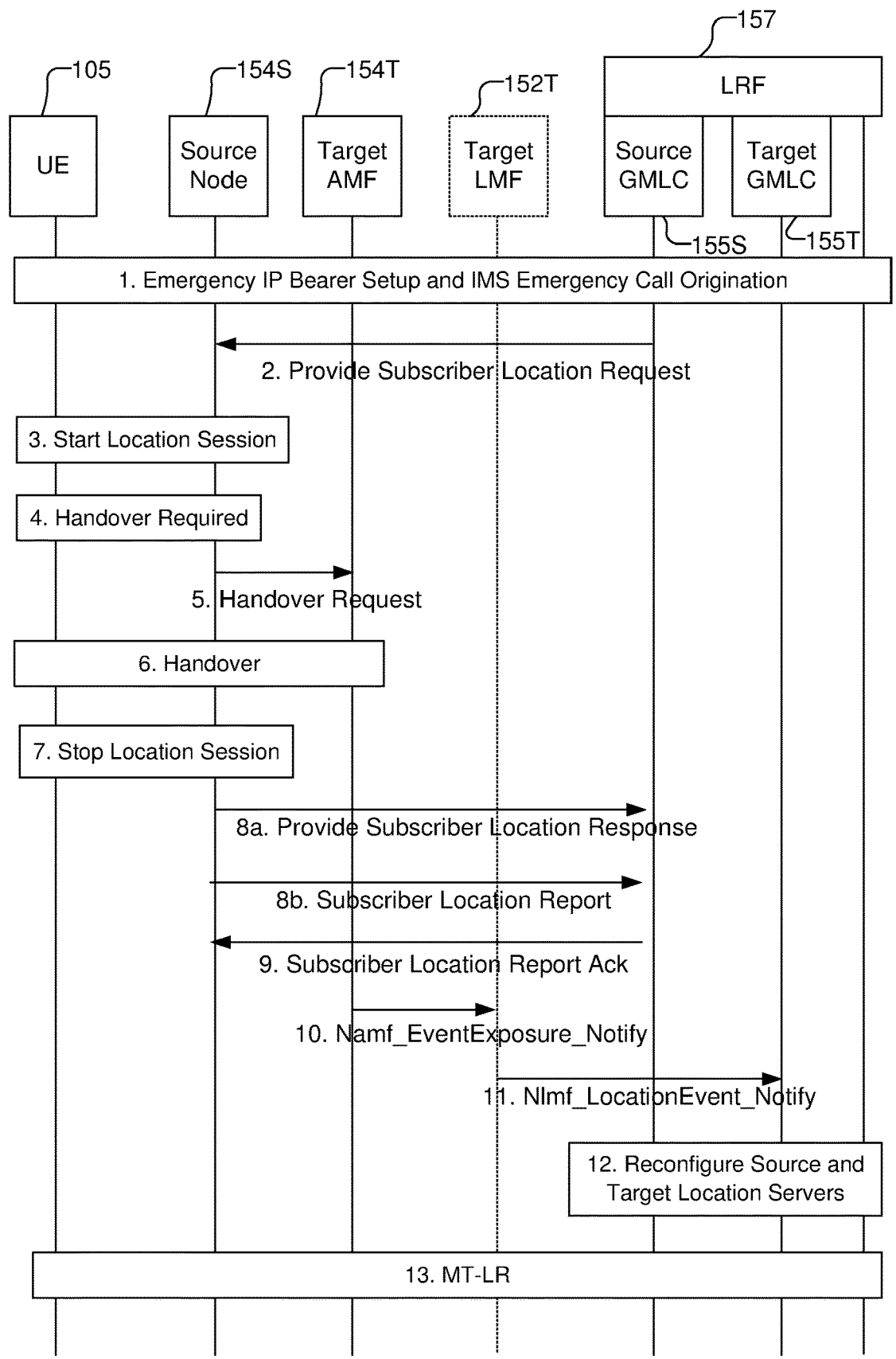
FIG. 12 shows support for location continuity for handover of an IMS emergency call to NG-RAN on a target side.

FIG. 12 shows support for location continuity for handover of an IMS emergency call for UE 105 to NG-RAN 112 on the target side from a different RAN (e.g. E-UTRAN) on the source side.

At stage 1 in FIG. 12, following the request for an emergency call, the UE 105 establishes an emergency connection and IP bearers appropriate to the source RAT. The UE 105 may then establish an IMS emergency call during which an LRF 157 is assigned and a source GMLC 155S may be chosen.

At stage 2, at some later time, the LRF 157 may need the UE 105 location (e.g. an updated or initial location) and requests the source GMLC 155S to send a Provide Subscriber Location request message to the source node 154S for UE 105 (e.g., an MME) to request the current location of the UE 105 if control plane location is used on the source side. The message includes the SUPI (e.g. the IMSI, MSISDN or IMEI) for UE 105, the required QoS and an indication of a location request from an emergency services client.

At stage 3, if stage 2 occurs or if support for an NI-LR is required, the source node 154S starts a location session appropriate to the source RAN to obtain the location of the UE 105.

At stage 4, a request is later sent to the source node 154S by the source RAN for a handover of UE 105 to a particular target base station (e.g. a gNB 110 or ng-eNB 114) or target cell for NG-RAN 112.

At stage 5, the source node 154S sends a Handover Request message to a target AMF 154T associated with the target base station or target cell.

At stage 6, the rest of the handover procedure is completed—e.g. as described in 3GPP TS 23.502.

At stage 7, any location session started in stage 3 may terminate normally before stage 6 is complete. If not, the source node 154S aborts the location session once stage 6 is complete. This may lead to provision of a location estimate for the UE 105 to the source node 154S.

At stage 8a, if control plane location is used on the source side and stage 2 occurs, the source node 154S returns a Provide Subscriber Location response to the source GMLC 155S carrying any location estimate obtained previously for the UE 105. Depending on configuration information in the source node 154S, the Provide Subscriber Location response may convey the identity of the target AMF 154T.

In some embodiments, the target AMF 154T identity may only be configured to be returned in stage 8a or stage 8b if a user plane (e.g. SUPL) location will be used on the target side to locate UE 105 as updating of a target GMLC 155T and LRF 157 may occur according to stage 11 when control plane location is used on the target side.

At stage 8b, if control plane location is used on the source side but stages 2 and 8a do not occur, the source node 154S may, depending on configuration information in the source node 154S (e.g. as in stage 8a), send a Subscriber Location Report to the source GMLC 155S carrying the SUPI for UE 105, an event type indicating handover and the identity of the target AMF 154T.

At stage 9, the source GMLC 155S acknowledges the message in stage 8b if stage 8b occurs.

At stage 10, if control plane location is used on the target (NG-RAN 112) side, the target AMF 154T selects a target LMF 152T and invokes the Namf_EventExposure_Notify service operation towards the target LMF 152T to notify the target LMF 152T of an emergency call handover for UE 105. The service operation includes the SUPI and the current cell ID for UE 105 and possibly a local ID for the UE 105 assigned by the target AMF 154T. The target LMF 152T then stores the UE 105 identity (or identities) and the target AMF 154T identity. The target AMF 154T stores the target LMF 152T identity.

At stage 11, if control plane location is used on the target (NG-RAN 112) side, the target LMF 152T determines a target side GMLC 155T (e.g. using the serving cell identity for UE 105 or some fixed association with the target LMF 152T) and invokes the Nlmf_LocationEvent_Notify service operation towards the GMLC 155T. The service operation carries the SUPI (e.g. IMSI, MSISDN and/or IMEI) for UE 105, an event type indicating handover and the identity of the target LMF 152T.

At stage 12, reconfiguration of the LRF 157 and the source and target GMLCs 155S and 155T may occur similarly to stage 13 of FIG. 11.

At stage 13, if the LRF 157 needs a location estimate for the UE 105 after handover has occurred, it may instigate an MT-LR request via the target GMLC 155T if control plane location solution will be used on the target side. This may occur as described for FIG. 10.

To support an Namf SBI (i.e. an AMF SBI) on behalf of an AMF 154, Table 2 shows possible AMF Services and AMF Service Operations which may be provided by AMF 154. Some of these service operations may be used by an LMF 152 for the procedures in FIGS. 6-16B as described elsewhere here for these figures. The service operations shown in Table 2 may be as defined in 3GPP TS 23.502.

TABLE 2

| Service Name | Service Operations | Operation Semantics | Example Consumer(s) |
| --- | --- | --- | --- |
| Namf_Communication | N1MessageNotify | Subscribe/Notify | SMF, SMSF, PCF, NEF, LMF |
| | N1N2MessageTransfer | Request/Response | SMF, SMSF, PCF, NEF, LMF |
| | N2InfoNotify | Notify | SMF, LMF |
| Namf_EventExposure | Subscribe for one UE, group of UE(s) or any UE | Subscribe/Notify | NEF, SMF, PCF, UDM, LMF |
| | UnSubscribe for one UE, group of UE(s) or any UE | Subscribe/Notify | NEF, SMF, PCF, UDM, LMF |
| | Notify | Subscribe/Notify | NEF, SMF, PCF, UDM, LMF |
| Namf_MT | EnableUEReachability | Request/Response | NEF, SMF, PCF, UDM, LMF |

Table 3 shows LMF Services and LMF Service Operations for the LMF based location solution which may be provided by an LMF 152 to a GMLC 155 using an LMF SBI as described for the procedures in FIGS. 6-16B. These service operations may correspond to those described for Table 1.

TABLE 3

| Service Name | Service Operations | Operation Semantics | Example Consumer(s) |
| --- | --- | --- | --- |
| Nlmf_ProvideLocation | Obtain UE Location | Request/Response | GMLC |
| Nlmf_LocationEvent (also referred to as Nlmf_EventNotify) | Report a UE location related event | Notify | GMLC |

The Nlmf_ProvideLocation service operation in Table 3 may enable a Network Function (NF) such as a GMLC 155 to request location information for a target UE 105. For example, the service operation may allow an NF to request the current geodetic or civic location of a target UE 105 from an LMF 152 and may allow the LMF 152 to return the requested location information to the NF. The requesting NF may include the SUPI for the UE 105 and an external client type in a request and may optionally include a location Quality of Service (QoS) and/or supported Geographical Area Description (GAD) shapes. The LMF 152 may return a Success/Failure indication and optionally a geodetic location, civic location, position methods used, and/or a failure cause.

The Nlmf_LocationEvent service operation in Table 3 may enable a Network Function (NF) such as a GMLC 155 to receive location information for a target UE 105 from an LMF 152. For example, the service operation may enable reporting of a location related event for a target UE 105 to a consumer NF (e.g. for periodic and triggered location). The reported location event may comprise an emergency call initiation, an emergency call release or an emergency call handover for a UE 105. The report may further include the type of the location related event, an identity (e.g. SUPI or IMEI) for the UE 105, a geodetic location, civic location, and/or position methods used.

FIGS. 13-16B show possible procedures for support of commercial location services using MT-LR, MO-LR and periodic and triggered MT-LR for the LMF based location solution and using the SBI architecture in FIGS. 4A-4B.

Figure 13:
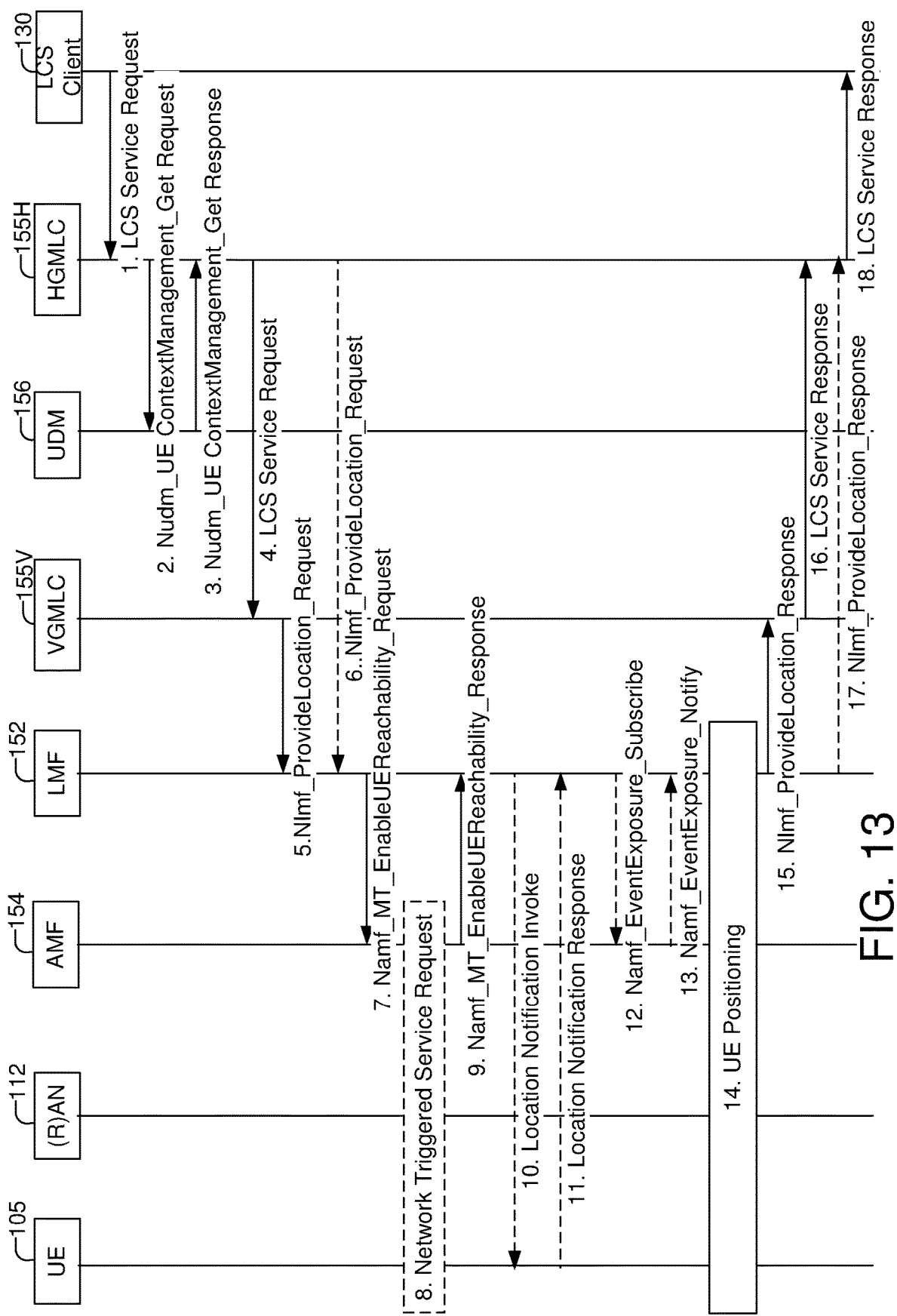
FIG. 13 shows a Mobile Terminated Location Request (MT-LR) procedure for a roaming UE.

FIG. 13 shows a 5GCN Mobile Terminated Location Request (5GC-MT-LR) procedure for a roaming UE 105. A 5GC-MT-LR procedure for a non-roaming UE 105 could comprise a subset of the procedure shown in FIG. 13. With this procedure, privacy requirements can be configured in the HGMLC 155H or transferred from the UDM 156 to the HGMLC 155H and are not needed in the AMF 154. AMF 154 support is limited to functions already defined for other NFs, e.g. providing the LMF 152 with UE 105 reachability, status and location information, and providing connectivity access to the UE 105 and (R)AN 112.

At stage 1 in FIG. 13, an external LCS client 130 sends a location request to an HGMLC 155H in the HPLMN 140 for the target UE 105. The HGMLC 155H verifies the authorization of the LCS Client 130 to locate the target UE 105 and verifies UE 105 privacy requirements. It is noted that the external LCS client 130 may instead be an NF or an Application Function (AF) which accesses the HGMLC 155H via an NEF 159 (not shown in FIG. 13).

At stage 2, the HGMLC 155H invokes the Nudm_UEContextManagement_Get service operation towards the home UDM 156 of the target UE 105 with the Generic Public Subscription Identifier (GPSI) or SUPI of the UE 105.

At stage 3, the UDM 156 returns the serving AMF 154 address and possibly a VGMLC 155V address and/or an LMF 152 address in the VPLMN 5GCN 150. The UDM 156 may also return subscribed privacy requirements for the target UE 105—e.g. if not stored in the HGMLC 155H. It is noted that the HGMLC 155H may also query a home HSS of the target UE 105 for a serving MME address as described in clause 9.1.1 of 3GPP TS 23.271. The EPC-MT-LR procedure described in clause 9.1.15 of 3GPP TS 23.271 may then be performed instead of stages 4-17 in FIG. 13—e.g. if the HSS returns an MME address but the UDM 156 does not return an AMF address.

At stage 4, if a VGMLC address was not returned in stage 3, the HGMLC 155H may use an NRF service in the HPLMN 140 to select an available VGMLC 155V in the VPLMN 5GCN 150, based on the VPLMN address contained in the AMF 154 address received in stage 3. The HGMLC 155H forwards the location request to the VGMLC 155V and includes the AMF 154 address, the target UE 105 identity (e.g. SUPI), any LMF 152 address received in stage 3 and any privacy requirements for the UE 105.

At stage 5, the VGMLC 155V determines an LMF 152 in the VPLMN 5GCN 150 and invokes the Nlmf_ProvideLocation_Request service operation to forward the location request to the LMF 152. If the VGMLC 155V and LMF 152 functions are combined, this stage may be omitted. It is noted that the VGMLC 155V may determine an LMF 152 in several alternative ways as described previously for alternatives A1-A4.

At stage 6, as an optional optimization, instead of performing stages 4 and 5, if the HGMLC 155H can determine or select the LMF 152 (e.g. based on the VPLMN identity, AMF 154 address, using the NRF service or by receiving an LMF 152 address from the UDM 156 in stage 3), the HGMLC 155H may invoke the Nlmf_ProvideLocation_Request service operation to forward the location request directly to the LMF 152. It is noted that when this optimization is used, the HGMLC 155H may need to support the Nlmf SBI. Therefore, if the HPLMN 140 operator wishes to avoid support of the Nlmf SBI by combining GMLCs with LMFs, stages 4 and 5 may be used rather than stage 6.

At stage 7, the LMF 152 invokes the Namf_MT_EnableUEReachability Request service operation towards the serving AMF 154 to verify UE 105 reachability. It is noted that if the serving AMF 154 is no longer available, the LMF 152 may use the NRF service in the VPLMN 5GCN 150 to select another AMF from the same AMF set as the previous serving AMF 154.

At stage 8, if the UE 105 is currently in CM Connected state for 3GPP or non-3GPP access, this stage is skipped. Otherwise, if the UE 105 is currently in CM Idle state for 3GPP access but is reachable, the AMF 154 performs a 3GPP network triggered service request in order to place the UE 105 in connected state.

At stage 9, the AMF 154 invokes the Namf_MT_EnableUEReachability Response service operation towards the LMF 152 to confirm UE 105 reachability.

At stage 10, the LMF 152 may notify the UE 105 of the location request and verify UE 105 privacy requirements based on any privacy requirements received from the HGMLC 155H in stages 4-6. If this occurs, the LMF 152 sends a supplementary services Location Notification invoke to the UE 105 via the serving AMF 154 using the Namf_Communication_N1N2MessageTransfer service operation. It is noted that transfer of supplementary services messages and positioning messages between the LMF 152 and UE 105 for stages 10, 11 and 14 may be based on the procedure in FIG. 6 or may use a similar procedure in the case of non-3GPP access by UE 105 (e.g. WLAN access), in which supplementary services messages and positioning messages are transferred between the LMF 152 and UE 105 via an AMF 154, N3IWF and AN.

At stage 11, the UE 105 notifies the user of UE 105 of the location request and verifies user permission for the location request if UE 105 privacy is to be verified. The UE 105 then returns a supplementary services Location Notification response to the LMF 152 indicating whether the user grants or withholds permission for the location request when UE 105 privacy is verified. The supplementary services response is transferred via the serving AMF 154 and delivered to the LMF 152 using an Namf_Communication_N1MessageNotify service operation.

At stage 12, if the LMF 152 needs to know the current access type(s) (i.e. 3GPP and/or non-3GPP) and any serving cell for the UE 105 prior to performing positioning in stage 14 and prefers (e.g. in order to reduce latency) to obtain this from the serving AMF 154 rather than the UE 105, NG-RAN 112 or N3IWF, the LMF 152 invokes the Namf_EventExposure_Subscribe service operation towards the AMF 154 to obtain UE 105 location information and includes the immediate one time notification flag.

At stage 13, the serving AMF 154 returns the UE 105 access type(s) and location information to the LMF 152 (e.g. 3GPP access type such as NR or LTE and serving cell ID).

At stage 14, the LMF 152 may perform one or more of the positioning procedures described in FIGS. 6, 7, and 8 for 3GPP access or similar positioning procedures for non-3GPP access in which the (R)AN 112 shown in FIGS. 6-8 is replaced by (a) an AN connected to UE 105, and (b) an N3IWF which is connected to the AN and the AMF 154. In the case of the procedure for FIG. 6 or a similar procedure based on FIG. 6 for non-3GPP access, the LMF 152 may include a routing identifier identifying the LMF 152 in any positioning message intended for the UE 105 which is sent to the serving AMF 154 (e.g. at stage 1 in FIG. 6), which the AMF 154 can then forward to the UE 105 in the NAS transport message (e.g. at stage 3 in FIG. 6). The LMF 152 determines the UE 105 location using information received in this stage and/or in stage 13.

It is noted that in the event of a change of serving AMF 154 for the UE 105 within the same 5GCN 150 and while positioning is in progress at stage 14, the old AMF 154 can return an error indication to the LMF 152 when the LMF 152 attempts to send a positioning protocol message to the UE 105, the (R)AN 112 or an N3IWF associated with a non-3GPP AN 112 (not shown in FIG. 13). In addition, if the LMF 152 subscribes to event notification from the old AMF 154 for a change of AMF using the AMF event exposure service operation, the old AMF 154 can notify the LMF 152 when a change of AMF occurs. Provided the LMF 152 is able to access the new AMF (not shown in FIG. 13), the LMF 152 can resume any of stages 10-14 with the new AMF. For positioning in the UE 105 or (R)AN 112 that is already in progress when a change of AMF occurs, positioning protocol messages can be returned by the UE 105 or (R)AN 112 to the LMF 152 via the new AMF, since the messages would include a routing identifier indicating the LMF 152. This will enable a positioning session between the UE 105 and LMF 152 to continue following a change of AMF.

The continuation of the positioning session following a change of AMF at stage 14 as just described may avoid additional delay to restart the MT-LR request following a change of AMF (e.g. by a VGMLC 155V or HGMLC 155H) or failure of the MR-LR request if there is insufficient response time left to restart the MR-LR request. This may be significant to a request from an external client 130 at stage 1 for ultra high location accuracy (e.g. 10 centimeters location error or less) where high location reliability and/or low response time is also needed. For example, this may apply in a factory where a UE 105 is associated with a moving part or product that is being assembled or in the process of shipment. For example, the continuation of the positioning session following the change of AMF may help ensure that the ultra high location accuracy with high reliability and/or low response time can be supported.

It is noted that in the event of mobility of a target UE 105 from 5GCN to EPC, the LMF 152 can subscribe to notification by the old AMF 154 of the mobility event to EPC. The LMF 152 can then return any UE 105 location so far obtained or an error indication to the HGLMC 155H at stages 15-17. In the case of an error indication, the HGMLC 155H can repeat stages 2 and 3 to query the UDM 156 and/or HSS for UE 105 (not shown in FIG. 13) for a new AMF and new MME address. When an MME address is returned by an HSS, the HGMLC 155H can perform an EPC-MT-LR as described in clause 9.1.15 of 3GPP TS 23.271 to obtain the UE 105 location.

At stages 15-18, the LMF 152 returns the location estimate to the LCS client 130 via the VGMLC 155V and/or HGMLC 155H.

Figure 14:
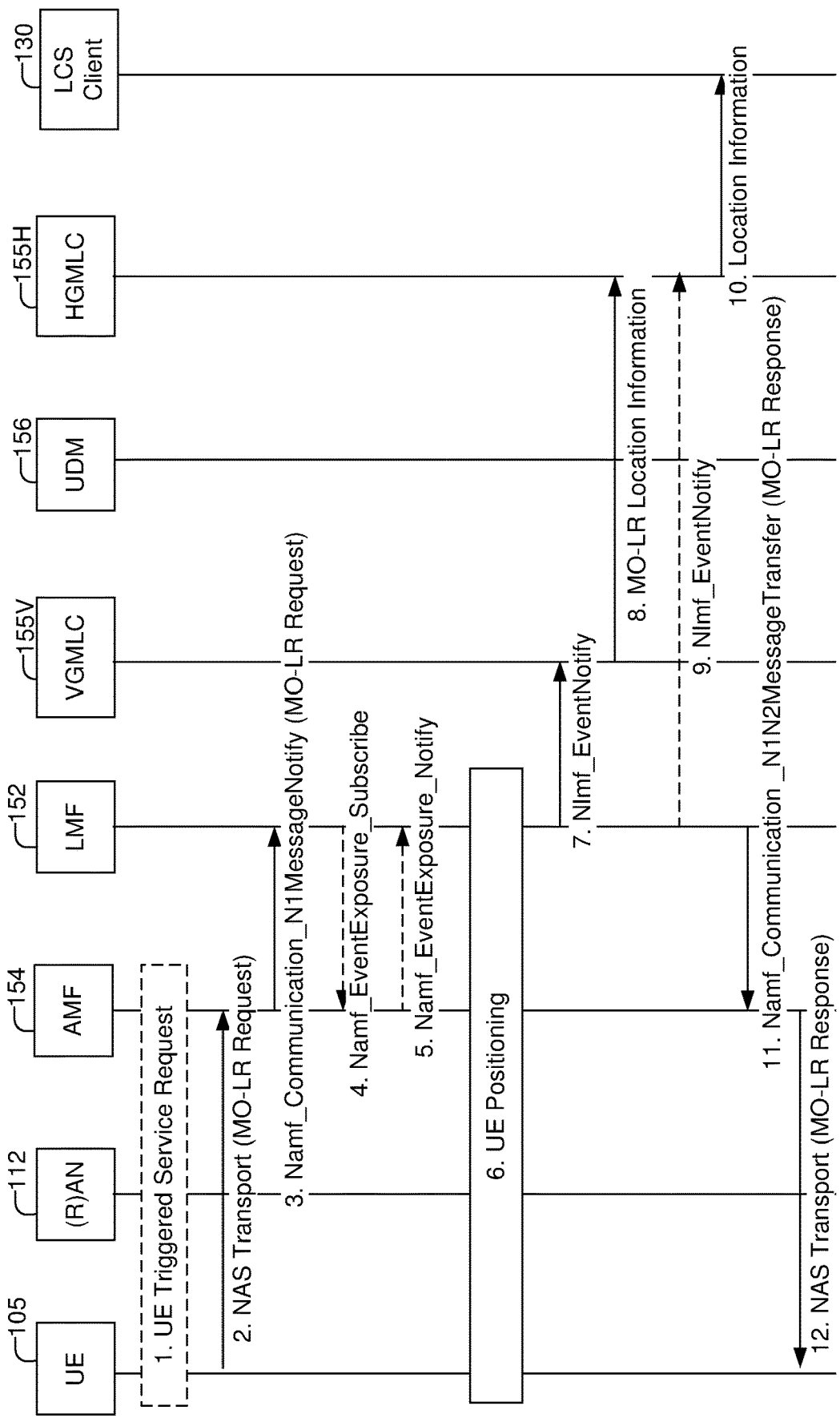
FIG. 14 shows a Mobile Originated Location Request (MO-LR) procedure for a roaming UE.

FIG. 14 summarizes a 5GCN Mobile Originated Location Request (5GC-MO-LR) procedure for a roaming UE 105. A 5GC-MO-LR procedure for a non-roaming UE 105 could comprise a subset of the procedure shown in FIG. 14. The LMF 152 and VGMLC 155V may be combined to avoid support of the Nlmf SBI in the VPLMN 5GCN 150. Subscription to MO-LR support by UE 105 may be provided to the AMF 154 by the UDM 156 (e.g. when UE registers with 5GCN 150) and could be provided to the LMF 152 when the LMF 152 requests UE 105 status information from the AMF 154. As an alternative, the LMF 152 could query the UDM 156. The LMF 152 may also be selected by the AMF 154.

At stage 1 in FIG. 14, the UE 105 performs a service request if in idle state.

At stage 2, the UE 105 sends a supplementary services MO-LR request to the serving AMF 154 indicating a request for a location estimate, location assistance data or sending of a location estimate to an LCS client 130 via transfer to third party (TTTP). For TTTP, the UE 105 identifies the external LCS client 130 and possibly the HGMLC 155H. The MO-LR is sent inside a NAS transport message. The UE 105 may include a default routing identifier in the NAS transport message indicating that the AMF 154 may select any LMF in the VPLMN 5GCN 150.

At stage 3, the AMF 154 selects an LMF 152 in the VPLMN 5GCN 150 based on receiving a default routing identifier in stage 2 and invokes the Namf_Communication_N1MessageNotify service operation towards this LMF 152 to transfer the MO-LR request. The AMF 154 includes a SUPI for the UE 105. It is noted that the AMF 154 may select the LMF 152 using the Network Repository Function (NRF) service and may make use of Single Network Slice Selection Assistance Information (S-NSSAI) to support network slicing. Alternatively, LMF selection may occur when a UE 105 first registers, in which case the LMF 152 address may be part of the UE 105 context in the AMF 154. LMF 152 selection by AMF 154 may also be based in part on a current RAT used by UE 105.

At stage 4, the LMF 152 invokes the Namf_EventExposure_Subscribe service operation towards the AMF 154 to obtain UE 105 location information and the UE 105 subscription to MO-LR and includes the immediate one time notification flag.

At stage 5, the serving AMF 154 returns UE 105 location information to the LMF 152 (e.g. current access types and any serving cell ID) and UE 105 subscription to MO-LR. The LMF 152 verifies that the UE 105 is subscribed to the MO-LR request received in stage 3. The Namf EventExposure service operation defined in 3GPP TS 23.502 and TS 29.518 may be extended to allow provision of UE 105 subscription information for an MO-LR. An alternative could be a new service operation to enable an AMF 154 to provide subscription information for an MO-LR to LMF 152.

At stage 6, if the MO-LR request indicates a request for a location estimate or sending of a location estimate to an LCS client 130 via TTTP, the LMF 152 may perform one or more of the positioning procedures described in FIGS. 6, 7, and 8 in the case of 3GPP access, or similar positioning procedures in the case of non-3GPP access. The LMF 152 then determines the UE 105 location using information obtained in this stage and/or in stage 5. If the MO-LR request indicates a request for location assistance data, the LMF 152 performs the positioning procedure described in FIG. 6 in the case of 3GPP access, or a similar positioning procedure in the case of non-3GPP access, to transfer the assistance data to the UE 105. For procedures involving the UE 105, the LMF 152 may include a routing identifier identifying the LMF 152 in any positioning message intended for the UE 105 which is sent to the serving AMF 154 (e.g. as at stage 1 in FIG. 6), which the AMF 154 can then forward to the UE 105 in the NAS transport message (e.g. as at stage 3 in FIG. 6). If TTTP was not requested in stage 2, stages 7-10 are skipped.

At stage 7, the LMF 152 selects a VGMLC 155V in the VPLMN 5GCN 150 and invokes the Nlmf_EventNotify service operation towards the VGMLC 155V. The service operation includes the location obtained in stage 6, the SUPI for the UE 105, the LCS client 130 ID and any HGMLC 155H address provided in stage 2. This stage can be omitted if the LMF 152 and VGMLC 155V functions are combined in the same entity.

At stage 8, the VGMLC 155V forwards the location, the UE 105 identity and LCS client 130 identity to the HGMLC 155H. The VGMLC 155V may determine the HGMLC 155H address if not provided in step 7 from the HPLMN 140 identity inferred from the SUPI for UE 105.

At stage 9, as an optional optimization, if the HGMLC 155H address is provided by the UE 105 in stage 2 or can be determined by the LMF 152 (e.g. based on the HPLMN 140 identity as inferred from the UE 105 identity), the LMF 152 may invoke the Nlmf_EventNotify service operation towards the HGMLC 155H. The service operation includes the location obtained in stage 6, the SUPI for the UE 105 and the LCS client 130 ID provided in stage 2. When stage 9 occurs, stages 7 and 8 are omitted.

At stage 10, the HGMLC 155H provides the UE 105 location and a UE 105 identity to the external LCS client 130.

At stage 11, the LMF 152 invokes the Namf_Communication_N1N2MessageTransfer service operation towards the AMF 154 to send a supplementary services MO-LR response to the AMF 154 confirming completion of the MO-LR request in stage 2 and including any location determined in stage 6

At stage 12, the AMF 154 forwards the MO-LR response to the UE 105 in a NAS transport message.

Figures 1, 15:
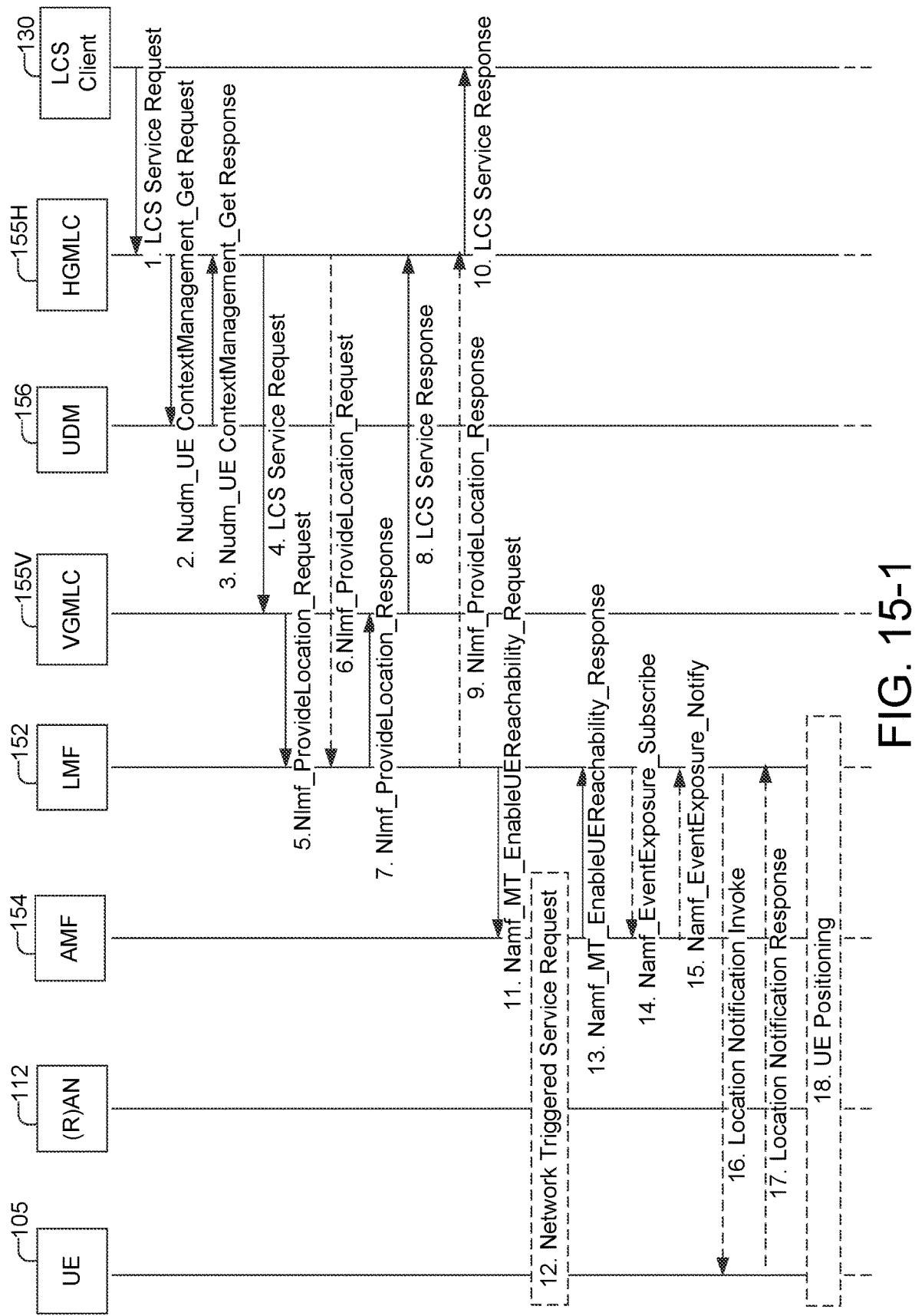
FIG. 15 (comprising FIGS. 15-1 and 15-2) shows a MT-LR procedure for a roaming UE to support periodic and triggered location.
Figures 2, 15:
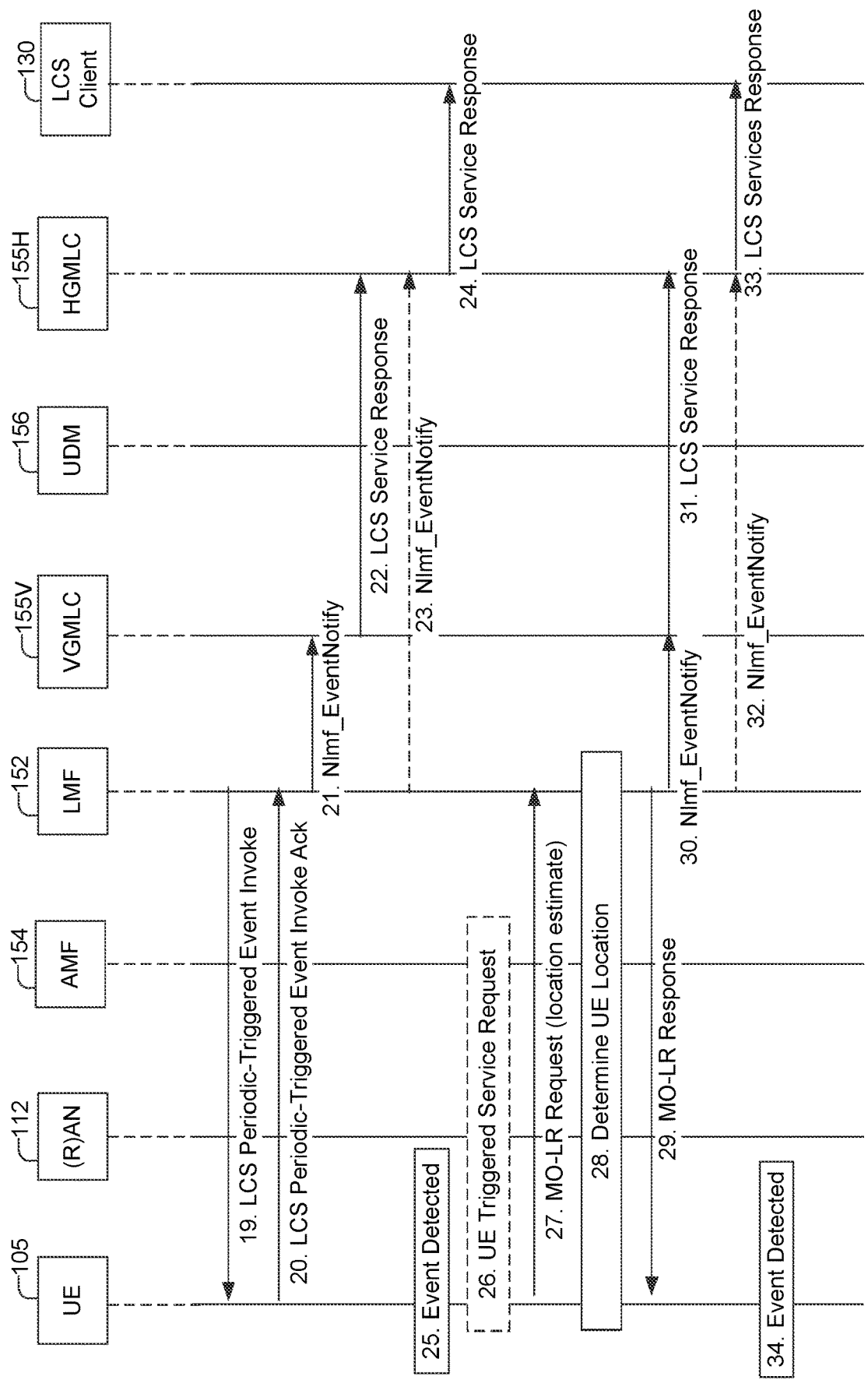

FIG. 15 (comprising FIGS. 15-1 and 15-2) summarizes a periodic and triggered 5GC-MT-LR procedure for a roaming UE 105. A periodic and triggered 5GC-MT-LR procedure for a non-roaming UE 105 could comprise a subset of the procedure shown in FIG. 15. The trigger events may comprise any of: a UE available event, an area event (UE 105 entering, leaving or remaining with a defined area), a motion event (UE 105 moving by more than a threshold straight line distance from a previous location). One or more of these events may be requested by an LCS Client 130. For example, the UE available event may be combined with either a periodic event or another triggered event. When a UE 105 is already available, a request for the UE available event may be equivalent to requesting a current location for the target UE 105. With this procedure, the LMF 152 and VGMLC 155V can be combined to avoid support of the Nlmf SBI in the VPLMN 5GCN 150. Privacy requirements for the UE 105 can be configured in the HGMLC 155H or transferred from the UDM 156 to the HGMLC 155H and are not needed in the AMF 154. The same LMF 152 may be used for each successive periodic or triggered location fix for UE 105 thereby both avoiding overhead to assign and release the LMF 152 for each location and enabling use of information obtained by the LMF 152 for previous location fixes of UE 105. Trigger detection occurs in the UE 105.

At stage 1 in FIG. 15, an external LCS client 130 sends a location request for a periodic and triggered location for a target UE 105 to an HGMLC 155H in the HPLMN 140 for the UE 105. The location request provides the type of location reporting being requested and associated parameters. For periodic location, the request may include the time interval between successive location reports and the total number of reports. For triggered reporting for an area event, the request may include details of the target area, whether the trigger event to be reported is the UE 105 being inside, entering into or leaving the target area, and whether event reporting shall include UE 105 location estimates. For triggered reporting for the motion event, the request may include a threshold linear distance for triggering a location report and whether event reporting shall include UE 105 location estimates. For the UE available trigger event, no additional parameters may be needed. The HGMLC 155H may verify UE 105 privacy requirements. It is noted that the external LCS client 130 may instead be a Network Function (NF) or an Application Function (AF) which accesses the HGMLC 155H via a Network Exposure Function (NEF) (not shown in FIG. 15).

At stages 2-3, the HGMLC 155H queries the UDM 156 for the serving AMF 154 address, UE 105 privacy requirements and possibly a VGMLC address and/or an LMF address in the VPLMN 5GCN 150 as described for stages 2-3 in FIG. 13. It is noted that the HGMLC 155H may also query a home HSS of the target UE 105 for a serving MME address as described in 3GPP TS 23.271. The deferred EPC-MT-LR procedure for Periodic and Triggered Location described in 3GPP TS 23.271 may then be performed instead of stages 4-34 in FIG. 15—e.g. if the HSS returns an MME address but the UDM 156 does not return an AMF address.

At stages 4-6, the HGMLC 155H forwards the location request to the LMF 152 either via a VGMLC 155V or directly as described for stages 4-6 of FIG. 13. The HGMLC 155H includes in the location request the AMF 154 address, the UE 105 identity (e.g. SUPI), the type of location reporting being requested and associated parameters, a reference number to be used to identify later responses, and any privacy requirements for the UE 105. For area event reporting, the HGMLC 155H, VGMLC 155V or LMF 152 may convert the target area into an equivalent set of cells or Tracking Areas (TAs) for the NG-RAN 112. LMF 152 selection (if needed) by the VGMLC 155V may be supported as described previously for alternatives A1-A4.

At stages 7-10, if the LMF 152 supports the type of periodic and triggered location requested, the LMF 152 returns an acknowledgment to the LCS client 130, via the VGMLC 155V and/or HGMLC 155H, indicating that the request for periodic or triggered location was accepted.

At stages 11-13, the LMF 152 verifies UE 105 reachability and that the UE 105 is in a connected state as described for stages 7-9 of FIG. 13.

At stages 14-15, if the UE 105 is not reachable (e.g. is using extended discontinuous reception (eDRX) or is in power saving mode (PSM)), the LMF 152 invokes the Namf_EventExposure_Subscribe service operation towards the AMF 154 in order to be informed by the AMF 154 when the UE 105 again becomes reachable. At that point and if the UE 105 may not yet be in connected state, the LMF 152 may again perform stages 11-13. The LMF 152 may also perform stages 14-15 to obtain the current access type(s) (i.e. 3GPP and/or non-3GPP access types) and any serving cell identity (ID) for the UE 105 from the AMF 154 after the UE 105 becomes reachable as in stages 12-13 of FIG. 13. It is noted that in the event of a change of serving AMF 154 for the UE 105 within the same VPLMN 5GCN 150 when the UE 105 becomes reachable, the old AMF 154 can notify the LMF 152 and the LMF 152 can perform stages 14-15 to obtain the current access type(s) (i.e. 3GPP and/or non-3GPP access types) and any serving cell ID for the UE 105 from the new AMF.

It is noted that in the event of mobility of a target UE 105 from 5GCN 150 to EPC when the UE 105 becomes reachable, the old AMF 154 can notify the LMF 152. The LMF 152 can then return an error indication to the HGLMC 155H using stages 21-23. The HGMLC 155H can then repeat stages 2 and 3 to query the UDM 156 and an HSS for UE 105 (not shown in FIG. 15) for a new AMF and new MME address. When an MME address is returned by the HSS, the HGMLC 155H can perform a deferred EPC-MT-LR for Periodic and Triggered Location as described in 3GPP TS 23.271.

At stages 16-17, once the UE 105 is reachable, the LMF 152 may verify UE 105 privacy requirements, based on UE 105 privacy requirements received from the HGMLC 155H in stages 3-5, via a supplementary services interaction as in stages 10-11 for FIG. 13.

At stage 18, if triggered location for the UE available event was requested, the LMF 152 performs UE 105 positioning as for stage 14 of FIG. 13. If no other triggered or periodic location reporting was requested, the LMF 152 skips stages 19-20 and 25-34 and performs stages 21-24 to return the UE 105 location to the LCS Client 130 after which the procedure terminates.

At stage 19, if periodic location or triggered location for the area event or motion event was requested, the LMF 152 sends a supplementary services LCS Periodic-Triggered Event Invoke message to the UE 105 via the serving AMF 154 by invoking the Namf_Communication_N1N2MessageTransfer service operation. The message carries the location request information received from the VGMLC 155V or HGMLC 155H, the reference number assigned by the HGMLC 155H and the HGMLC 155H address if the same LMF 152 will not be used in stage 27. The LMF 152 includes a routing identifier in the Namf_Communication_N1N2MessageTransfer service operation indicating whether later trigger event reports (in stage 27) are to be sent by the UE 105 to the same LMF 152. The routing identifier would be transferred to the UE 105 by the serving AMF 154 in a NAS transport message used to convey the LCS Periodic-Triggered Event Invoke to the UE 105 and would identify the LMF 152 when use of the same LMF 152 is required. The routing identifier may otherwise be omitted or set to a default value that indicates any LMF.

At stage 20, if the request in stage 19 can be supported, the UE 105 returns an acknowledgment to the LMF 152, which is transferred via the serving AMF 154 and delivered to the LMF 152 using an Namf_Communication_N1MessageNotify service operation.

At stage 21-24, the LMF 152 sends a response to the LCS client 130 via the VGMLC 155V and/or HGMLC 155H carrying any location estimate obtained at stage 18 for the UE available event. When stages 19-20 were performed, the response also confirms that event reporting for periodic or triggered location was activated in the UE 105. The VGMLC 155V (if used) and optionally the LMF 152 can then release state information for the periodic and triggered 5GC-MT-LR request. If the LMF 152 indicates in stage 19 that the same LMF 152 must be used for later trigger event reports (in stage 27), the LMF 152 retains state information for the UE 105.

At stage 25, if stages 19 and 20 are performed, the UE 105 monitors for occurrence of the trigger event requested in stage 19 (e.g. a periodic trigger event, an area trigger event or a motion trigger event). When a trigger event is detected, the UE 105 proceeds to stage 26.

At stage 26, the UE 105 performs a service request if in idle state.

At stage 27, the UE 105 sends a supplementary services 5GC-MO-LR request to an LMF 152 which is transferred via the serving AMF 154 and delivered to the LMF 152 using an Namf_Communication_N1MessageNotify service operation. The request indicates an event report for a periodic and triggered location request and includes the type of trigger event being reported, the HGMLC 155H address if received at stage 19, and the reference number. The request may also include a location estimate for UE 105 if reporting of a location estimate is required. If requested in stage 19, the UE 105 may ensure the MO-LR request is routed by the serving AMF 154 to the same LMF 152 that initiated the periodic and triggered location request at stage 19 by including any routing identifier received at stage 19. Otherwise, the UE 105 can include a default routing identifier to indicate that the AMF 154 may select any LMF in the VPLMN 5GCN 150. It is noted that stage 27 does not require the same serving AMF as in stages 16-20 so mobility between AMFs is supported. However, for simplicity, the same AMF 154 is assumed in FIG. 15. In the event of mobility of a target UE 105 from 5GCN 150 to EPC prior to stage 26, the UE 105 may report a trigger event detected at stage 25 according to stages 13-24 of FIG. 9.1.19.1-1 of 3GPP TS 23.271 if the deferred EPC-MT-LR procedure for Periodic and Triggered Location is supported by both the UE 105 and EPC.

At stage 28, if a location estimate was not included in stage 27 and if reporting of location estimates was requested at stage 5 or stage 6, the LMF 152 may perform stages 12-14 of FIG. 13 to obtain a location estimate for the UE 105.

At stage 29, the LMF 152 returns an MO-LR return result to the UE 105 via the serving AMF 154 using the Namf_Communication_N1N2MessageTransfer service operation to confirm that an event report will be sent to the LCS client 130.

At stage 30, the LMF 152 selects a VGMLC 155V (which may be different to the VGMLC 155V for stages 4-8) and invokes an Nlmf_EventNotify service operation towards the VGMLC 155V with an indication of the type of event being reported, the reference number, the H-GMLC 155H address and a location estimate if this was requested and obtained at stage 27 or stage 28. Stage 30 may be omitted if the LMF 152 and VGMLC 155V are combined.

At stage 31, the VGMLC 155V forwards the information received in stage 30 to the HGMLC 155H.

At stage 32, as an optional optimization, stages 30 and 31 are omitted and the LMF 152 instead sends the information in stage 30 directly to the HGLMC 155H.

At stage 33, the HGMLC 155H uses the reference number received in stage 31 or stage 32 to identify the periodic and triggered location request received in stage 1 and then sends the location estimate and type of trigger event being reported to the external LCS client 130.

At stage 34, the UE 105 continues to monitor for further trigger events and instigates stages 26-33 each time a trigger event is detected.

FIG. 16A summarizes an optimized 5GC-MT-LR procedure for a roaming UE 105 to support periodic and triggered location in the same manner as in FIG. 15 but with less resource usage and less impact to the UE 105 and LMF 152. A corresponding optimized procedure for a non-roaming UE 105 could comprise a subset of the procedure shown in FIG. 16A. This procedure has the same characteristics as the procedure in FIG. 15, but in addition: the same LMF 152 is always used for each successive periodic or triggered location fix thereby avoiding overhead to assign and release the LMF 152 for each location and enabling use of information obtained by the LMF 152 for previous location fixes; support of the supplementary services MO-LR request and response is not needed by the UE 105 or LMF 152; and trigger detection occurs in the UE 105, in the LMF 152 or in both the UE 105 and LMF 152.

At stages 1-18 in FIG. 16A, stages 1 to 18 of FIG. 15 are performed.

At stage 19, the LMF 152 determines whether to use trigger event detection by the LMF 152 or by the UE 105—e.g. based on the type of periodic or triggered location being requested, the LMF 152 capabilities, the UE 105 capabilities (if known) and whether the UE 105 employs power saving mode and is currently reachable. For trigger event detection by the LMF 152, stages 26-27 are performed and stages 20-21 and 28-30 are omitted. For trigger event detection by the UE 105, stages 20-21 and 28-30 are performed and stages 26-27 are omitted. In some implementations, an LMF 152 may use both types of trigger detection in order to improve trigger detection reliability or if the UE 105 and LMF 152 detect different types of triggers.

At stage 20, for trigger detection by the UE 105, the LMF 152 sends a positioning protocol (e.g. LPP) message to the UE 105 via the serving AMF 154 using the Namf_Communication_N1N2MessageTransfer service operation. The LMF 152 includes in the message a request for periodic or triggered location reporting by the UE 105 as determined by the LMF 152 in stage 19 and the type of location measurements or location estimate to be provided by the UE 105 for location reporting in stage 30. The LMF 152 also includes a routing identifier identifying the LMF 152 in the Namf_Communication_N1N2MessageTransfer service operation which is transferred to the UE 105 by the AMF 154.

At stage 21, if the request in stage 20 can be supported, the UE 105 returns an acknowledgment to the LMF 152 in a positioning protocol (e.g. LPP) message, which is transferred via the serving AMF 154 and delivered to the LMF 152 using an Namf_Communication_N1MessageNotify service operation.

At stages 22-25, stages 21-24 of FIG. 15 are performed to confirm that event reporting for periodic or triggered location was activated in the LMF 152 and/or UE 105 and to return any location estimate for the UE available event obtained at stage 18 if the UE available event was requested at stage 5 or stage 6.

At stage 26, for trigger detection by the LMF 152, the LMF 152 may monitor the status and/or location of the UE 105 by periodically querying the AMF 154 for new UE 105 status and location information and/or subscribing to location event reporting from the AMF 154 such as for a change of access type, cell ID or TA. When periodic location of the UE 105 was requested in stage 5 or stage 6, stage 26 may not be needed.

At stage 27, the LMF 152 uses the information in stage 26 or other information (e.g. the current time) to detect when a trigger event has occurred. When a trigger event is detected the LMF 152 proceeds to stage 31.

At stage 28, for trigger event detection by the UE 105, the UE 105 monitors for occurrence of the trigger event requested in stage 20. The monitoring may occur while the UE 105 is in idle state and/or while the UE 105 is unreachable from the network (e.g. with eDRX or PSM). The UE 105 may also (e.g. periodically) request assistance data from the LMF 152 to help determine a location, if needed to detect a trigger event. When a trigger event is detected, the UE 105 proceeds to stage 29.

At stage 29, the UE 105 performs a service request if in idle state.

At stage 30, the UE 105 sends a positioning protocol (e.g. LPP) message to the LMF 152 which is transferred via the serving AMF 154 and delivered to the LMF 152 using an Namf_Communication_N1MessageNotify service operation. The request may indicate the type of event being reported and includes any location information (e.g. location measurements or a location estimate) that were requested in stage 20. The UE 105 includes the routing identifier received in stage 20 to ensure the positioning protocol message is sent to the same LMF 152 which instigated the periodic and triggered location request in stage 20.

At stage 31, if inclusion of a location estimate in event reports was requested in stage 5 or stage 6, the LMF 152 determines a location estimate for the UE 105 based on any location measurements or location estimate received in stage 30 in the case of UE 105 trigger event detection or based on UE 105 status or location information obtained in stage 26 in the case of LMF 152 trigger event detection. If necessary (e.g. to obtain a more accurate location estimate), the LMF 152 may perform UE 105 positioning as for stage 14 of FIG. 13.

At stages 32-35, stages 30-33 of FIG. 15 are performed to return an indication of the trigger event to the external client 130 and a location estimate if this was requested.

At stage 36, for trigger event detection by the LMF 152, the LMF 152 continues to monitor for and detect further trigger events as in stages 26-27 and instigates stages 31-35 each time a trigger event is detected.

At stage 37, for trigger event detection by the UE 105, the UE 105 continues to monitor for and detect further trigger events as in stage 28 and instigates stages 29-35 each time a trigger event is detected.

FIG. 16B summarizes a low power variant of the optimized 5GC-MT-LR procedure shown in FIG. 16A for a roaming UE 105 to support periodic and triggered location. A corresponding procedure for a non-roaming UE 105 could comprise a subset of the procedure shown in FIG. 16B. This procedure has the same characteristics as the procedure in FIG. 16A, but in addition: the UE 105 is enabled to report the occurrence of trigger events and provide associated location information using connectionless transfer; location determination and UE 105 authentication can occur in non-real time in the LMF 152; location reports from multiple UEs can be batched by the NG-RAN 112 or N3IWF to the LMF 152 to reduce signaling overhead; transfer of location reports can be prioritized according to QoS requirements; and the option of employing trigger detection in the LMF 152 is not used.

At stages 1-18 in FIG. 16B, stages 1 to 18 of FIG. 15 are performed.

At stage 19, stage 20 of FIG. 16A is performed. In addition, the LMF 152 includes in the request for periodic or triggered location reporting a request for the UE 105 to send event reports using connectionless transfer via NG-RAN 112 and includes one or more UE IDs for connectionless reporting, ciphering information, a priority indication and criteria for reporting using connectionless transfer versus a NAS signaling connection.

At stage 20, if the request in stage 19 can be supported, the UE 105 returns an acknowledgment to the LMF 152 in a positioning protocol (e.g. LPP) message, which is transferred via the serving AMF 154 and delivered to the LMF 152 using an Namf_Communication_N1MessageNotify service operation. The UE 105 indicates in the acknowledgment whether sending event reports using connectionless transfer is supported in addition to sending using a NAS signaling connection.

In an embodiment, stage 19 and stage 20 in FIG. 16B may be performed instead by transferring supplementary services messages between the LMF 152 and UE 105 as at stages 19 and 20, respectively, of FIG. 15.

At stages 21-24, stages 21-24 of FIG. 15 are performed to confirm that event reporting for periodic or triggered location was activated in the UE 105 and to return any location estimate for the UE available event obtained at stage 18 if the UE available event was requested at stage 5 or stage 6.

At stage 25, the UE 105 monitors for occurrence of the trigger event requested in stage 19. The monitoring may occur while the UE 105 is in idle state and/or while the UE 105 is unreachable from the network (e.g. with eDRX or PSM). The UE 105 may also (e.g. periodically) request assistance data from the LMF 152 to help determine a location, if needed to detect a trigger event. When a trigger event is detected, the UE 105 proceeds to stage 26.

At stage 26, the UE 105 determines based on the criteria received in stage 19 whether to report the trigger event using connectionless transfer or a NAS signaling connection. If the UE 105 is already in connected state or can only access the 5GCN 150 via a RAN node (e.g. a gNB 110 or ng-eNB 114) which does not support connectionless transfer, the UE 105 determines to use a NAS signaling connection At stage 27, if the UE 105 determines to use a NAS signaling connection at stage 26, the UE 105 performs stages 29-31 of FIG. 16A. The UE 105 then skips stages 28-33.

At stage 28, if the UE 105 determines to use connectionless transfer at stage 26, the UE 105 obtains any location measurements or location estimate requested in stage 19. If the UE 105 is using a 3GPP access (e.g. NR or LTE access), the UE 105 determines a suitable temporary serving cell and requests and obtains a signaling channel (or signaling connection) with an associated RAN node (e.g. a gNB 110 or ng-eNB 114) in NG-RAN 112.

At stage 29, the UE 105 sends a positioning message to the RAN node for 3GPP access or an N3IWF for non-3GPP access (not shown in FIG. 16B). The positioning message includes the routing identifier for the LMF 152 received in stage 19, the UE ID or one of the UE IDs received in stage 19, an authentication code to authenticate the UE ID and the priority indication received at stage 19. The positioning message also includes a positioning protocol (e.g. LPP) message which includes any location measurements or location estimate obtained in stage 28 and may identify the type of event being reported. The positioning protocol message may be ciphered using the ciphering information received at stage 19. Other content of the positioning message is not ciphered.

At stage 30, the UE 105 and the RAN node release the signaling channel (or signaling connection) in the case of 3GPP access.

At stage 31, for 3GPP access, the RAN node may obtain uplink location measurements of UE 105 signaling received at stage 28 and/or stage 29. The RAN node sends a network positioning message included in an N2 Transport message to an AMF 154 (which may be different to the AMF 154 for stages 11-20). The network positioning message includes any uplink location measurements obtained by the RAN node and the positioning protocol message, the UE ID, the authentication code and the priority indication received at stage 29. The RAN node also includes the routing identifier for the LMF 152 received at stage 29 in the N2 Transport message. The RAN node may use the priority indication to expedite sending of the network positioning message and/or to include information for additional UEs related to the same LMF 152 in the same network positioning message. Any information for additional UEs could be treated and processed separately by the LMF 152.

At stage 32, the AMF 154 invokes the Namf_Communication_N2InfoNotify service operation towards the LMF 152 indicated by the routing identifier received in stage 31. The service operation includes the network positioning message received in stage 31.

At stage 33, the LMF 152 identifies the UE 105 using the UE ID in the network positioning message and authenticates the UE ID using the authentication code in the network positioning message. The LMF 152 then deciphers the positioning protocol message in the network positioning message if this was ciphered. If inclusion of a location estimate in event reports was requested in stage 5 or stage 6, the LMF 152 uses any uplink location measurements included in the network positioning message and any location measurements or location estimate included in the positioning protocol message to determine or verify a location estimate for the UE 105. The LMF 152 may use the priority indication in the network positioning message to expedite or retard processing of the network positioning message at stage 33.

At stages 34-37, stages 30-33 of FIG. 15 are performed to return an indication of the trigger event to the external client 130 and a location estimate if this was requested.

At stage 38, the UE 105 continues to monitor for and detect further trigger events as in stage 25 and instigates stages 26-37 each time a trigger event is detected.

Figure 17:
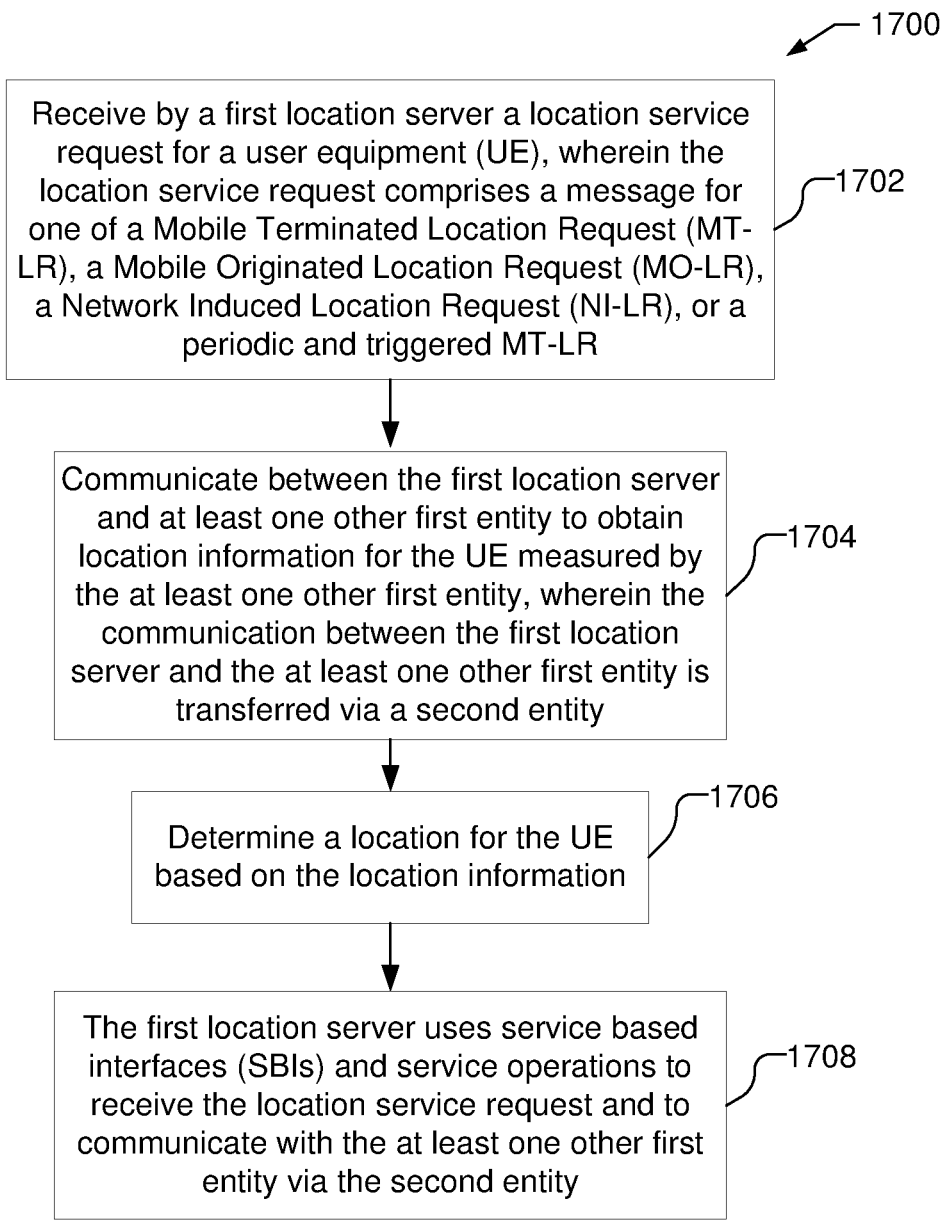
FIG. 17 shows a process flow illustrating a method of location support using service based interfaces.

FIG. 17 shows a process flow 1700 illustrating a method for supporting location services for a user equipment (UE), such as the UE 105, using service based interfaces. Process flow 1700 may be performed by a location server, such as an LMF (e.g. LMF 152) that supports the LMF based location solution discussed above. Process flow 1700 may start at block 1702, where a first location server (e.g. an LMF 152) receives a location service request for the UE, where the location service request comprises a message for one of a Mobile Terminated Location Request (MT-LR) (e.g., as at stage 5 or stage 6 of FIG. 13), a Mobile Originated Location Request (MO-LR) (e.g., as at stage 3 of FIG. 14), a Network Induced Location Request (NI-LR) (e.g. as at stage 3 of FIG. 9), or a periodic and triggered MT-LR (e.g., as at stage 5 or stage 6 of FIGS. 15, 16A and 16B).

At block 1704, the first location server communicates with at least one other first entity to obtain location information for the UE measured by the at least one other first entity, where the communication between the first location server and the at least one other first entity is transferred via a second entity. Block 1704 may correspond to stage 14 in FIG. 13 for an MT-LR, stage 6 in FIG. 14 for an MO-LR, stage 5 in FIG. 9 for an NI-LR, stage 27 or 28 in FIG. 15 for a periodic and triggered MT-LR, stage 30 or 31 in FIG. 16A for a periodic and triggered MT-LR, or stages 29, 31 and 32 in FIG. 16B for a periodic and triggered MT-LR.

At block 1706, a location is determined for the UE based on the location information. Block 1706 may correspond to part of stage 14 in FIG. 13 for an MT-LR, part of stage 6 in FIG. 14 for an MO-LR, part of stage 5 in FIG. 9 for an NI-LR, part of stage 28 in FIG. 15 for a periodic and triggered MT-LR, part of stage 31 in FIG. 16A for a periodic and triggered MT-LR, or part of stage 33 in FIG. 16B for a periodic and triggered MT-LR.

As shown in block 1708, the first location server uses service based interfaces (SBIs) and service operations to receive the location service request and to communicate with the at least one other first entity via the second entity. For example, and as described herein for Tables 1-3 and FIG. 13, a first location server that is an LMF (e.g. LMF 152) may receive a location service request for an MR-LR from a GMLC (e.g. GMLC 155V or GMLC 155H) using an LMF SBI and an Nlmf_ProvideLocation_Request service operation. Similarly, and as described for Tables 1-3 and FIG. 14, a first location server that is an LMF (e.g. LMF 152) may receive a location service request for an MO-LR from an AMF (e.g. AMF 154) using an AMF SBI and an Namf_Communication_N1MessageNotify service operation. Similarly, and as described for Tables 1-3 and FIG. 9, a first location server that is an LMF (e.g. LMF 152) may receive a location service request for an NI-LR from an AMF (e.g. AMF 154) using an AMF SBI and an Namf_EventExposure_Notify service operation. Similarly, and as described for Tables 1-3 and FIGS. 15, 16A and 16B, a first location server that is an LMF (e.g. LMF 152) may receive a location service request for a periodic and triggered MT-LR from a GMLC (e.g. GMLC 155V or GMLC 155H) using an LMF SBI and an Nlmf_ProvideLocation_Request service operation. Further, a first location server that is an LMF (e.g. LMF 152) may communicate with a first entity that is a UE (e.g. UE 105) to obtain the location information using an AMF SBI and an Namf_Communication_N1N2MessageTransport service operation and/or an Namf_Communication_N1MessageNotify service operation, as described for FIG. 6 for any of an MT-LR, MO-LR, NI-LR or periodic and triggered MT-LR. Further, a first location server that is an LMF (e.g. LMF 152) may communicate with a first entity that is an NG-RAN (e.g. NG-RAN 112) or a base station in an NG-RAN (e.g. a gNB 110 or ng-eNB 114) to obtain the location information using an AMF SBI and an Namf_Communication_N1N2MessageTransport service operation and/or an Namf_Communication_N2InfoNotify service operation, as described for FIG. 7 for any of an MT-LR, MO-LR, NI-LR or periodic and triggered MT-LR.

In one aspect of the process flow 1700, the UE may be in communication with a Radio Access Network (RAN) (e.g. NG-RAN 112) and the at least one other entity may comprise at least one of the UE, the RAN and an AMF (e.g. AMF 154). For example, the UE communication with the RAN may be based on a Next Generation RAN (NG-RAN) supporting a Fifth Generation (5G) radio interface such as New Radio (NR). Alternatively, the UE communication with the RAN may be based on an IEEE 802.11 Wireless Local Area Network radio interface (e.g. where the RAN comprises a WiFi AN which communicates with an N3IWF in a 5GCN such as serving 5GCN 150 for the UE). The first location server may be part of a 5G Core network (5GCN) (e.g., 5GCN 150). In one example, the first location server may be located in a home network for the UE (e.g. HLMMN 5GCN 140) where the UE is roaming in a visited network (e.g., VPLMN 150) different from the home network. In this example, the first location server may correspond to LMF 152H in communication system 300.

In another aspect, the first location server may be located in a serving network for the UE (e.g. 5GCN 150), which may also be a visited network for the UE (e.g., VPLMN 5GCN 150); for example, the first location server may then correspond to LMF 152 in communication system 100 or LMF 152V in communication system 200. In one example of this aspect, and as described for alternative A3 previously, a second location server (e.g. a VGMLC such as VGMLC 155 or 155V) located in the serving network may use a Network Repository Function (NRF) to request a set of available location servers in the serving (or visited) network and the second location server may select the first location server from the set of available location servers. In another example of this aspect, and as described for alternative A1 previously, a second location server (e.g. a VGMLC such as VGMLC 155 or 155V) located in the serving (or visited) network may be configured with all location servers in the serving (or visited) network and the second location server may select the first location server. In a further example of this aspect, and as described for alternative A2 previously, a second location server (e.g. a VGMLC such as VGMLC 155 or 155V) located in the serving (or visited) network may be configured with a set of location servers in the serving (or visited) network that the second entity is allowed to use, and the second location server may select the first location server.

In one aspect of process flow 1700, and as described for alternative A4 previously, the second entity selects the first location server and provides an address of the first location server to a Unified Data Management (e.g., UDM 156), where the Unified Data Management provides the address for the first location server to a querying second location server (e.g. an HGMLC such as HGMLC 155H).

In one aspect of process flow 1700, the UE is assigned to the first location server based on: (i) an identification of the UE (e.g. an IMSI, SUPI or IMEI) as described in association with FIG. 5; (ii) network slicing (e.g. as described for alternative A3 previously); or (iii) both of these.

In one aspect of process flow 1700, and as described for FIG. 13 (e.g. stages 5 and 6) and FIGS. 15-16B (e.g. stages 5 and 6), the first location server may receive at least one of the message for the MT-LR and the message for the periodic and triggered MT-LR from a second location server, which may be a Gateway Mobile Location Center (GMLC) (e.g. GMLC 155, VGMLC 155V or HGMLC 155H). The GMLC may be in a home network for the UE (e.g. may be an HGMLC such as HGMLC 155H) or may be in a visited network for the UE (e.g. may be a VGMLC such as VGMLC 155V). The GMLC may obtain privacy subscription requirements for the UE from a Unified Data Management (e.g., UDM 156). The first location server may use an SBI to communicate with the GMLC (e.g. an LMF SBI as described in association with Tables 1 and 3). The first location server may be combined with the second location server which may simplify network implementation (e.g. by avoiding support of an interface, such as an NLg* interface, and associated protocols or service operations between the first location server and the second location server).

In one aspect of process flow 1700, the second entity may be an Access and Mobility Management Function (AMF) (e.g., AMF 154). The first location server may use an SBI to communicate with the AMF (e.g. an AMF SBI as described in association with Table 2). In this aspect, the first location server may receive the message for the MO-LR from the AMF, as described previously in association with FIG. 14 (e.g. stage 3). The AMF may receive the message for the MO-LR from the UE (e.g. as at stage 2 in FIG. 14). In this aspect, the first location server may receive the message for the NI-LR from the AMF, as described previously in association with FIG. 9 (e.g. stage 3). For example, the first location server may receive the message for the NI-LR based on detection of an emergency call from the UE by the AMF (e.g. as for stage 2 in FIG. 9).

In one aspect of process flow 1700, the location service request may comprise the periodic and triggered MT-LR, where communicating between the first location server and the at least one other entity to obtain location information for the UE comprises requesting periodic or triggered location information from the UE using a positioning protocol (e.g. as described previously for FIG. 16A at stage 20 and for FIG. 16B at stage 19). For example, the positioning protocol may be the Long Term Evolution (LTE) Positioning Protocol (LPP), a Next Generation (NextGen) Positioning Protocol (NPP), a New Radio (NR) Positioning Protocol (NPP), or some combination of these (e.g. LPP combined with NPP).

In one aspect of process flow 1700, the second entity may become unavailable (e.g. may be taken out of service by a network operator) and the first location server may then select another second entity using a Network Repository Function (NRF).

In one aspect of process flow 1700, the process includes changing the second entity to support mobility of the UE (e.g. handover or cell change for the UE), where a location session between the first location server and the UE continues after the change of the second entity (e.g. as described previously in association with FIG. 13 for stage 14). As described previously in association with FIG. 13 for stage 14, in this aspect, the location session may support ultra high location accuracy.

In one aspect of process flow 1700, the location service request is the periodic and triggered MT-LR, and the first location server is used for all periodic or triggered location events (e.g. as described previously for FIG. 16A for stage 30 and FIG. 16B for stages 27-33).

Figure 18:
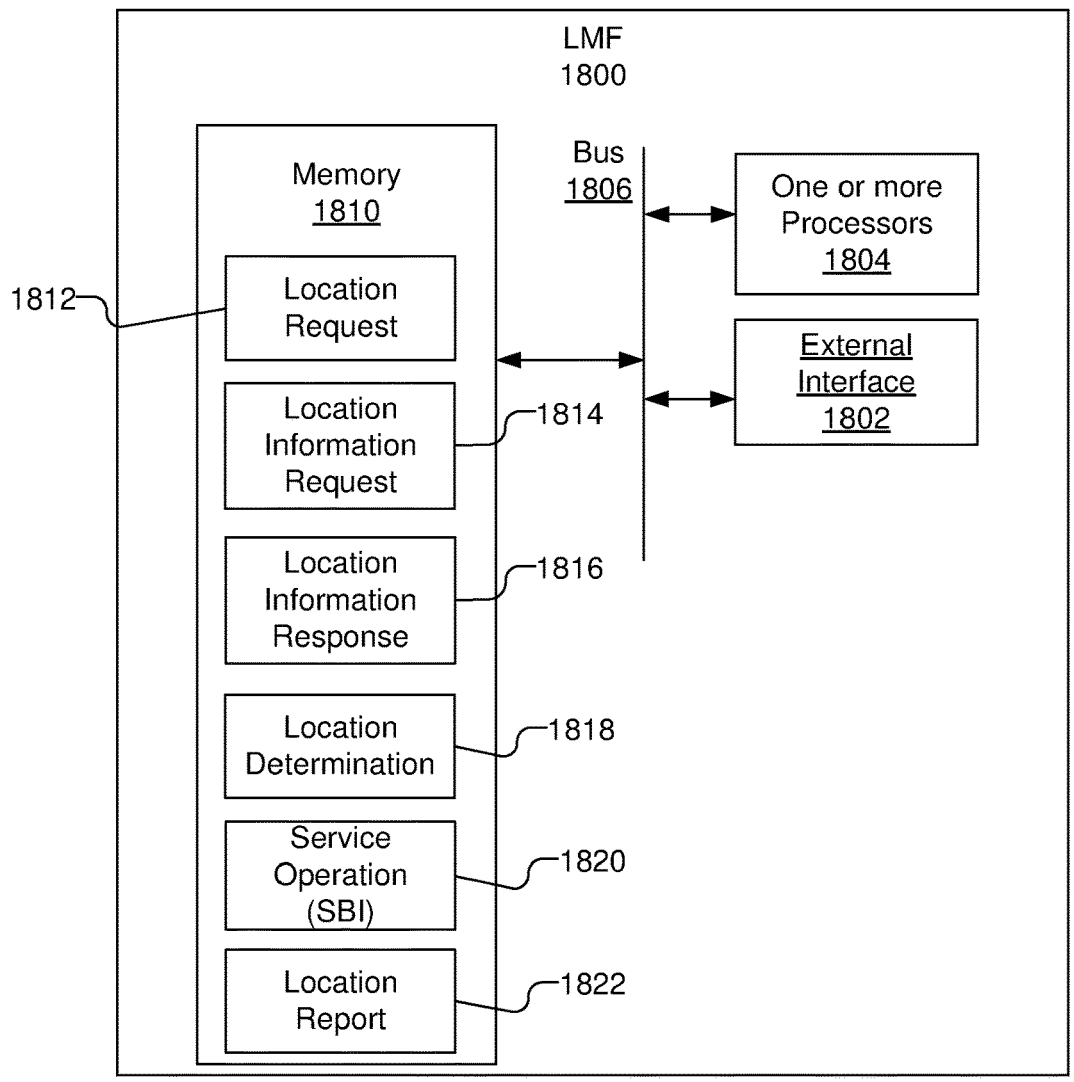
FIG. 18 is a block diagram of an embodiment of an LMF capable of supporting location services for a UE.

FIG. 18 is a diagram illustrating an example of a hardware implementation of an LMF 1800, such as LMF 152 shown in FIGS. 1-3. The LMF 1800 may be, e.g., part of a wireless network such as a 5G Core network (5GCN). The LMF 1800 includes, e.g., hardware components such as an external interface 1802, which may be a wired or wireless interface capable of connecting to a GMLC, such as GMLC 155, VGMLC 155V or HGMLC 155H, and an AMF, such as AMF 154. The LMF 1800 includes one or more processors 1804 and memory 1810, which may be coupled together with bus 1806. The memory 1810 may contain executable code or software instructions that when executed by the one or more processors 1804 cause the one or more processors 1804 to operate as a special purpose computer programmed to perform the procedures and techniques disclosed herein (e.g. such as the process flow 1700).

As illustrated in FIG. 18, the memory 1810 includes one or more components or modules that when implemented by the one or more processors 1804 implements the methodologies described herein. While the components or modules are illustrated as software in memory 1810 that is executable by the one or more processors 1804, it should be understood that the components or modules may be dedicated hardware either in the processors 1804 or off processor. As illustrated, the memory 1810 may include a location request unit 1812 that enables the one or more processors 1804 to receive via the external interface 1802 and process a location service request transmitted by an entity in the wireless network, such as another location server, e.g., a Gateway Mobile Location Center (GMLC), or an Access and Mobility Management Function (AMF). The location request may be in a message, e.g., a message for one of a Mobile Terminated Location Request (MT-LR), a Mobile Originated Location Request (MO-LR), a Network Induced Location Request (NI-LR), or a periodic and triggered MT-LR.

The memory 1810 may include a location information request unit 1814 and a location information response unit 1816 that cause the one or more processors 1804 to communicate via the external interface 1802 with at least one other first entity, such as the UE 105 or NG-RAN 112, to obtain location information for a UE (e.g. the UE 105) based on the location request received by the location request unit 1812, where the communication with the at least one other first entity may be transferred via a second entity. For example, where the location request is for a periodic and triggered MT-LR, the location information request unit 1814 may cause a request for periodic or triggered location information to be sent to the UE 105. The request for location information may be sent to the first entity, e.g., the UE 105 or NG-RAN 112, via a serving Access and Mobility Management Function (AMF) for the UE 105 (e.g. the AMF 154). The request for location information may be sent in a message for a positioning protocol, such as the Long Term Evolution (LTE) Positioning Protocol (LPP), a Next Generation (NextGen) Positioning Protocol (NPP), a New Radio (NR) Positioning Protocol (NPP), a Next Generation (NextGen) Positioning Protocol A (NPPa), or a New Radio (NR) Positioning Protocol A (NRPPa).

The location information response unit 1816 may enable the one or more processors 1804 to receive via the external interface 1802 the requested location information measured by the first entity. The location information may be received from the first entity, e.g., the UE 105 or NG-RAN 112, via a serving Access and Mobility Management Function (AMF) for the UE (e.g. AMF 154). The received location information may be in a message for a positioning protocol, such as the Long Term Evolution (LTE) Positioning Protocol (LPP), a Next Generation (NextGen) Positioning Protocol (NPP), a New Radio (NR) Positioning Protocol (NPP), a Next Generation (NextGen) Positioning Protocol A (NPPa), or a New Radio (NR) Positioning Protocol A (NRPPa).

The memory 1810 may include a location determination unit 1818 that causes the one or more processors 1804 to determine a location for the UE using, at least in part, the location information received by the location information response unit 1816. For example, the location determination unit 1818 may cause the one or more processors 1804 to determine an estimated location for the UE using the received location information by using one or more position methods, such as, for example, GNSS, Assisted GNSS (A-GNSS), Advanced Forward Link Trilateration (AFLT), Observed Time Difference Of Arrival (OTDOA), WLAN or Enhanced Cell ID (ECID) or combinations thereof.

The memory 1810 may also include a service operation unit 1820 that causes the one or more processors 1804 to use service based interfaces (SBIs) and service operations to receive the location request and to communicate with the at least one other first entity via the second entity.

In some implementations, the memory 1810 may also include a location report unit 1822 that causes the one or more processors 1804 to send via the external interface 1802, the estimated location determined with the location determination unit 1818 to the entity that transmitted the location request, which may be another location server.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1810) and executed by one or more processor units (e.g. processors 1804), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1810, and are configured to cause the one or more processors (e.g. processors 1804) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server (e.g. an LMF 1800) capable of supporting location services for a user equipment (UE) using service based interfaces, may include a means for receiving by a first location server (e.g. LMF 1800) a location service request for the UE, where the location service request comprises a message for one of a Mobile Terminated Location Request (MT-LR), a Mobile Originated Location Request (MO-LR), a Network Induced Location Request (NI-LR), or a periodic and triggered MT-LR, which may be, e.g., the external interface 1802 and one or more processors 1804 with dedicated hardware or implementing executable code or software instructions in memory 1810 such as the location request unit 1812. A means for communicating between the first location server and at least one other first entity to obtain location information for the UE measured by the at least one other first entity, wherein the communication between the first location server and the at least one other first entity is transferred via a second entity, may include, e.g., the external interface 1802 and one or more processors 1804 with dedicated hardware or implementing executable code or software instructions in memory 1810 such as the location information request unit 1814 and the location information response unit 1816. The first location server may use service based interfaces (SBIs) and service operations to receive the location service request and to communicate with the at least one other first entity via the second entity. A means for determining a location for the UE based on the location information may be, e.g., the one or more processors 1804 with dedicated hardware or implementing executable code or software instructions in memory 1810 such as the location determination unit 1818.

Figure 19:
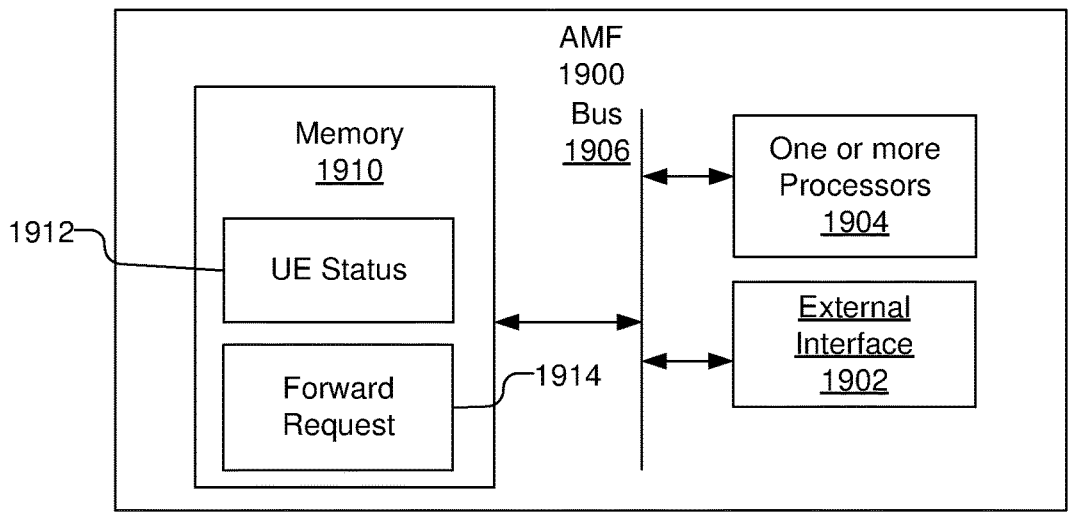
FIG. 19 is a block diagram of an embodiment of an Access and Mobility Management Function (AMF) capable of supporting location services for a UE.

FIG. 19 is a diagram illustrating an example of a hardware implementation of an AMF 1900, such as AMF 154 shown in FIGS. 1-3. The AMF 1900 includes, e.g., hardware components such as an external interface 1902, which may be a wired or wireless interface capable of connecting to an LMF, such as LMF 152 shown in FIGS. 1-3, and to a RAN or NG-RAN, such as NG-RAN 112. The AMF 1900 includes one or more processors 1904 and memory 1910, which may be coupled together with bus 1906. The memory 1910 may contain executable code or software instructions that when executed by the one or more processors 1904 cause the one or more processors 1904 to operate as a special purpose computer programmed to perform the procedures and techniques disclosed herein.

As illustrated in FIG. 19, the memory 1910 includes one or more components or modules that when implemented by the one or more processors 1904 implements the methodologies as described herein. While the components or modules are illustrated as software in memory 1910 that is executable by the one or more processors 1904, it should be understood that the components or modules may be dedicated hardware either in the processor or off processor. As illustrated, the memory 1910 may include a UE status unit 1912 that causes the one or more processors 1904 to receive via the external interface 1902 a status request for a UE 105 from an LMF 152 (e.g. using an AMF SBI and a service operation), to page the UE 105 to place the UE 105 in a connected state and to forward the UE 105 status to the LMF 152 (e.g. using an AMF SBI and a service operation). The memory 1910 may include a forward request unit 1914 that causes the one or more processors 1904 to receive via the external interface 1902 a location request such as a Mobile Originated Location Request (MO-LR) for a UE 105 or an indication of an emergency call for a UE 105 and to forward the location request or the indication of the emergency call to the LMF 152 (e.g. using an AMF SBI and a service operation).

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1910, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 20:
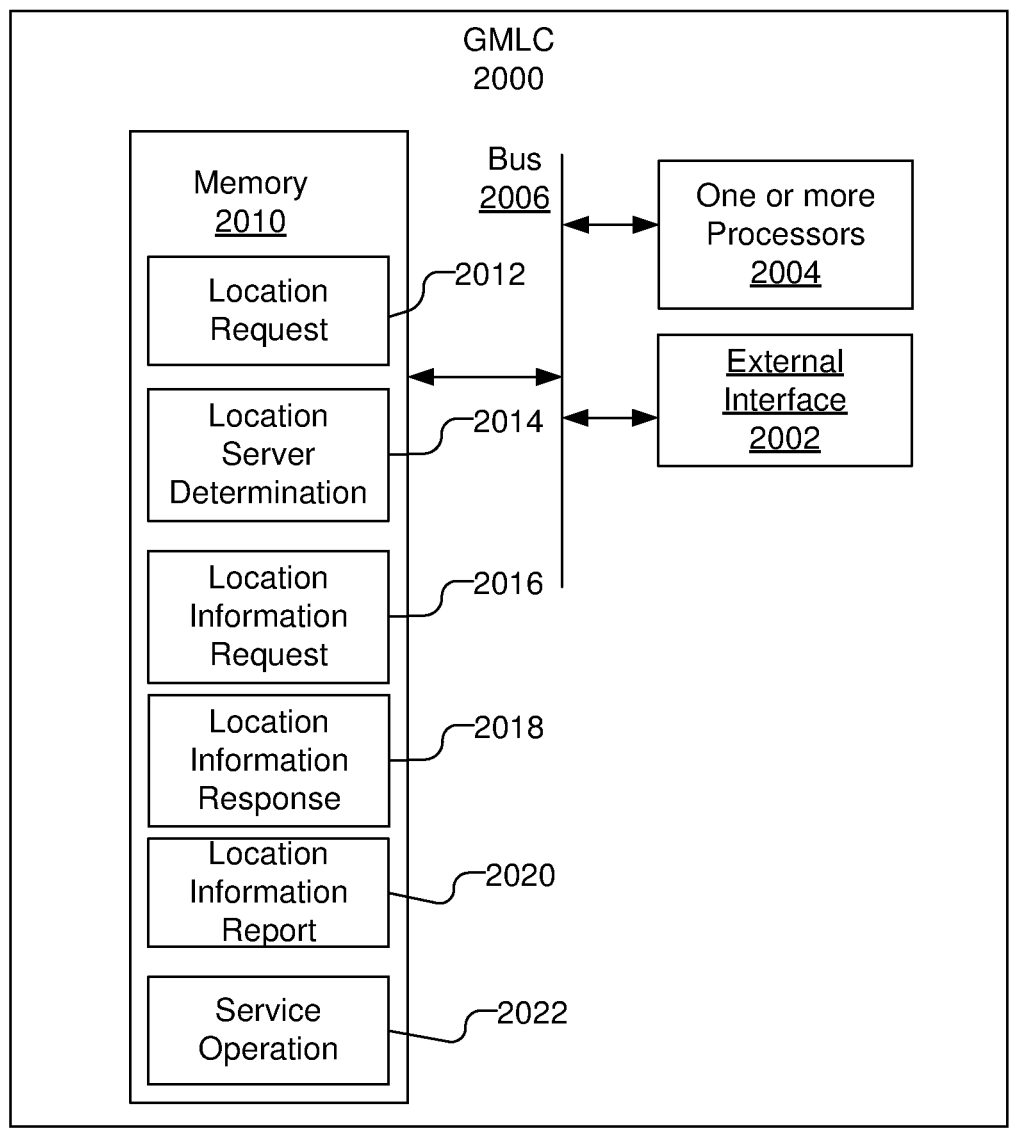
FIG. 20 is a block diagram of an embodiment of a GMLC capable of supporting location services for a UE.

FIG. 20 is a diagram illustrating an example of a hardware implementation of a GMLC 2000, such as GMLC 155 shown in FIGS. 1-3. GMLC 2000 in FIG. 20 may also be representative of an NEF such as NEF 159. The GMLC 2000 may be, e.g., part of a wireless network such as a 5G Core network (5GCN) 150 or 5GCN 140. The GMLC 2000 includes, e.g., hardware components such as an external interface 2002, which may be a wired or wireless interface capable of connecting to an external client 130, to LMF 152 shown in FIGS. 1-3, to another GMLC, such as VGMLC 155V or HGLMC 155H, to UDM 156, LRF 157, and/or NEF 159. The GMLC 2000 includes one or more processors 2004 and memory 2010, which may be coupled together with bus 2006. The memory 2010 may contain executable code or software instructions that when executed by the one or more processors 2004 cause the one or more processors to operate as a special purpose computer programmed to perform the procedures and techniques disclosed herein.

As illustrated in FIG. 20, the memory 2010 includes one or more components or modules that when implemented by the one or more processors 2004 implements the methodologies as described herein. While the components or modules are illustrated as software in memory 2010 that is executable by the one or more processors 2004, it should be understood that the components or modules may be dedicated hardware either in the processors 2004 or off processor. As illustrated, the memory 2010 may include a location request unit 2012 that enables the one or more processors 2004 to receive via the external interface 2002 and process a location request or indication of an emergency call transmitted by an entity in the network, e.g., another Gateway Mobile Location Center (e.g., a GMLC 155), an external client 130, an NEF 159, or an LMF 152. The location request may be in a message for e.g., a request for a location of a UE 105, a request for a periodic and triggered location of a UE 105, or an indication of an emergency call for a UE 105.

The memory 2010 may include a location server determination unit 2014 that causes the one or more processors 2004 to determine a second location server, which may be, e.g., a Location Management Function (e.g., LMF 152). The one or more processors 2004 may determine the second location server based, at least in part, on the received location request or indication of the emergency call. For example, the received location request or indication of the emergency call may include an address of the second location server which is used to determine the second location server. In another example, the received location request may include at least one of an identity (ID) for the UE 105, a first address of a serving node, e.g., an Access and Mobility Management Function (e.g. AMF 154), for the UE 105 and a location Quality of Service (QoS) for the UE 105, and the second location server is determined based, at least in part, on at least one of the ID, the first address and the QoS. For example, where the location request includes the ID for the UE, the location server determination unit 2014 may cause the one or more processors 2004 to cause the external interface 2002 to transmit a request to a Unified Data Management (e.g. UDM 156), that includes the ID for the UE, to receive a response from the UDM that includes a second address, wherein the second location server is determined based, at least in part, on at least one of the second address and the QoS.

The memory 2010 may include a location information request unit 2016 that causes the one or more processors 2004 to send via the external interface 2002 a request for location information to the second location server to request location information for the UE 105. The memory 2010 may include a location information response unit 2018 that enables the one or more processors 2004 to receive via the external interface 2002 the location information requested from the second location server. The memory 2010 may include a location information report unit 2020 that enables the one or more processors 2004 to send via the external interface 2002 the location information received from the second location server to another entity. The memory 2010 may also include a service operation unit 2022 that causes the one or more processors 2004 to use service based interfaces (SBIs) and service operations to receive the location request, to send the request for location information, to receive the requested location information and/or to send the location report.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 2010, and are configured to cause the one or more processors 2004 to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 21:
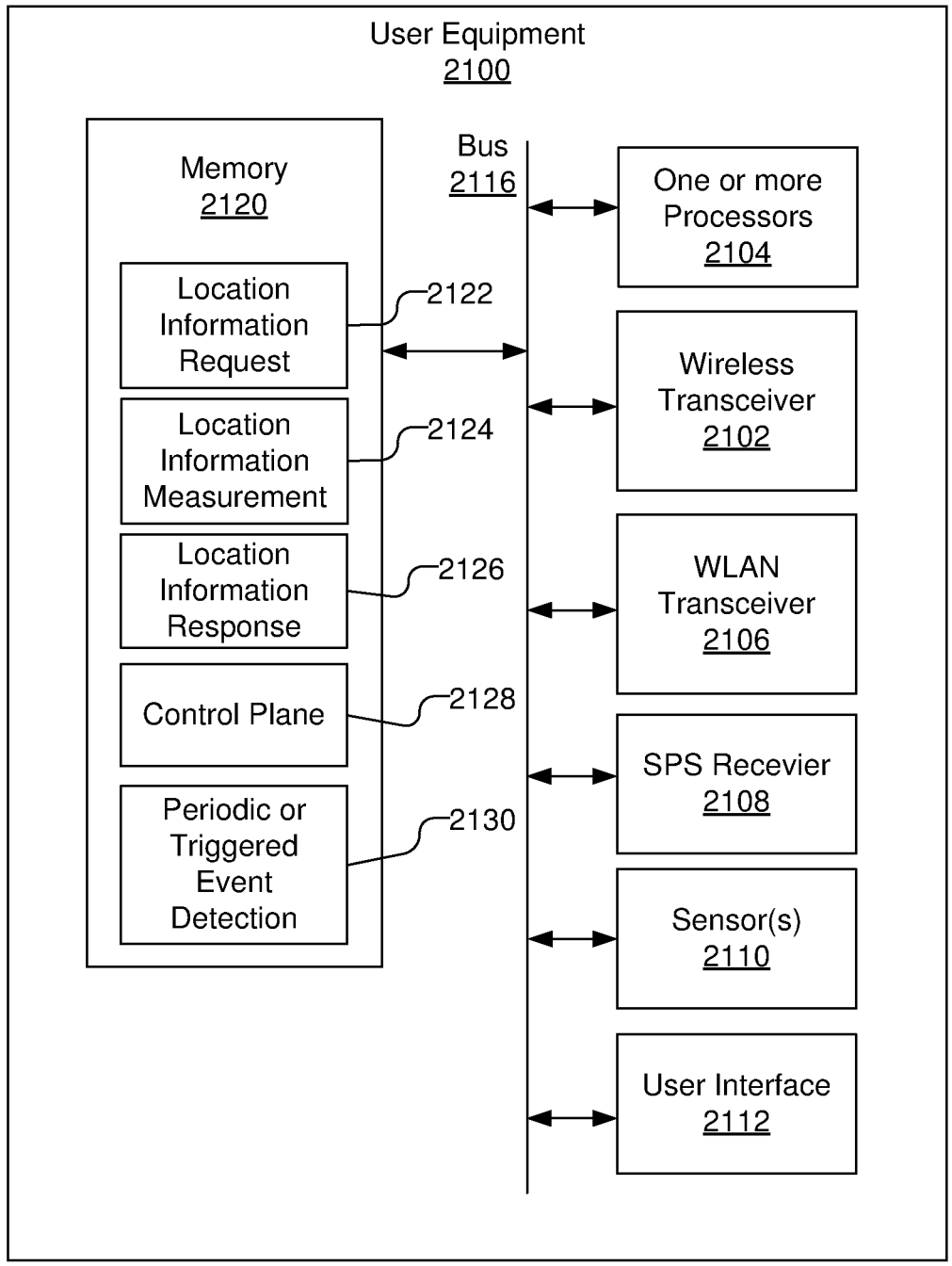
FIG. 21 is a block diagram of an embodiment of a UE capable of supporting location services for the UE.

FIG. 21 is a diagram illustrating an example of a hardware implementation of UE 2100, such as UE 105 shown in FIGS. 1-3. The UE 2100 may include a wireless transceiver 2102 to wirelessly communicate with an NG-RAN 112, e.g., base stations such as gNB 110 or ng-eNB 114 (shown in FIGS. 1-3). The UE 2100 may also include additional transceivers, such a wireless local area network (WLAN) transceiver 2106, as well as an SPS receiver 2108 for receiving and measuring signals from SPS SVs 190 (shown in FIGS. 1-3). The UE 2100 may further include one or more sensors 2110, such as cameras, accelerometers, gyroscopes, electronic compass, magnetometer, barometer, etc. The UE 2100 may further include a user interface 2112 that may include e.g., a display, a keypad or other input device, such as virtual keypad on the display, through which a user may interface with the UE 2100. The UE 2100 further includes one or more processors 2104 and memory 2120, which may be coupled together with bus 2116. The one or more processors 2104 and other components of the UE 2100 may similarly be coupled together with bus 2116, a separate bus, or may be directly connected together or coupled using a combination of the foregoing. The memory 2120 may contain executable code or software instructions that when executed by the one or more processors 2104 cause the one or more processors to operate as a special purpose computer programmed to perform the methods and procedures disclosed herein.

As illustrated in FIG. 21, the memory 2120 may include one or more components or modules that may be implemented by the one or more processors 2104 to perform the methodologies described herein. While the components or modules are illustrated as software in memory 2120 that is executable by the one or more processors 2104, it should be understood that the components or modules may be dedicated hardware either in the one or more processors 2104 or off the processors. As illustrated, the memory 2120 may include a location information request unit 2122 that enables the one or more processors 2104 to receive via the wireless transceiver 2102 and process a request for location information for the UE 2100 transmitted by a location server, e.g., Location Management Function (e.g. LMF 152). The location server sends the request for location information to the UE 2100 in response to receiving a message (e.g. via an SBI and service operation) for one of a Mobile Terminated Location Request (MT-LR), a Mobile Originated Location Request (MO-LR), an indication of an emergency call for the UE 2100, or a periodic and triggered MT-LR.

The memory 2120 may include a location information measurement unit 2124 that causes the one or more processors 2104 to obtain the requested location information. The memory 2110 may additionally include a location information response unit 2126 that causes the one or more processors 2104 to send via the wireless transceiver 2102 the requested location information to the location server. The location server determines a location for the UE 2100 based on the location information sent by the UE 2100. The memory 2120 may also include a control plane unit 2128 that causes the one or more processors 2104 to use control plane interfaces and control plane protocols to receive the location information request and to send the location information response. For example, the control plane unit 2128 may assist or enable the location server to use service based interfaces (SBIs) and service operations to send the location information request to UE 2100 and to receive the location information response from UE 2100.

The memory 2120 may also include a periodic or triggered event detection unit 2130 that causes the one or more processors 2104 to monitor and detect periodic or triggered events. The periodic or triggered event detection unit 2130 when implemented by the one or more processors 2104 configures the one or more processors 2104 to receive and monitor trigger parameters, e.g., provided in the request for location information from the location server. The trigger parameters may include, e.g., a trigger evaluation interval, a periodic maximum reporting interval, and one or more location triggers, such as a change of location, an entry into, an exit from or a remaining within a defined geographic area, a movement by more than a threshold linear distance from a previous location, etc. When a trigger event is detected, the location information measurement unit 2124 may cause the one or more processors 2104 to obtain the requested location information and the location information response unit 2126 causes the location information to be sent.

The methodologies described herein may be implemented by various means depending upon the application. For example, these methodologies may be implemented in hardware, firmware, software, or any combination thereof. For a hardware implementation, the one or more processors 2104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 2100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 2120) and executed by one or more processors 2104, causing the one or more processors 2104 to operate as a special purpose computer programmed to perform the techniques disclosed herein. Memory may be implemented within the one or processors 2104 or external to the one or more processors 2104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 2100 may be stored as one or more instructions or code on a non-transitory computer-readable storage medium such as memory 2120. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 2100 may be provided as signals on transmission media included in a communication apparatus. For example, a communication apparatus comprising part or all of UE 2100 may include a transceiver having signals indicative of instructions and data. The instructions and data are stored on non-transitory computer readable media, e.g., memory 2120, and are configured to cause the one or more processors 2104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

One or more of the following abbreviations apply for the purposes of the present document.

TABLE 4

| | |
|---|---|
| 5GCN | 5G Core Network |
| 5GS | 5G System |
| 5G-AN | 5G Access Network |
| 5G-GUTI | 5G Globally Unique Temporary Identifier |
| 5G-S-TMSI | 5G S-Temporary Mobile Subscription Identifier |
| 5QI | 5G QoS Identifier |
| AF | Application Function |
| AMF | Access and Mobility Management Function |
| AS | Access Stratum |
| AUSF | Authentication Server Function |
| CP | Control Plane |
| DL | Downlink |
| DN | Data Network |
| DNAI | DN Access Identifier |
| DNN | Data Network Name |
| FQDN | Fully Qualified Domain Name |
| GFBR | Guaranteed Flow Bit Rate |
| GUAMI | Globally Unique AMF Identifier |
| HR | Home Routed (roaming) |
| LADN | Local Area Data Network |
| LBO | Local Break Out (roaming) |
| MFBR | Maximum Flow Bit Rate |
| MICO | Mobile Initiated Connection Only |
| N3IWF | Non-3GPP InterWorking Function |
| NAI | Network Access Identifier |
| NEF | Network Exposure Function |
| NF | Network Function |
| NR | New Radio |
| NRF | Network Repository Function |
| NSSAI | Network Slice Selection Assistance Information |
| NSSF | Network Slice Selection Function |
| NSSP | Network Slice Selection Policy |
| PCF | Policy Control Function |
| PEI | Permanent Equipment Identifier |
| PER | Packet Error Rate |
| PFDF | Packet Flow Description Function |
| PPD | Paging Policy Differentiation |
| PPI | Paging Policy Indicator |
| QFI | QoS Flow Identifier |
| QoE | Quality of Experience |
| (R)AN | (Radio) Access Network |

TABLE 4-continued

| | |
|---|---|
| RQA | Reflective QoS Attribute |
| RQI | Reflective QoS Indication |
| SA NR | Standalone New Radio |
| SBA | Service Based Architecture |
| SBI | Service Based Interface |
| SD | Slice Differentiator |
| SEAF | Security Anchor Functionality |
| SMF | Session Management Function |
| S-NSSAI | Single Network Slice Selection Assistance Information |
| SSC | Session and Service Continuity |
| SST | Slice/Service Type |
| SUPI | Subscription Permanent Identifier |
| UDSF | Unstructured Data Storage Function |
| UL | Uplink |
| UL CL | Uplink Classifier |
| UPF | User Plane Function |
| UDR | Unified Data Repository |

It may be advantageous in some PLMNs to support coexistence of the LMF based location solution as described herein with an AMF based location solution such as the Location Solution defined by 3GPP in Release 15. For example, the LMF based solution could be used to support commercial location of a UE 105 using an MT-LR, MO-LR and/or periodic and triggered MT-LR, e.g. as described herein in association with FIGS. 13-16B. Conversely, an AMF based location solution might be used to support location of a UE 105 for regulatory services such as for emergency calls from a UE 105. For example, the AMF based location solution might be preferred (e.g. by an operator of a PLMN 150) for regulatory location services due to greater compatibility with the 3GPP EPC location solution for LTE access defined in 3GPP TS 23.271, whereas the LMF based location solution might be preferred for commercial location due to greater efficiency, lower implementation and better scalability.

Figure 22:
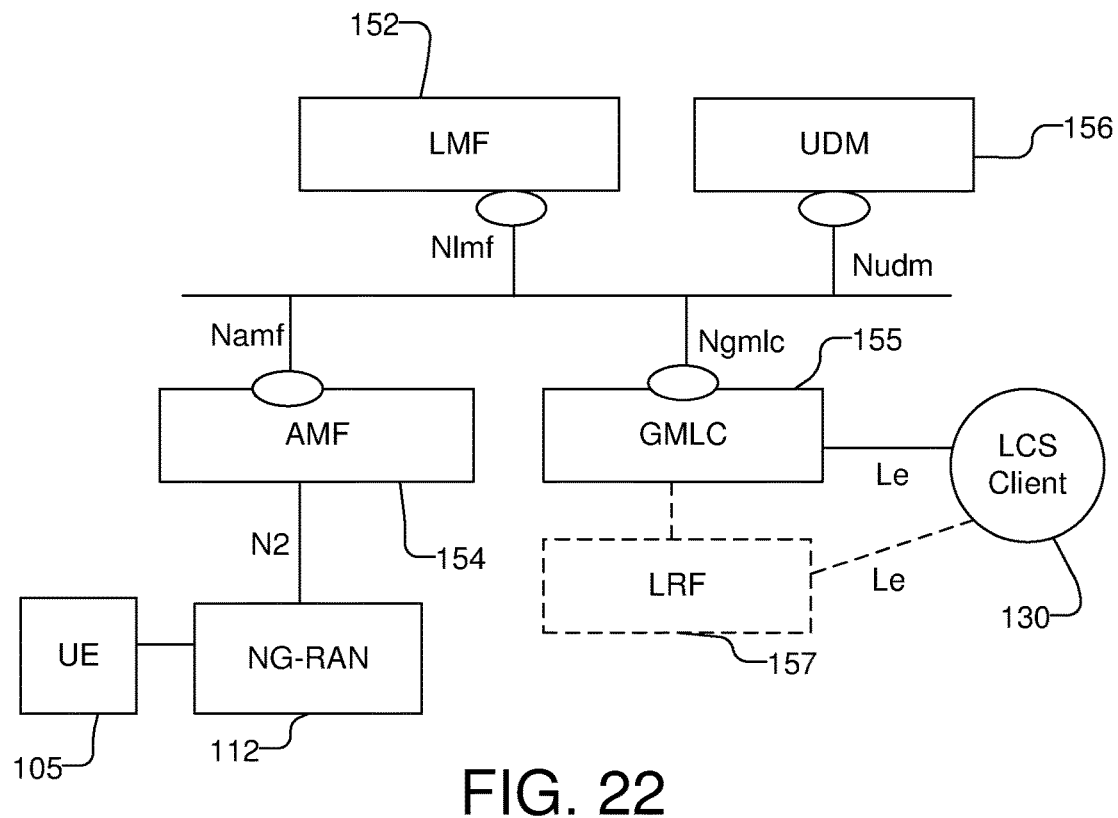
FIGS. 22 and 23 show service based and reference point representations, respectively, for a non-roaming architecture for the LMF based solution.
Figure 23:
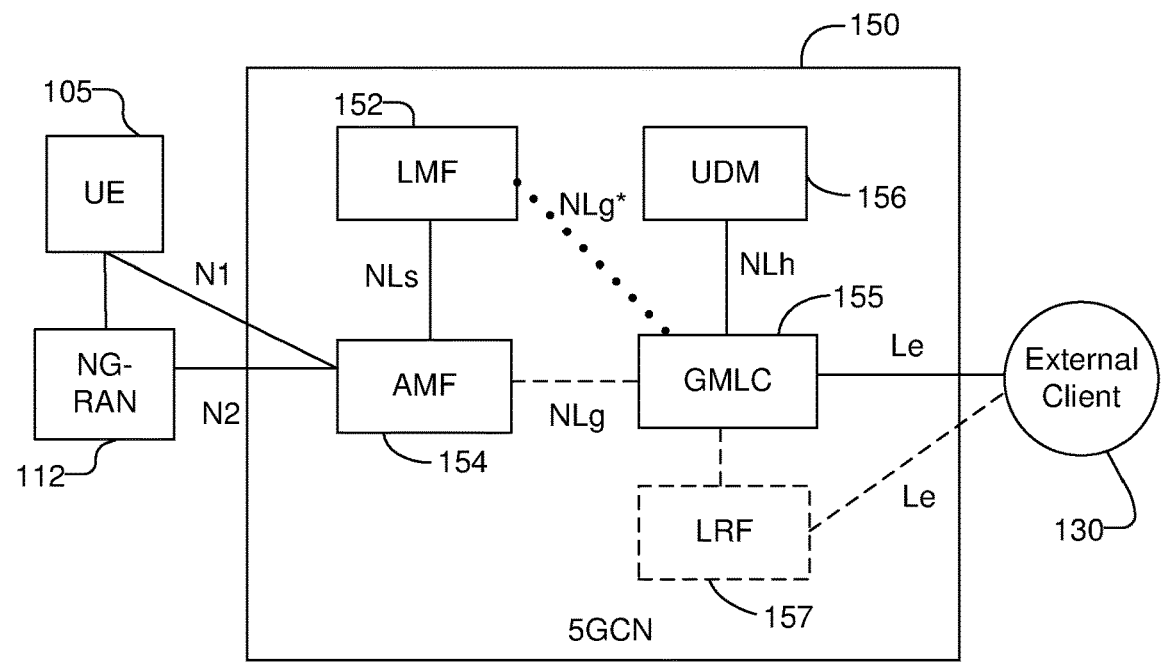

FIGS. 22 and 23 show service based and reference point representations, respectively, for the non-roaming architecture for the LMF based solution from FIGS. 4A and 1, respectively, with some details from FIGS. 4A and 1 omitted for clarity. The figures also show differences to the non-roaming architecture for the AMF based location solution for 3GPP Release 15 in 3GPP TS 23.501. The differences are highlighted by showing Network Functions (NFs) and reference points which are present in the 3GPP Release 15 solution but may not be present in the LMF based solution using dashed lines and by showing NFs and reference points present for the LMF based solution but not present for the 3GPP Release 15 solution using dotted lines.

FIGS. 22 and 23 show that there are only two major differences. First, an LRF 157 is present for the 3GPP Rel-15 solution but may be absent for the LMF based solution. As the LRF 157 provides support for regulatory location services but not commercial location services, it may not be needed for commercial location support by the LMF based solution (e.g. assuming the LMF based solution does not need to support regulatory location services). The second difference concerns the replacement of the NLg reference point between the GMLC 155 and AMF 154 in the AMF based location solution in 3GPP Release 15 by an NLg* reference point between the GMLC 155 and LMF 152 in the LMF based location solution. The consequences of this are described further down.

Apart from these differences, the AMF based location solution and the LMF based location solution may use the same set of NFs and the same set of reference points. In a PLMN, in which both solutions were present, the non-roaming architecture would be as shown in FIGS. 22 and 23 with all NFs and all reference points in each figure being present. This illustrates how both solutions may coexist in the same PLMN. The coexistence can be associated with a set of procedures and signaling supported by the common NFs (e.g. GMLC 155, AMF 154, LMF 152, NG-RAN 112 and UE 105) for regulatory location using the AMF based solution and another set of procedures and signaling for commercial location as supported by these common NFs for the LMF based solution.

Thus, it can be seen that the LMF based location solution can coexist with the AMF based location solution in 3GPP Release 15 in the same PLMN.

There may be additionally coexistence on the N1 Reference Point between the UE 105 and AMF 154. The description of the procedures for the LMF based solution in FIGS. 6-16B shows that AMF service operations (e.g. as defined for 3GPP Release 15) can be used to support all communication between an LMF 152 and UE 105 for both supplementary services and positioning for the LMF based location solution. Usage of AMF service operations to support supplementary services occurs in stages 10 and 11 of FIG. 13, stages 2, 3, 11 and 12 of FIG. 14, stages 16, 17, 19, 20, 27 and 29 of FIG. 15, stages 16 and 17 of FIG. 16A and stages 16, 17, and possibly stages 19 and 20 of FIG. 16B. Transfer of a supplementary services message from an LMF 152 to a UE 105 in these stages may be based on 3GPP Release 15 support for NAS transport message transfer from an AMF 154 to the UE 105 as described in 3GPP TS 23.502 and 24.501. Transfer of a supplementary services message from a UE 105 to an LMF 152 may also be based on NAS transport message transfer from a UE 105 to an AMF 154 and may make use of a routing identifier added for positioning message transfer, as described herein for FIG. 6, to identify a destination LMF. The only departure from 3GPP Release 15 may be to introduce a "default routing identifier" which may be used to route to any LMF, as selected by an AMF 154, when transferring an MO-LR request message from a UE 105 where there is no preassigned LMF 152 (e.g. as described previously herein for stages 2 and 3 of FIG. 14 and stage 27 of FIG. 15). This could be a new enhancement but may be backward compatible with a UE 105 supporting 3GPP Release 15 by defining a default routing identifier which can be configured in later UEs and ensuring that the default routing identifier is never assigned to a particular LMF in any PLMN.

Transfer of positioning messages between an LMF 152 and UE 105 (e.g. as at stage 14 of FIG. 13, stage 6 of FIG. 14, stages 18 and 28 of FIG. 15, stages 20, 21, 30 and 31 of FIG. 16A) may use the same transfer procedures as in 3GPP Release 15, which may be as described previously herein for FIG. 6, which may be based on AMF service operations using NAS transport messages.

With the exception of a default routing identifier, the LMF based solution may introduce no new changes to the N1 reference point and thus could be used with a legacy UE 105 supporting 3GPP Release 15 for location procedures (e.g. 5GC-MT-LR without UE privacy notification) which do not demand new UE functions.

Thus, it can be seen that the LMF based location solution can reuse existing location related procedures and signaling for the N1 interface from 3GPP Release 15 with the exception of defining a new default routing identifier for supplementary service message transfer from a UE 105 to an LMF 152.

There may additionally be coexistence on an N2 reference point between the NG-RAN 112 and LMF 152. Use of the N2 reference point to support message transfer between a UE 105 and LMF 152 for the LMF based location solution was described earlier herein and may not result in any new impact to the N2 reference point.

The N2 reference point can be used by both the AMF based location solution in 3GPP Release 15 and the LMF based location solution to transfer positioning messages between an LMF 152 and an NG-RAN 112 node (e.g. a gNB 110 or ng-eNB 114) to support network assisted positioning and non-UE associated network assistance data. This may occur for the LMF based solution, as described previously herein, in stage 14 of FIG. 13, stage 6 of FIG. 14, stages 18 and 28 of FIG. 15, stages 18 and 31 of FIG. 16A and stages 18, 31 and 32 of FIG. 16B. Message transfer for each of these stages can use AMF service operations and N2 transport operations from 3GPP Release 15, the same as the AMF based location solution in Release 15 as described in 3GPP TS 23.502 and in FIGS. 7 and 8 herein. There may thus be no new impact to the N2 reference point.

Thus, it can be seen that the LMF based location solution can reuse existing N2 transport operations and associated AMF service operations from 3GPP Release 15 to support transfer of positioning messages between an LMF 152 and NG-RAN 112 node.

There may additionally be coexistence on an NLs reference point between an AMF 154 and LMF 152. For the AMF based location solution in 3GPP Release 15, the NLs reference point may support the following LMF services and service operations as defined in 3GPP TS 23.502, which may be used by a consumer AMF for the AMF based Release 15 location solution.

TABLE 5

| Service Name | Service Operations | Operation Semantics | Release 15 Location Consumer | LMF Based Solution Consumer |
|---|---|---|---|---|
| Nlmf_Location | DetermineLocation | Request/Response | AMF | None |

Table 5 illustrates the LMF services which may be consumed by an AMF 154. The services and service operations in Table 5 may not be used by the LMF based solution, nor may any other equivalent service be needed on any other reference point for the LMF based solution. Thus, this portion of the AMF based location solution in 3GPP Release 15 may not need to be replicated in any way for the LMF based solution and may be used by a PLMN that supports both solutions for regulatory location but not commercial location.

The NLs reference point may also support the following AMF services and service operations as defined in 3GPP TS 23.502 which may be used by a consumer LMF 152 for both the AMF based 3GPP Release 15 location solution and the LMF based location solution.

TABLE 6

| Service Name | Service Operations | Operation Semantic | AMF based solution consumer | LMF based solution consumer |
|---|---|---|---|---|
| Namf_Communication | N1MessageNotify | Subscribe/Notify | LMF | LMF |
| | N1MessageSubscribe | | note 1 | note 1 |
| | N1MessageUnSubscribe | | note 1 | note 1 |
| | N1N2MessageTransfer | Request/Response | LMF | LMF |
| | N2InfoSubscribe | Subscribe/Notify | note 1 | note 1 |
| | N2InfoUnSubscribe | | note 1 | note 1 |
| | N2InfoNotify | | LMF | LMF |
| Namf_EventExposure | Subscribe | Subscribe/Notify | None | LMF |
| | Unsubscribe | Subscribe/Notify | None | note 1 |
| | Notify | Subscribe/Notify | None | LMF |
| Namf_MT | EnableUEReachability | Request/Response | None | LMF |

Note 1:
usage of these service operations by a consumer LMF 152 could possibly occur as part of an implementation.

Table 6 illustrates the AMF 154 services which may be consumed by an LMF 152. The AMF 154 service operations used for both AMF based 3GPP Release 15 location and the LMF based location solution may provide transfer of positioning messages and, for the LMF based solution, supplementary services messages, between an LMF 152 and a UE 105 or NG-RAN 112 node (e.g. a gNB 110 or ng-eNB 114). Except for use of a default routing identifier, as described previously herein, the usage of these service operations may be the same for both solutions.

The additional AMF based service operations used by the LMF based solution but not the AMF based location solution in 3GPP Release 15 that are shown in Table 6 may enable an LMF 152 to request an AMF 154 to enable UE 105 reachability and to subscribe to immediate or later notification of UE 105 reachability and current serving cell ID. The AMF Namf_EventExposure service operation may also enable provision of information regarding UE 105 subscription to MO-LR service as described herein for stages 4 and 5 of FIG. 14. Alternatively, a new AMF (or possibly UDM) service operation might be defined to enable an LMF 152 to request and obtain this information.

Thus, it can be seen that the LMF based location solution may not require use of LMF service operations for the AMF based solution in 3GPP Release 15 and can instead reuse existing AMF service operations from 3GPP Release 15 with the exception of adding a default routing identifier for supplementary service message transfer and adding support of MO-LR subscription information to the AMF Namf_EventExposure service operation or adding a new AMF service operation for this.

There may additionally be coexistence on an NLg reference point between a GMLC 155 and an AMF 154 and on an NLg* reference point between a GMLC 155 and an LMF 152. For the AMF based location solution in 3GPP Release 15, the NLg reference point may support the AMF services and service operations shown in Table 7, as defined in 3GPP TS 23.502 which may be used by a consumer GMLC 155.

TABLE 7

| Service Name | Service Operations | Operation Semantic | Release 15 Location Consumer |
| --- | --- | --- | --- |
| Namf_Location | ProvideLocation | Request/Response | GMLC |
| | EventNotify | Notify | GMLC |

For the LMF based location solution, the NLg* reference point may support the LMF services and service operations shown in Table 8, as described earlier herein in Tables 1 and 3, which may be used by a consumer GMLC 155.

TABLE 8

| Service Name | Service Operations | Operation Semantics | LMF based solution consumer |
| --- | --- | --- | --- |
| Nlmf_ProvideLocation | Obtain UE Location | Request/Response | GMLC |
| Nlmf_EventNotify | Report a UE location related event | Notify | GMLC |

The AMF Namf_Location ProvideLocation service operation shown in Table 7 for the AMF based location solution in 3GPP Release 15 may correspond to (e.g. may transfer the same information as) the LMF Nlmf_ProvideLocation service operation shown in Table 8 for the LMF based solution. Similarly, the AMF Namf_Location EventNotify service operation shown in Table 7 for the AMF based location solution in 3GPP Release 15 may correspond to (e.g. may transfer the same information as) the LMF Nlmf_EventNotify service operation shown in Table 8 for the LMF based location solution. The main differences between these corresponding service operations may be as follows: (i) the service operations may be provided by an AMF (e.g. AMF 154) for the AMF based solution and by an LMF (e.g. LMF 152) for the LMF based solution; and (ii) the service operations may support access to regulatory location services for the AMF based solution and to commercial location services for the LMF based solution.

The first difference in (i) above may transfer functional support from an AMF (e.g. AMF 154) for the AMF based solution to an LMF (e.g. LMF 152) for the LMF based solution. For a PLMN already supporting regulatory location services, this could increase LMF (e.g. LMF 152) impacts but not AMF (e.g. AMF 154) impacts. For a PLMN supporting commercial location services only, this could avoid new AMF impact at the expense of extra location impact to an LMF. Thus, it may be seen that support of the NLg* reference point for the LMF based location solution may increase LMF impacts but may not affect AMF impact.

The second difference in (ii) above could be associated with different message content and different procedures for supporting the service operations at a GMLC 155. The same type of difference may occur for support of location for regulatory services and commercial based services for EPS with regard to a Provide-Location-Request/Answer and Location-Report-Request/Answer Diameter commands for an MME-GMLC SLg interface as defined in 3GPP TS 29.172. In the case of EPS, a common protocol may be used for both types of location although the message content and procedures may be partly different. This suggests that the protocols defined in 3GPP TS 29.518 to support the service operations in Table 7 for the AMF based location solution might be enhanced to support the service operations in Table 8 for the LMF based solution which could reduce new protocol impacts. As an alternative, a new protocol might be defined for the NLg* reference point for the LMF based solution which reuses parameters defined in 3GPP TS 29.518 for the service operations in Table 7 for the NLg reference point. The extension of the protocol in 3GPP TS 29.518 for the NLg reference point or, at least, the reuse of existing parameters for this protocol could reduce impacts for the NLg* interface (compared to defining a new protocol from scratch) and could reduce impacts to support this protocol in any GMLC 155 that already supports the AMF based location solution in 3GPP Release 15.

Thus, it may be seen that the NLg* reference point for the LMF based location solution can be supported by either extending the protocol defined in 3GPP TS 29.518 for the NLg reference point in Release 15 or defining a new protocol which reuses common parameters from this protocol. In either case, GMLC 155 impacts could be reduced for a GMLC 155 that already supports the AMF based location solution in 3GPP Release 15.

There may be additional coexistence on an NLh reference point between a GMLC 155 and a UDM 156. For the AMF based location solution in 3GPP Release 15, the NLh reference point may support the UDM services and service operations shown in Table 9, as defined in 3GPP TS 23.502, which may be used by a consumer GMLC 155 for the AMF based 3GPP Release 15 location solution and for the LMF based location solution.

TABLE 9

| NF service | Service Operations | Operation Semantics | AMF based solution consumer | LMF based solution consumer |
| --- | --- | --- | --- | --- |
| UE Context Management (UECM) | Get | Request/Response | GMLC | GMLC |

For the AMF based location solution in 3GPP Release 15, the UDM service operation shown in Table 9 may be invoked by an HGMLC 155H using the GPSI or SUPI of a target UE 105 and may return a serving AMF 154 address. For the LMF based solution, the UDM service operation shown in Table 9 may be invoked by an HGMLC 155H using the GPSI or SUPI of a target UE 106 and may return the serving AMF 154 address and optionally a VGMLC 155V address, an LMF 152 address and/or subscribed privacy requirements for the UE 105. The UDM service operation shown in Table 9 and as defined for the AMF based solution in 3GPP Release 15 could thus be extended to support the LMF based solution.

Thus, it can be seen that support of the NLh reference point for the LMF based location solution can reuse the UDM service operation for the AMF based location solution in 3GPP Release 15 with the addition of support for providing one or more of a VGMLC 155V address, an LMF 152 address and subscribed privacy requirements. If a VGMLC 155V address or an LMF 152 address is returned, there could be an added impact to an AMF 152 and UDM 156 to provide these to the UDM 156 for a UE 105 registration.

The description above for FIGS. 22 and 23 and Tables 5-9 shows that the LMF based location solution can coexist with an AMF based location solution (e.g. for 3GPP Release 15) in the same PLMN (e.g. the same VPLMN 5GCN 150 or same HPLMN 5GCN 140) and that the LMF based location solution can reuse or extend service operations and reference point support defined for the AMF based location solution. In order to avoid confusion between the two solutions (e.g.

at an AMF 154, LMF 152 or GMLC 155), an operator of a PLMN which supports both solutions might assign identifiers and addresses to LMFs which support the LMF based location solution which are different to the identifiers and addresses assigned to LMFs which support the AMF based location solution. For an LMF which supports both solutions, the LMF might be assigned one identifier and/or address for support of the LMF based location solution and a different identifier and/or address for support of the AMF based location solution. If the LMF identifiers and addresses, or associated ranges of LMF addresses and identifiers, are configured in AMFs and possibly LMFs and/or GMLCs, then an AMF 154, LMF 152 or GMLC 155 which receives an LMF address or identifier can know which location solution is to be supported, which may avoid attempting to use an incorrect location procedure.

In addition, an AMF 154 may assign correlation IDs to location sessions with an LMF 152 for the AMF based location solution which are different from any LMF address or LMF identifier for the LMF based location solution. As an example, when transferring a positioning protocol message between an LMF 152 and a UE 105, both the LMF based solution and the AMF based solution may use a common procedure (e.g. as exemplified by stages 2-6 of FIG. 6) based on NAS transport to transfer the positioning protocol message between the AMF 154 and UE 105 but may used different procedures to transfer the positioning protocol message between the AMF 154 and LMF 152. If a UE 105 sends a positioning protocol message (e.g. an LPP or NPP message) to an LMF 152 via an AMF 154, and includes a routing identifier, the routing identifier may (i) identify the destination LMF 152 when an LMF based solution is used, or (ii) comprise the correlation ID assigned by the AMF 154 when an AMF based solution is used. By inspecting the routing identifier for the positioning protocol message received from the UE 105, the AMF 152 can determine whether it is an LMF identifier or a correlation ID which may enable the AMF 154 to know which type of location solution is used. For example, when the routing identifier is determined by the AMF 154 to be an LMF identifier, the AMF 154 may transfer the positioning protocol message to the LMF 152 identified by the LMF identifier according to a procedure (e.g. as described in FIG. 6) for the LMF based solution. Conversely, when the routing identifier is determined by the AMF 154 to be a correlation ID, the AMF 154 may transfer the positioning protocol message to the LMF 152 identified by the correlation ID (e.g. based on state information for the correlation ID stored in the AMF 154) according to a procedure for the AMF based solution.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for supporting location services for a user equipment (UE) using service based interfaces comprising:
receiving by a first location server a location service request for the UE, wherein the location service request comprises a message for one of a Mobile Terminated Location Request (MT-LR), a Mobile Originated Location Request (MO-LR), a Network Induced Location Request (NI-LR), or a periodic and triggered MT-LR;
communicating between the first location server and at least one other first entity to obtain location information for the UE measured by the at least one other first entity, wherein the communication between the first location server and the at least one other first entity is transferred via a second entity; and
determining a location for the UE based on the location information;
wherein the first location server uses service based interfaces (SBIs), which expose a service to other network functions, and service operations to receive the location service request and to communicate with the at least one other first entity via the second entity, and wherein the SBIs use HTTP protocols to communicate the service operations.

2. The method of claim 1, wherein the UE is in communication with a Radio Access Network (RAN) and the at least one other first entity comprises at least one of the UE and the RAN.

3. The method of claim 2, wherein the UE communication with the RAN is based on a Fifth Generation (5G) New Radio (NR) interface.

4. The method of claim 2, wherein the UE communication with the RAN is based on an IEEE 802.11 Wireless Local Area Network radio interface.

5. The method of claim 1, wherein the first location server is a Location Management Function (LMF).

6. The method of claim 5, wherein the UE is assigned to the LMF based on an identification of the UE, network slicing, or both.

7. The method of claim 1, wherein the first location server is part of a Fifth Generation Core network (5GCN).

8. The method of claim 7, wherein the first location server is located in a home network for the UE, wherein the UE is roaming in a visited network different from the home network.

9. The method of claim 7, wherein the first location server is located in a serving network for the UE.

10. The method of claim 9, wherein a second location server located in the serving network uses a Network Repository Function (NRF) to request a set of available location servers in the serving network and the second location server selects the first location server from the set of available location servers.

11. The method of claim 9, wherein a second location server located in the serving network is configured with all location servers in the serving network and the second location server selects the first location server.

12. The method of claim 9, wherein a second location server located in the serving network is configured with a set of location servers in the serving network that the second entity is allowed to use, and the second location server selects the first location server.

13. The method of claim 1, wherein the second entity selects the first location server and provides an address of the first location server to a Unified Data Management, wherein the Unified Data Management provides the address for the first location server to a querying second location server.

14. The method of claim 1, wherein the first location server receives at least one of the message for the MT-LR and the message for the periodic and triggered MT-LR from a second location server.

15. The method of claim 14, wherein the second location server is a Gateway Mobile Location Center (GMLC).

16. The method of claim 15, wherein the GMLC obtains privacy subscription requirements for the UE from a Unified Data Management (UDM).

17. The method of claim 15, wherein the first location server uses an SBI to communicate with the GMLC.

18. The method of claim 1, wherein the second entity is an Access and Mobility Management Function (AMF).

19. A first location server for supporting location services for a user equipment (UE) comprising:
an external interface for receiving and sending messages to entities in a network; and
at least one processor coupled to the external interface, the at least one processor configured to receive a location service request for the UE, wherein the location service request comprises a message for one of a Mobile Terminated Location Request (MT-LR), a Mobile Originated Location Request (MO-LR), a Network Induced Location Request (NI-LR), or a periodic and triggered MT-LR, communicate with at least one other first entity to obtain location information for the UE measured by the at least one other first entity, wherein the communication between the first location server and the at least one other first entity is transferred via a second entity; and determine a location for the UE based on the location information; wherein the first location server is configured to use service based interfaces (SBIs), which expose a service to other network functions, and service operations to receive the location service request and to communicate with the at least one other first entity via the second entity, and wherein the SBIs are configured to use HTTP protocols to communicate the service operations.

20. A first location server for supporting location services for a user equipment (UE) comprising:
means for receiving by a first location server a location service request for the UE, wherein the location service request comprises a message for one of a Mobile Terminated Location Request (MT-LR), a Mobile Originated Location Request (MO-LR), a Network Induced Location Request (NI-LR), or a periodic and triggered MT-LR;
means for communicating between the first location server and at least one other first entity to obtain location information for the UE measured by the at least one other first entity, wherein the communication between the first location server and the at least one other first entity is transferred via a second entity; and
means for determining a location for the UE based on the location information;

wherein the first location server uses service based interfaces (SBIs), which expose a service to other network functions, and service operations to receive the location service request and to communicate with the at least one other first entity via the second entity, and wherein the SBIs are configured to use HTTP protocols to communicate the service operations.

* * * * *